US012760838B2

(12) United States Patent
Noble et al.

(10) Patent No.: US 12,760,838 B2
(45) Date of Patent: Oct. 13, 2026

(54) PICKER HEADER LUBRICATION SYSTEM AND METHOD THEREOF

(71) Applicant: DEERE & COMPANY, Moline, IL (US)

(72) Inventors: Ryan E. Noble, Carlisle, IA (US); Binghui Dong, Ankeny, IA (US); Brandon C. Carlson, Ankeny, IA (US)

(73) Assignee: Deere & Company, Moline, IL (US)

( * ) Notice: Subject to any disclaimer, the term of this patent is extended or adjusted under 35 U.S.C. 154(b) by 0 days.

(21) Appl. No.: 18/739,673

(22) Filed: Jun. 11, 2024

(65) Prior Publication Data

US 2025/0020276 A1 Jan. 16, 2025

Related U.S. Application Data

(60) Provisional application No. 63/513,601, filed on Jul. 14, 2023.

(51) Int. Cl.
*F16N 13/22* (2006.01)

(52) U.S. Cl.
CPC .......... *F16N 13/22* (2013.01); *F16N 2210/04* (2013.01)

(58) Field of Classification Search
CPC ...... F16N 13/22; F16N 2210/04; F16N 29/00; F16N 25/00; F16N 7/38; A01D 46/16; A01D 46/08
See application file for complete search history.

(56) References Cited

U.S. PATENT DOCUMENTS

| | | | | | |
|---|---|---|---|---|---|
| 4,769,978 | A * | 9/1988 | Reichen | A01D 46/088 | 56/28 |
| 4,972,663 | A * | 11/1990 | Richman | A01D 46/088 | 56/12.3 |
| 5,018,343 | A * | 5/1991 | Finke | A01D 46/088 | 56/37 |
| 5,137,117 | A * | 8/1992 | Mangen | F16N 7/385 | 184/7.4 |

(Continued)

FOREIGN PATENT DOCUMENTS

CN 115199927 A * 10/2022

OTHER PUBLICATIONS

Turkish Search Report issued in application No. 2024/009076 dated Aug. 12, 2025, 04 pages.

*Primary Examiner* — Robert W Hodge
*Assistant Examiner* — Mark K Buse
(74) *Attorney, Agent, or Firm* — Taft Stettinius & Hollister LLP; Stephen F. Rost

(57) ABSTRACT

A lubrication system is provided for lubricating a plurality of picker units connected to an agricultural machine. Each of the plurality of picker units includes a cam track assembly, an idler gear assembly, a drum and drive gear assembly, and a drum assembly. The lubrication system includes a supply of lubricant and a pump fluidly coupled to the supply. A primary distributor is fluidly coupled to the pump and includes a plurality of outlets fluidly coupled to each of the plurality of picker units. A plurality of secondary distributors is each fluidly coupled to one of the plurality of outlets of the primary distributor. Each of the plurality of second distributors is fluidly coupled to one of the plurality of picker units. The primary distributor is configured to distribute an equal amount of lubricant in a given cycle to each of the plurality of secondary distributors.

18 Claims, 30 Drawing Sheets

(56) References Cited

U.S. PATENT DOCUMENTS

| | | | | |
|---|---|---|---|---|
| 5,195,612 | A * | 3/1993 | Hahn | A01D 46/088 56/28 |
| 2002/0088216 | A1* | 7/2002 | Horejsi | A01B 51/026 56/28 |
| 2017/0114957 | A1* | 4/2017 | Conley | F16N 29/02 |
| 2018/0017210 | A1* | 1/2018 | Letscher | F16N 29/02 |
| 2020/0266738 | A1* | 8/2020 | Koeppel | F16N 13/06 |

* cited by examiner

PICKER HEADER LUBRICATION SYSTEM AND METHOD THEREOF

RELATED APPLICATIONS

This application claims the benefit of U.S. Provisional Patent Application Ser. No. 63/513,601, filed Jul. 14, 2023, the disclosure of which is hereby incorporated by reference in its entirety.

FIELD OF THE DISCLOSURE

The present disclosure relates to an agricultural machine including a picker header assembly, and in particular to a lubrication system for delivering a lubricant to the picker header assembly.

BACKGROUND OF THE DISCLOSURE

A cotton harvester is an agricultural machine designed for harvesting cotton plants in a field. The cotton harvester may include one or more heads or units for performing the harvesting operation. Each of the one or more heads or units includes a number of spindles and doffers for harvesting the cotton plants. Doffer columns have a plurality of doffers for removing picked cotton from the spindles. A doffer is a disc that may be coated in rubber or urethane and rotatably driven at a velocity much greater than that of the spindles. In a conventional cotton harvester row unit, the spindles move below a bottom face of the doffers so that the cotton is unwrapped and stripped from the spindles. In some conventional systems, a doffer drive system is mechanically driven off a spindle drive system, or at the very least the two systems are mechanically coupled to one another. Mechanical coupling of the doffer and spindle drive systems enables the speed relationships to be maintained, and also achieves proper functionality when the systems operate in harvest mode. In other words, the spindles can operate in a desirable direction of travel. In other systems, the doffer drive system and spindle drive system may be independently controlled.

SUMMARY

In one implementation of the present disclosure, a lubrication system is provided for lubricating a plurality of picker units connected to an agricultural machine. Each of the plurality of picker units includes a cam track assembly, an idler gear assembly, a drum and drive gear assembly, and a drum assembly. The lubrication system includes a supply of lubricant and a pump fluidly coupled to the supply. A primary distributor is fluidly coupled to the pump and includes a plurality of outlets fluidly coupled to each of the plurality of picker units. A plurality of secondary distributors is each fluidly coupled to one of the plurality of outlets of the primary distributor. Each of the plurality of second distributors is fluidly coupled to one of the plurality of picker units. The primary distributor is configured to distribute an equal amount of lubricant in a given cycle to each of the plurality of secondary distributors.

In one example of this implementation, the primary distributor distributes the equal amount of lubricant to each of the plurality of secondary distributors in a sequential order per cycle. In a second example, each secondary distributor is configured to supply a first amount of lubricant to the cam track assembly, a second amount of lubricant to the idler gear assembly, and a third amount of lubricant to the drum assembly. In a third example, each of the first amount, the second amount, and the third amount is predefined.

In a fourth example, the secondary distributor supplies lubricant to the cam track assembly, the idler gear assembly, and the drum assembly in the same sequential order per a given cycle. In a fifth example, the lubrication system includes a proximity switch coupled to the primary distributor, the proximity switch is configured to detect one complete cycle lubricant is distributed to each of the plurality of secondary distributors.

In a sixth example, the cam track assembly of each of the plurality of picker units includes a cam track formed between an inner wall and an outer wall, the cam track defining a path about which a plurality of rollers move. An opening is formed in the cam track at a location offset from a centerline of the cam track and adjacent to the outer wall such that the opening is fluidly coupled to an outlet port at the corresponding secondary distributor. In a seventh example, a fluid line is fluidly coupled between the outlet port at the corresponding secondary distributor and the cam track assembly, the fluid line comprising a fitting coupled to the opening formed in the cam track; wherein, lubricant is supplied by the corresponding secondary distributor to the cam track assembly via the fluid line. In an eighth example, the fitting is threadably coupled to the opening formed in the cam track.

In a ninth example, the idler gear assembly includes a first idler gear having a plurality of gear teeth for engaging with a drum drive gear of the drum and drive gear assembly, a second idler gear having a plurality of gear teeth for engaging with a spindle drive gear of the drum and drive gear assembly, a brush fin coupled to the second idler gear and configured to engage with a doffer drive gear of the drum and drive gear assembly, and a pin shaft defining a rotation axis about which the first idler gear and the second idler gear are rotatably driven about. The pin shaft includes an internal bore and an inlet opening coupled to the internal bore, the inlet opening configured to receive lubricant from the corresponding secondary distributor. In a tenth example, the pin includes a second opening and a third opening defined therein, the second and third openings being fluidly coupled to the inlet opening via the internal bore, where lubricant supplied to the inlet opening flows through the internal bore and out of the internal bore through the second and third openings.

In a twelfth example, the first idler gear includes one or more fluid channels formed therein, the one or more fluid channels being fluidly coupled to the second opening or the third opening defined in the pin shaft. In a thirteenth example, a distributor plate is positioned between the first idler gear and the second idler gear, the distributor plate having a top surface and a bottom surface. One or more fluid cutouts are formed in the top surface of the distributor plate and is fluidly coupled to one of the second opening and the third opening in the pin shaft. One or more fluid passages is formed in the bottom surface of the distributor plate and is fluidly coupled to the other of the second opening and the third opening.

In a fourteenth example of the implementation, a plurality of flow paths are formed between the inlet opening and the drum and drive gear assembly. The plurality of flow paths includes a first flow path defined between the inlet opening and the internal bore in the pin shaft, a second flow path defined in the internal bore between the first flow path and the second opening, a third flow path defined in the internal bore between the first flow path and the third opening, a fourth flow path defined between the second or third opening and one or more fluid channels formed in the first idler gear, a fifth flow path defined between the second or third opening and at least one of the one or more fluid cutouts formed in the top surface of the distributor plate, a sixth flow path defined between the second or third opening and at least one of the one or more fluid passages formed in the bottom surface of the distributor plate, and a seventh flow path fluidly coupled to the brush fin and one of the fourth flow, fifth flow, and sixth flow path.

In another example of the implementation, a fluid line fluidly is coupled between the corresponding secondary distributor and the pin shaft, and the fluid line includes a fitting coupled to the inlet opening formed in the pin shaft such that lubricant is supplied by the corresponding secondary distributor to the pin shaft via the fluid line. In yet another example, the fitting is threadably coupled to the inlet opening formed in the pin shaft.

In a further example, the drum assembly includes a shaft with a defined internal bore including an inlet opening at one end thereof configured to receive lubricant from the corresponding secondary distributor, and a spider member coupled to the shaft. The spider member defines a cavity for receiving lubricant that flows through the internal bore. The spider member includes a plurality of fluid outlets formed in the cavity and fluidly coupled to the internal bore via the cavity. In yet a further example, each of the plurality of fluid outlets formed in the cavity is fluidly coupled to an individual picker bar coupled to the drum assembly. In yet another example, a plurality of defined fluid channels is formed in the spider member between the shaft and the plurality of fluid outlets. In still another example, a fluid line is fluidly coupled between the corresponding secondary distributor and the inlet opening in the shaft. The fluid line includes a fitting coupled to the inlet opening formed in the pin shaft such that lubricant is supplied by the corresponding secondary distributor to the shaft via the fluid line.

BRIEF DESCRIPTION OF THE DRAWINGS

The above-mentioned aspects of the present disclosure and the manner of obtaining them will become more apparent and the disclosure itself will be better understood by reference to the following description of the implementations of the disclosure, taken in conjunction with the accompanying drawings, wherein.

Corresponding reference numerals are used to indicate corresponding parts throughout the several views.

DETAILED DESCRIPTION

The implementations of the present disclosure described below are not intended to be exhaustive or to limit the disclosure to the precise forms in the following detailed description. Rather, the implementations are chosen and described so that others skilled in the art may appreciate and understand the principles and practices of the present disclosure.

Figure 1:
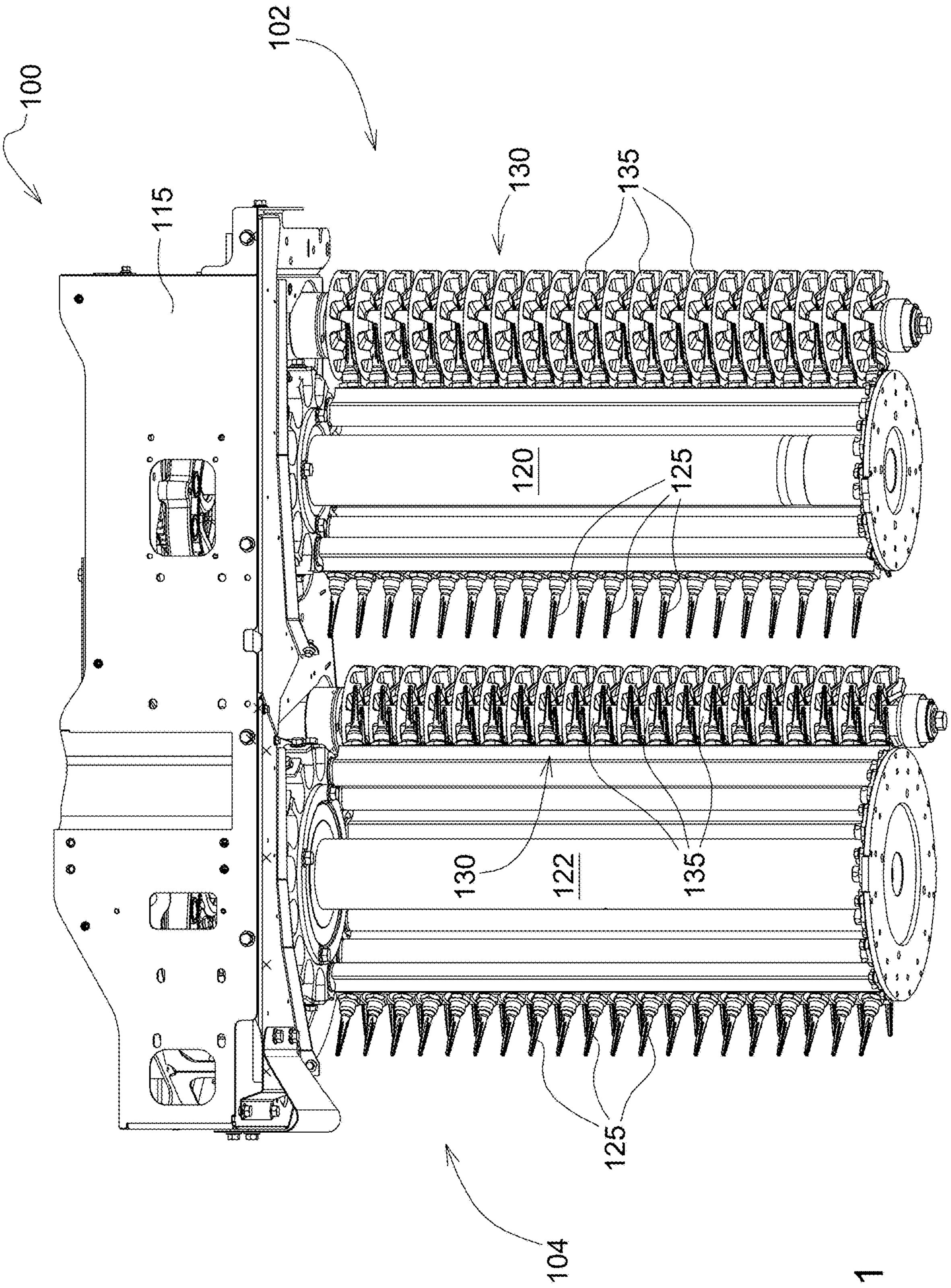
FIG. 1 is a perspective view of a portion of an example implementation of a cotton harvester unit of an agricultural machine.
Figure 23:
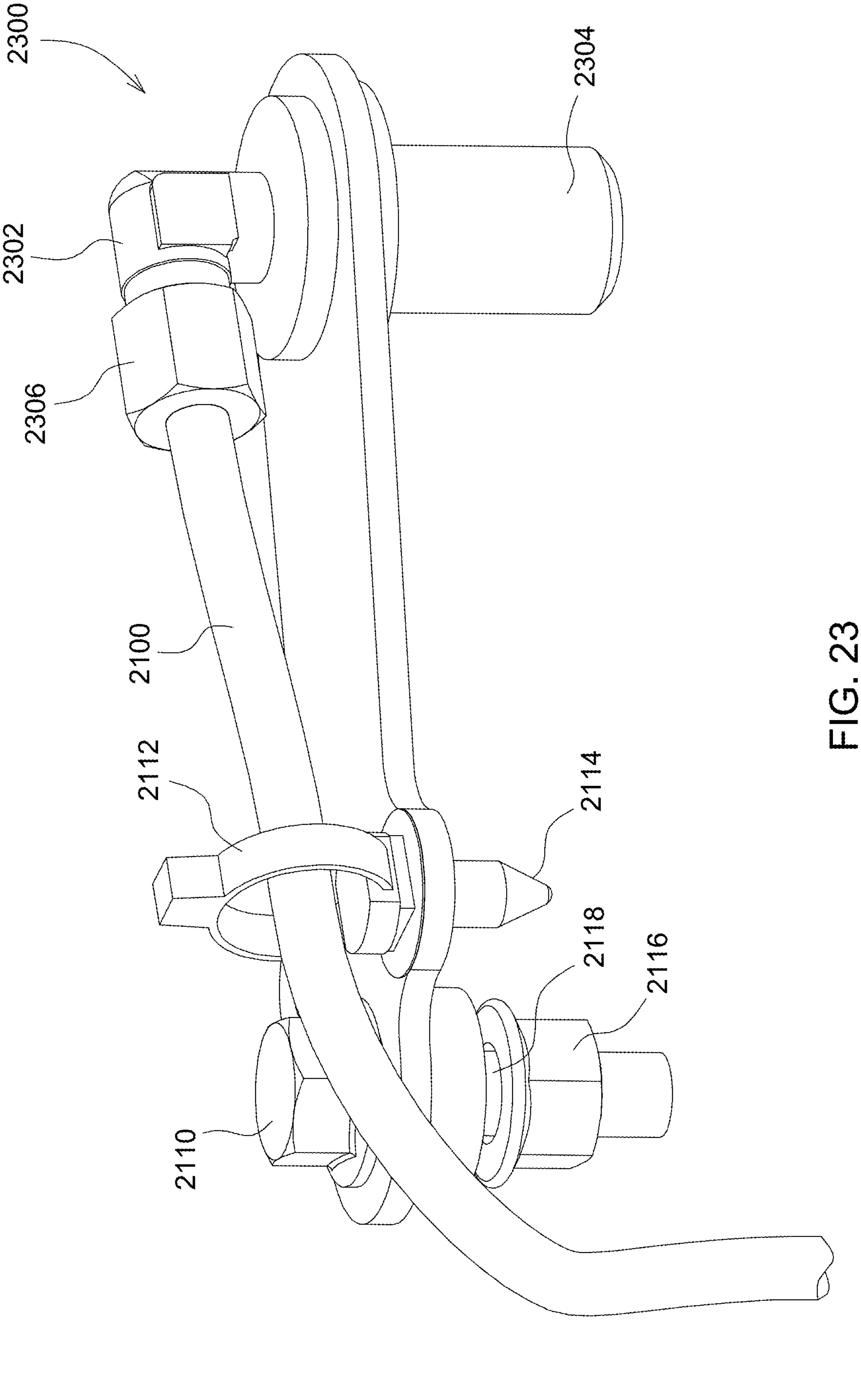
FIG. 23 is a another example implementation of a lubrication fitting and securement plate of a lubrication system for a cotton harvester unit.

Referring to FIG. 1, one example of a cotton harvester unit 100 of a cotton harvester is illustrated. The cotton harvester unit 100 may also be referred to as a picker unit. A cotton harvester may include a plurality of picking units. For example, the cotton harvester may include up to six different picking units, where each picking unit includes a front and a rear drum. Other machines may include a different number of picking units such as two, three, four, etc. In any event, each picking unit may include a frame 115 having a front or first end 104 and a rear or second portion 102. A drum is rotatably coupled to the frame 115. In at least one picking unit, there is a front drum 122 and a rear drum 120. A plurality of rows of bars or spindles 125 is rotatably coupled to the front drum 122 and the rear drum 120. A doffer column 130 having a plurality of doffers 135 is rotatably supported by a bearing housing (not shown). The plurality of doffers 135 is positioned adjacent the spindles 125 and configured to remove cotton from the spindles 125 during the harvesting operation. The bearing housing (not shown) may be threadably engaged with a fixed housing (not shown), which is coupled to the frame 115. Another example of a cotton harvester unit of a cotton harvester similar to the one illustrated in FIG. 1 is shown in FIG. 23.

In a cotton harvester, a conventional lubrication system is provided for dispensing a lubricant such as grease to various components and locations of each picker unit. The operation of the picker units often includes periodic (e.g., daily) service to lubricate each picker unit with the lubrication system. A service operation is performed with conventional lubrication systems when the operator of the cotton harvester puts the machine in a lubrication mode and with the machine in parked. A conventional lubrication process includes turning each picker unit at a low speed and apply grease or other lubricant to lubricate the mechanical components in the picker units.

For example, a conventional lubrication process includes providing a flow of lubricant from a pump through a conventional filter or strainer. The lubricant is supplied to a restriction-based pressure distributor which distributes the lubricant to each picker unit. Because the pressure distributor is restriction-based, an individual hose of equal length connects between the pressure distributor and each picker unit. With the conventional restriction-based lubrication system, unequal amounts of lubricant is often supplied to each location on each picker unit. Some picker units may be over-lubricated, whereas other picker units may be under-lubricated. In some instances, the conventional lubrication system may continuously supply lubricant to one or more of the picker units which already have enough lubricant until the last remaining picker unit is fully lubricated. The excessive supply of lubricant to those picker units that are already fully lubricated is wasteful, increases start up drag and warm up time, and increases the cost of operation.

In some instances, one or more of the hoses can be kinked thereby affecting the restriction of lubricant flow through the hose. In other instances, there may be more restriction with the delivery of lubricant to one picker unit and less restriction to another, thereby causing an unequal distribution of lubricant to each picker unit. Further, temperature of the lubricant affects the lubricating process. Variations in temperature changes the viscosity of the lubricant flowing through the lubrication system and can cause unequal distribution of lubricant to each picker unit.

Moreover, the conventional lubrication process is generally managed and inspected by the operator of the machine. After a period of time of performing the lubricating process, the operator inspects different locations at one or more picker units to determine if enough lubricant has been supplied to the given location. This can often lead to some picker units receiving more lubricant than others. Thus, it is desirable to provide a lubrication system for a cotton harvester or other agricultural machine capable of providing an equal distribution of lubricant during a lubricating process.

In the present disclosure, a lubrication system is described in regards to a cotton harvester. However, the principles and teachings of the present disclosure is not limited to a lubrication system for only a cotton harvester, but rather is applicable to other agricultural machines.

Figure 2:
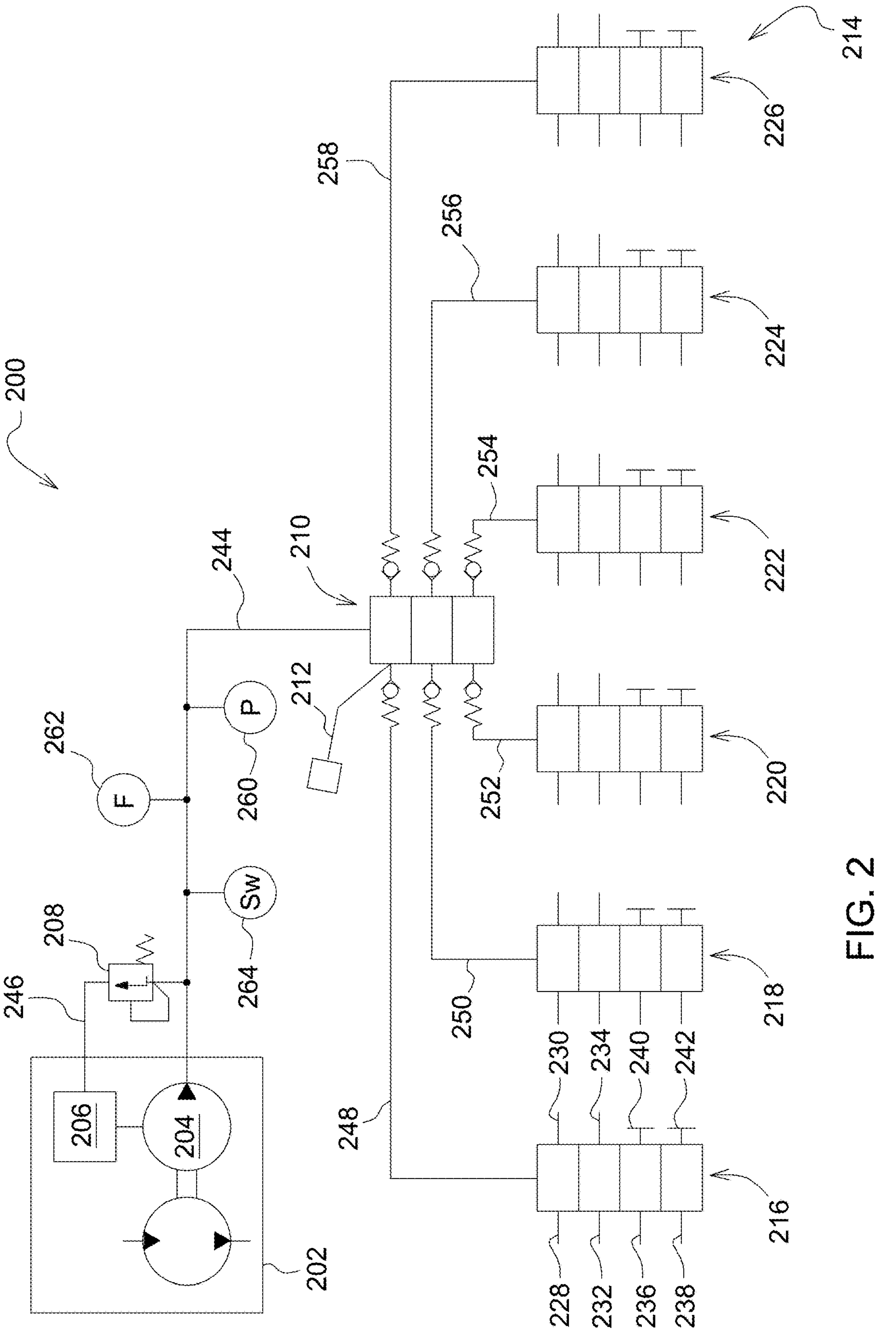
FIG. 2 is a schematic of one example implementation of a lubrication system for a multi-head agricultural machine.

Referring to FIG. 2 of the present disclosure, an example implementation of a lubrication system 200 is shown. The lubrication system 200 includes a lubrication or grease pump system 202 for supplying a lubricant to one or more heads or picker units of an agricultural machine such as a cotton harvester. In the system 200 of FIG. 2, a multi-head or picker unit assembly 214 is shown. Specifically, the assembly 214 is shown with six picker units. For example, the agricultural machine includes a first picker unit 216, a second picker unit 218, a third picker unit 220, a fourth picker unit 222, a fifth picker unit 224, and a sixth picker unit 226. The lubrication system 200 is designed to provide the lubricant from the pump system 202 to each picker unit, as described below.

The pump system 202 includes a pump 204 and a reservoir 206. The reservoir 206 stores the lubricant and is fluidly coupled to the pump 204. The pump 204 supplies the lubricant into a supply line 244. A pressure limiting valve 208 is located downstream of the pump 204 and fluidly coupled to the reservoir 206 via a return line 246. In other implementations, a pressure sensor and pressure switch may be used. In some implementations, a pressure limiting valve 208 as well as a pressure switch and/or pressure sensor may be used.

Figure 5:
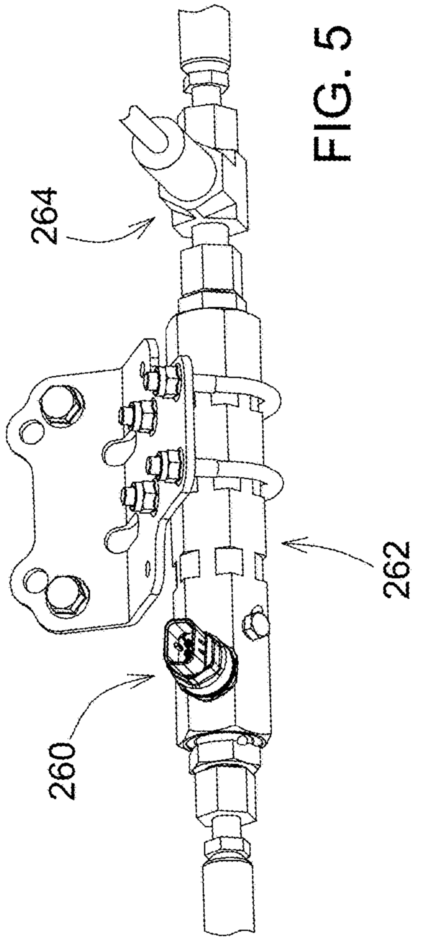
FIG. 5 is a schematic of one example implementation of a fluid pressure controls assembly of the lubrication system of FIG. 2.

As shown in FIGS. 2 and 5, the lubricant is supplied via the supply line 244 through a filter 262 or strainer. A pressure sensor 260 and pressure switch 264 are located downstream of the pump 204 along the supply line 244. In FIG. 5, for example, the pressure switch 264 is located upstream of the filter 262 and is configured to detect a flow blockage or restriction in the filter 262. The pressure sensor 260 is located downstream of the filter 262 and is configured to sense fluid or lubricant pressure in the supply line 244. Other arrangements of the pressure switch 264 and pressure sensor 260 is possible in other implementations. For example, in one implementation, the pressure sensor 260 and pressure switch 264 may be located upstream of the filter 262. In another implementation, the pressure sensor 260 and pressure switch 264 may be located downstream of the filter 262. In yet another implementation, there may be one or more pressure sensors 260 and pressure switches 264 located upstream and/or downstream of the filter 262. Although not shown, each pressure sensor 260 and pressure switch 264 may be in communication with a controller or control system to communicate signals thereto. The controller or control system may provide alerts or status information to an operator of the machine such as on a display in a cab of the machine or to a laptop, mobile phone, or other device located remote from the machine.

The lubricant is supplied via the pump 204 through the supply line 244 to a primary distributor 210 located downstream of the pump system 202. The primary distributor 210, also referred to as a progressive distributor, is configured to sequentially distribute lubricant to each picker unit. More specifically, the primary distributor 210 is configured to distribute a specific volume of lubricant to the first picker unit 216, then the second picker unit 218, the third picker unit 220, and so forth. During operation, the primary distributor 210 ensures that per cycle, each picker unit receives the same volume of lubricant as the other picker units. Thus, the lubrication system 200 of FIG. 2 is not a restriction-based lubrication system as described above. Instead, the primary distributor 210 includes a sensor such as a proximity switch 212 that is configured to count cycles. The proximity switch 212 may be used to determine how much or what volume of lubricant is distributed to each picker unit. Moreover, the proximity switch 212 may be used to determine how many cycles are needed to achieve a threshold or sufficient amount of lubrication at each picker unit. The proximity switch 212 is not affected by temperature variations in the lubricant, but instead counts or detects a number of cycles lubrication is distributed to each picker unit.

Figure 3:
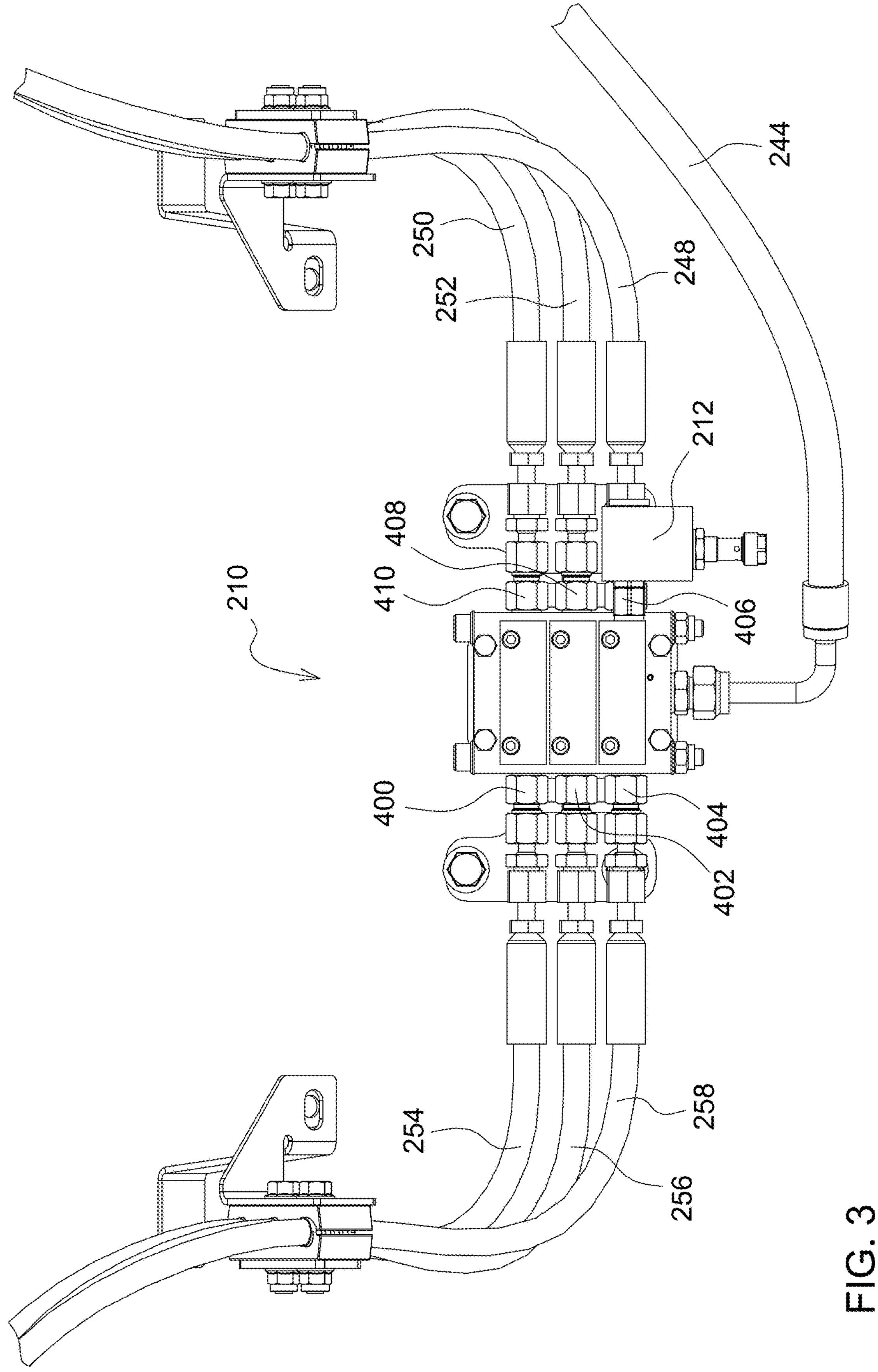
FIG. 3 is a schematic of one example implementation of a primary distributor of the lubrication system of FIG. 2.
Figure 4:
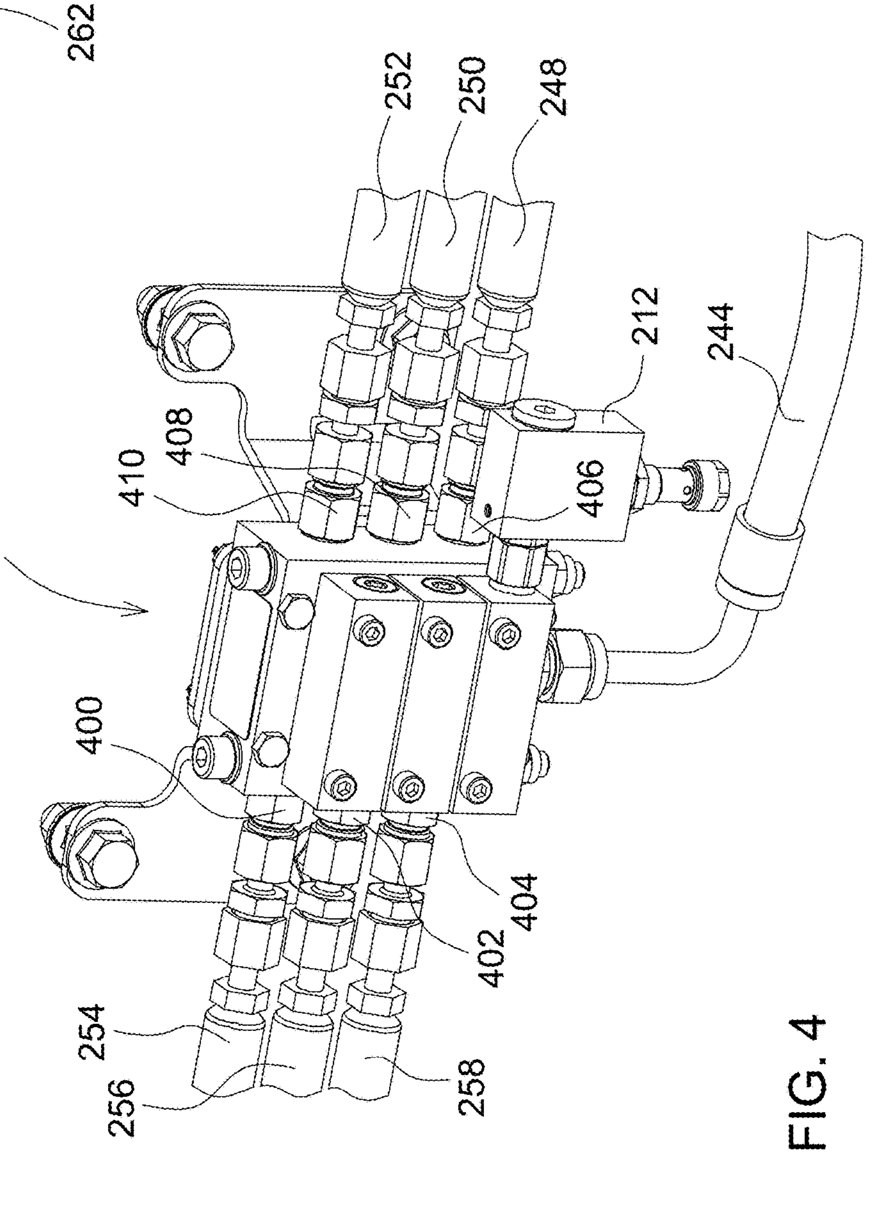
FIG. 4 is another schematic of the one example implementation of the primary distributor.

Referring to FIGS. 3 and 4, the primary distributor 210 and proximity switch 212 are shown. There are a plurality of fluid lines or hoses coupled to the primary distributor 210 for supplying fluid downstream of the primary distributor 210 and to one of the plurality of picker units. For example, a first fluid line 248 is coupled to the primary distributor 210 and supplies lubricant to the first picker unit 216. A second fluid line 250 of the plurality of fluid lines is coupled to the primary distributor 210 and supplies lubricant to the second picker unit 218. A third fluid line 252 of the plurality of fluid lines is coupled to the primary distributor 210 and supplies lubricant to the third picker unit 220. A fourth fluid line 254 of the plurality of fluid lines is coupled to the primary distributor 210 and supplies lubricant to the fourth picker unit 222. A fifth fluid line 256 of the plurality of fluid lines is coupled to the primary distributor 210 and supplies lubricant to the fifth picker unit 224. A sixth fluid line 258 of the plurality of fluid lines is coupled to the primary distributor 210 and supplies lubricant to the sixth picker unit 226.

In some implementations, the primary distributor 210 may be configured to distribute the same amount of lubricant per cycle to each of the picker units. In other implementations, the amount of lubricant distributed to the first fluid line 248 and the sixth fluid line 258 may be different from the amount of lubricant distributed to the second fluid line 250 and the fifth fluid line 256. In the same way, the amount of lubricant distributed to the third fluid line 252 and fourth fluid line 254 may differ as well. The different volume of fluid distributed at each fluid line may be dependent upon the respective output at the primary distributor. In one non-limiting example implementation, the primary distributor 210 may include a first output of 760 cc for the first and sixth fluid lines, a second output of 760 cc for the second and fifth fluid lines, and a third output of 760 cc for the third and fourth fluid lines. In this example implementation, the amount of lubricant supplied to each of the fluid lines is approximately the same per cycle. If any of the first, second or third outputs are different, then the amount of lubricant distributed from the primary distributor to the respective fluid lines would be different. As will be described below, the same may be true with respect to the secondary distributor 600 (e.g., a first output of 50 cc, a second output of 50 cc, a third output of 150 cc, and a fourth output of 200 cc).

A plurality of check valves may also be incorporated into the different fluid lines downstream of the primary distributor 210. In FIGS. 3 and 4, for example, a first check valve 400 is fluidly disposed between the primary distributor 210 and the fourth fluid line 254. The first check valve 400 is configured to prevent a backflow of lubricant to the primary distributor 210. Similarly, a second check valve 402 is fluidly disposed between the primary distributor 210 and the fifth fluid line 256. A third check valve 404 and fourth check valve 406 are fluidly disposed between the primary distributor 210 and the sixth fluid line 258 and first fluid line 248, respectively. Moreover, a fifth check valve 408 and sixth check valve 408 are fluidly disposed between the primary distributor 210 and the second fluid line 250 and the third fluid line 252, respectively. Each fluid line of the plurality of fluid lines is therefore fluidly coupled to a different port associated with the primary distributor 210. The primary distributor 210 may include additional ports to which a fluid line or hose is not connected. For example, in the implementation of FIG. 2, a first port 240 and a second port 242 are blocked off so that lubricant is not dispensed from the primary distributor 210 through either port.

As lubricant is distributed via the primary distributor 210 to each picker unit, the lubricant is supplied through a corresponding fluid line (e.g., the first fluid line 248) to a secondary distributor. In one implementation, each picker unit includes its own secondary distributor. In other implementations, two or more picker units may be fluidly coupled to the same secondary distributor. In some implementations, the secondary distributor is the same as or common to each of the picker units. In other implementations, the second distributor is the same for at least two or more of the picker units.

In several implementations, the primary distributor is specific to a particular agricultural machine and the number of picker units coupled to the machine. For example, in one implementation, an agricultural machine having four picker units may utilize one primary distributor, whereas an agricultural machine having six picker units may utilize a different primary distributor. In some implementations, each machine may include only one primary distributor and a plurality of secondary distributors for each picker unit. In other implementations, each machine may include two or more primary distributors. In a further implementation, an agricultural machine may include a plurality of primary distributors and a plurality of secondary distributors in the lubrication system.

Figure 6:
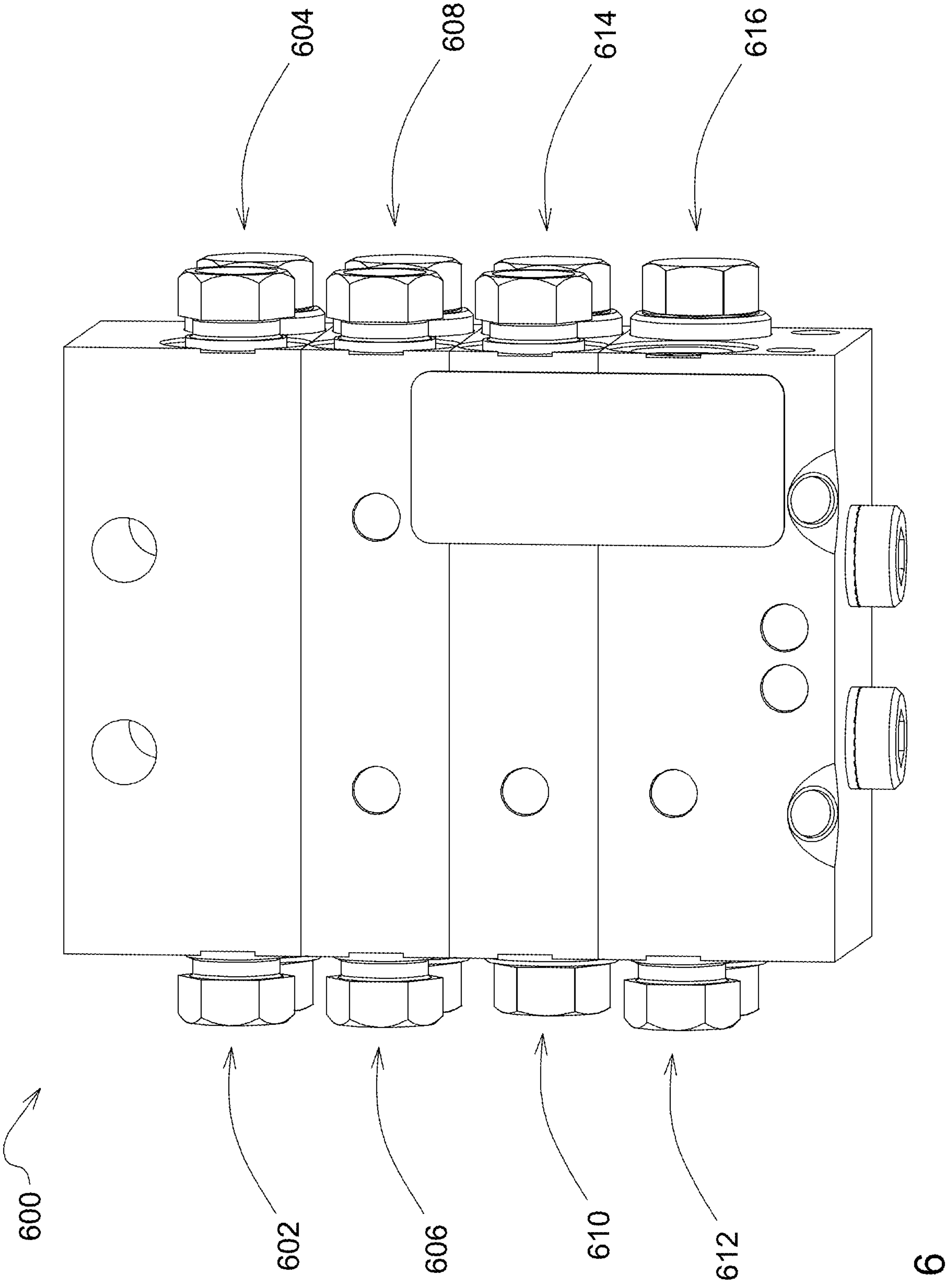
FIG. 6 is a schematic of one example implementation of a secondary distributor of the lubrication system of FIG. 2.

In FIG. 2, each picker unit is shown including its own secondary distributor. In FIG. 6, one example implementation of a secondary distributor 600 is shown. The secondary distributor 600 includes an inlet for receiving lubricant from the primary distributor 210. The lubricant is then distributed through the secondary distributor 600 to different locations on the particular picker unit via one of a plurality of ports. The secondary distributor 600 of FIG. 6 is shown having eight (8) ports. In other implementations, the secondary distributor may include fewer or additional ports. In FIG. 6, the secondary distributor 600 includes a first port 602, a second port 604, a third port 606, a fourth port 608, a fifth port 610, a sixth port 612, and a pair of blocked ports, 614 and 616. Fifth port 610 and blocked port 614 can swap positions. Sixth port 612 and blocked port 616 can swap positions as well to aid in hose routing.

Individual fluid lines or hoses may be coupled to each of the ports of the secondary distributor 600 for delivering lubricant to various locations on each picker unit. In FIG. 2, for example, a first supplemental fluid line 228 may be fluidly coupled to the first port 602 of the secondary distributor 600. A second supplemental fluid line 230 may be fluidly coupled to the second port 604 of the secondary distributor 600. A third supplemental fluid line 232 and a fourth supplemental fluid line 234 may be fluidly coupled to the third port 606 and fourth port 608, respectively. Likewise, a fifth supplemental fluid line 236 and a sixth supplemental fluid line 238 may be fluidly coupled to the fifth port 610 and sixth port 612, respectively, of the secondary distributor 600.

Although not shown in FIGS. 2 and 6, in one implementation, the first supplemental fluid line 228 is configured to supply lubricant to a front cam track on the picker unit. The second fluid line 230 is configured to supply lubricant to a rear cam track on the picker unit. The third supplemental fluid line 232 and the fourth supplemental fluid line 234 are configured to supply lubricant to a front idler gear assembly and a rear idler gear assembly, respectively, on the picker unit. The fifth supplemental fluid line 236 and the sixth supplemental fluid line 238 are configured to supply lubricant to a front drum assembly and a rear drum assembly, respectively, on the picker unit. Each of these locations will be described in further detail below. Nonetheless, in a first cycle, the secondary distributor 600 can distribute the specific volume of lubricant into the fifth supplemental fluid line 236 from ports 610 and 614 and then distribute the specific volume of lubricant into the sixth supplemental fluid line 238 from ports 612 and 616. Sequentially, the secondary distributor 600 is able to supply the predefined amount of lubricant to each of the supplemental fluid lines in each cycle.

Each secondary distributor 600 is configured to receive a flow of lubricant from the primary distributor 210 and distribute a metered or predefined amount of lubricant to each active port. In FIG. 6, port 614 of the secondary distributor 600 is blocked therefore the metered or predefined amount of lubricant is redirected through port 610. Port 616 of the secondary distributor 600 is blocked therefore the metered or predefined amount of lubricant is redirected through port 612. In one example implementation, the first supplemental fluid line 228 and the second supplemental fluid line 230 may be configured to supply 0.050 cubic centimeters (cc) per cycle to the front and rear cam tracks. In another example implementation, the third supplemental fluid line 232 and the fourth supplemental fluid line 234 may be configured to supply 0.050 cc per cycle to the front and rear idler gear assemblies. In a further example implementation, the fifth supplemental fluid line 236 may be configured to supply 300 cc of lubricant per cycle to the rear drum assembly. Of the 300 cc, 150 cc is from port 610 and the other 150 cc is redirected from blocked port 614. The sixth supplemental fluid line 238 may be configured to supply 400 cc of lubricant per cycle to the front drum assembly. Of the 400 cc, 200 cc is from port 612 and the other 200 cc is redirected from blocked port 616. The above volumes of lubricant supplied to each location on the picker unit is not intended to be limiting and is only one example being used for illustrative purposes. The specific volume of lubricant distributed to each location on the picker unit via the lubrication system may vary in other implementations. In any event, the specific amounts of lubricant distributed to each location may be predefined at the secondary distributor 600 in the lubrication system 200 of FIG. 2. As described previously, the conventional restriction-based lubrication system supplied different and inconsistent amounts of lubricant to each location on a picker unit due to variations in temperature and other restrictions in the system, whereas the lubrication system 200 of FIG. 2 distributes predefined amounts of fluid to each location on the picker unit. The primary distributor 210 is able to ensure each picker unit receives an equal amount of lubricant per cycle, and each secondary distributor is able to distribute predefined amounts of lubricant per cycle to each location on the picker unit without over-lubricating some locations while under-lubricating other locations.

In the implementation of FIG. 2, the picker head assembly 214 is shown including six picker units. In other implementations, a picker head assembly may include any number of picker units. For example, in one implementation, there may be two or more picker units. In another implementation, there may be three or more picker units. In yet another implementation, there may be four or more picker units. The present disclosure is not limited to any number of picker units on a picker head assembly and is intended to cover one or more picker units on a given picker head assembly.

Figure 32:
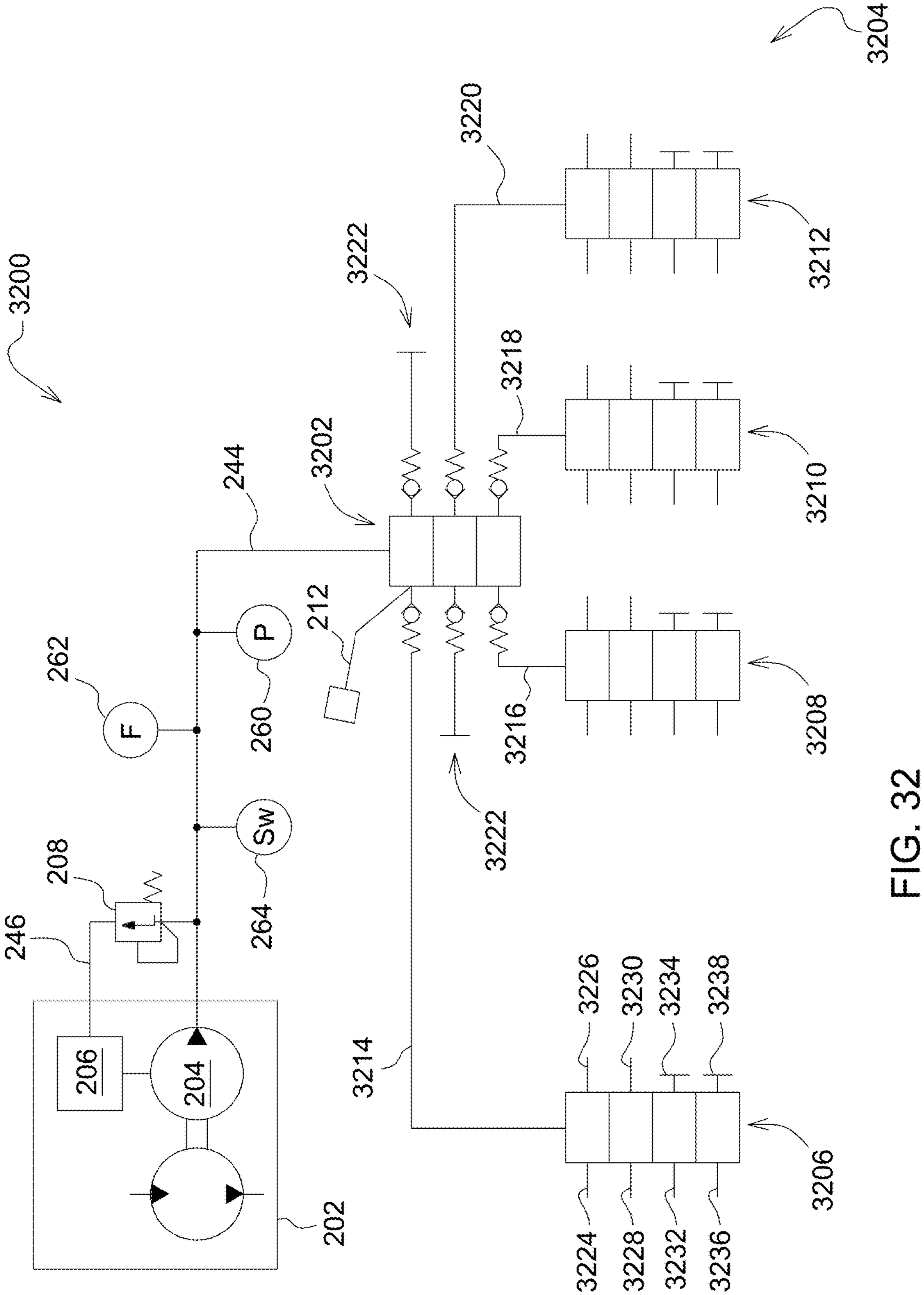
FIG. 32 is a schematic of another example implementation of a lubrication system for a multi-head agricultural machine.

Referring to FIG. 32 of the present disclosure, an example implementation of a lubrication system 3200 is shown. The lubrication system 3200 includes a lubrication or grease pump system 202 for supplying a lubricant to one or more heads or picker units of an agricultural machine such as a cotton harvester. In the system 3200 of FIG. 32, a multi-head or picker unit assembly 3204 is shown. Specifically, the assembly 3204 is shown with four picker units. For example, the agricultural machine includes a first picker unit 3206, a second picker unit 3208, a third picker unit 3210, and a fourth picker unit 3212. The lubrication system 3200 is designed to provide the lubricant from the pump system 202 to each picker unit, as described below.

Similar to FIG. 2, the pump system 202 includes a pump 204 and a reservoir 206. The reservoir 206 stores the lubricant and is fluidly coupled to the pump 204. The pump 204 supplies the lubricant into a supply line 244. A pressure limiting valve 208 is located downstream of the pump 204 and fluidly coupled to the reservoir 206 via a return line 246. In other implementations, a pressure sensor and pressure switch may be used. In some implementations, a pressure limiting valve 208 as well as a pressure switch and/or pressure sensor may be used.

In FIG. 32, the lubricant is supplied via the supply line 244 through a filter 262 or strainer. A pressure sensor 260 and pressure switch 264 are located downstream of the pump 204 along the supply line 244. The pressure switch 264 may be located upstream of the filter 262 and is configured to detect a flow blockage or restriction in the filter 262. The pressure sensor 260 is located downstream of the filter 262 and is configured to sense fluid or lubricant pressure in the supply line 244. Other arrangements of the pressure switch 264 and pressure sensor 260 is possible in other implementations. For example, in one implementation, the pressure sensor 260 and pressure switch 264 may be located upstream of the filter 262. In another implementation, the pressure sensor 260 and pressure switch 264 may be located downstream of the filter 262. In yet another implementation, there may be one or more pressure sensors 260 and pressure switches 264 located upstream and/or downstream of the filter 262. Although not shown, each pressure sensor 260 and pressure switch 264 may be in communication with a controller or control system to communicate signals thereto. The controller or control system may provide alerts or status information to an operator of the machine such as on a display in a cab of the machine or to a laptop, mobile phone, or other device located remote from the machine.

The lubricant is supplied via the pump 204 through the supply line 244 to a primary distributor 3202 located downstream of the pump system 202. The primary distributor 3202, also referred to as a progressive distributor, is configured to sequentially distribute lubricant to each picker unit. More specifically, the primary distributor 3202 is configured to distribute a specific volume of lubricant to the first picker unit 3206, then the second picker unit 3208, the third picker unit 3210, and the fourth picker unit 3212. During operation, the primary distributor 3202 ensures that per cycle, each picker unit receives the same volume of lubricant as the other picker units. Thus, the lubrication system 3200 of FIG. 32 is not a restriction-based lubrication system. Instead, the primary distributor 3202 includes a sensor such as a proximity switch 212 that is configured to count cycles. The proximity switch 212 may be used to determine how much or what volume of lubricant is distributed to each picker unit. Moreover, the proximity switch 212 may be used to determine how many cycles are needed to achieve a threshold or sufficient amount of lubrication at each picker unit. The proximity switch 212 is not affected by temperature variations in the lubricant, but instead counts or detects a number of cycles lubrication is distributed to each picker unit.

As shown in FIG. 32, there are a plurality of fluid lines or hoses coupled to the primary distributor 3202 for supplying fluid downstream of the primary distributor 3202 and to one of the plurality of picker units. For example, a first fluid line 3214 is coupled to the primary distributor 3202 and supplies lubricant to the first picker unit 3206. A second fluid line 3216 of the plurality of fluid lines is coupled to the primary distributor 3202 and supplies lubricant to the second picker unit 3208. A third fluid line 3218 of the plurality of fluid lines is coupled to the primary distributor 3202 and supplies lubricant to the third picker unit 3210. A fourth fluid line 3220 of the plurality of fluid lines is coupled to the primary distributor 3202 and supplies lubricant to the fourth picker unit 3212. The primary distributor 3202 may also include a pair of fluid connections 3222 that are blocked. These fluid connections 3222 may be used in the event additional picker units were coupled to the picker head assembly 3204. Due to the location of the blocked fluid connections, the amount of lubricant that otherwise would be distributed to fluid lines coupled to the fluid connections 3222 may now be distributed to the fluid connections on the opposite side of the primary distributor 3202. In other words, additional lubricant may be distributed through the first fluid line 3214 and the fourth fluid line 3220 since the opposite sides of the primary distributor 3202 to these fluid lines are blocked fluid connections 3222. In other implementations, the same amount of lubricant may be fluidly distributed to each of the four fluid lines shown in FIG. 32.

Similar to the picker head assembly 214 of FIG. 2, each picker unit of the picker head assembly 3204 of FIG. 32 may include its own secondary distributor. As previously described with respect to FIG. 6, each secondary distributor may include an inlet for receiving lubricant from the primary distributor 3202. The lubricant is then distributed through the secondary distributor to different locations on the particular picker unit via one of a plurality of ports. Similar to the secondary distributor 600 of FIG. 6, the first picker unit 3206 may include a secondary distributor having eight (8) ports. In other implementations, the secondary distributor may include fewer or additional ports.

Individual fluid lines or hoses may be coupled to each of the ports of the secondary distributor for delivering lubricant to various locations on each picker unit. In FIG. 32, for example, a first supplemental fluid line 3224 may be fluidly coupled to a first port of the secondary distributor. A second supplemental fluid line 3226 may be fluidly coupled to a second port of the secondary distributor. A third supplemental fluid line 3228 and a fourth supplemental fluid line 3230 may be fluidly coupled to the third port and fourth port, respectively. Likewise, a fifth supplemental fluid line 3232 and a sixth supplemental fluid line 3236 may be fluidly coupled to the fifth port and sixth port, respectively, of the secondary distributor. The primary distributor 3202 in FIG. 32 includes blocked fluid connections 3222 or ports to which a fluid line or hose is not connected. As such, a first blocked port 3234 and a second blocked port 3238 are blocked off at the secondary distributor so that lubricant is not dispensed from the primary distributor 3202 through either port.

In one example implementation of FIG. 32, the first supplemental fluid line 3224 may be configured to supply lubricant to a front cam track on the first picker unit 3206. The second fluid line 3226 may be configured to supply lubricant to a rear cam track on the first picker unit 3206. The third supplemental fluid line 3228 and the fourth supplemental fluid line 3230 may be configured to supply lubricant to a front idler gear assembly and a rear idler gear assembly, respectively, on the first picker unit 3206. The fifth supplemental fluid line 3232 and the sixth supplemental fluid line 3236 may be configured to supply lubricant to a front drum assembly and a rear drum assembly, respectively, on the first picker unit 3206. In a first cycle, the secondary distributor on the first picker unit 3206 in this example implementation can distribute the specific volume of lubricant into the fifth supplemental fluid line 3232 from two ports in the secondary distributor and then distribute the specific volume of lubricant into the sixth supplemental fluid line 3236 from two ports in the secondary distributor. Sequentially, the secondary distributor is able to supply the predefined amount of lubricant to each of the supplemental fluid lines in each cycle.

Figure 33:
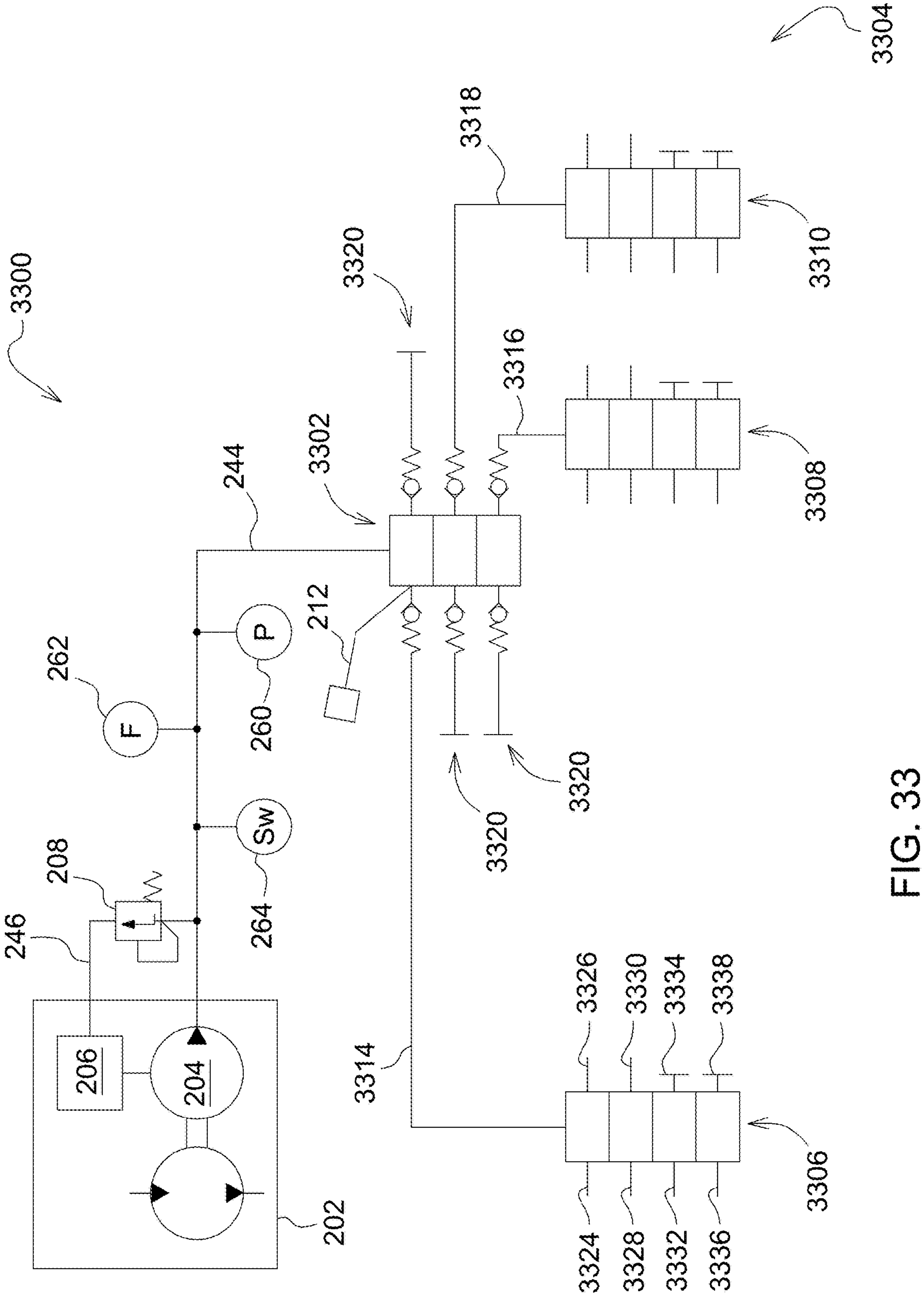
FIG. 33 is a schematic of a further example implementation of a lubrication system for a multi-head agricultural machine.

Referring to FIG. 33 of the present disclosure, a further example implementation of a lubrication system 3300 is shown. The lubrication system 3300 includes a lubrication or grease pump system 202 for supplying a lubricant to one or more heads or picker units of an agricultural machine such as a cotton harvester. In the system 3300 of FIG. 33, a multi-head or picker unit assembly 3304 is shown. Specifically, the assembly 3304 is shown with three picker units. For example, the agricultural machine includes a first picker unit 3306, a second picker unit 3308, and a third picker unit 3210. The lubrication system 3300 is designed to provide the lubricant from the pump system 202 to each picker unit, as described below.

The pump system 202 of FIG. 33 is similar to the pump systems in FIGS. 2 and 32 and includes a pump 204 and a reservoir 206. The reservoir 206 stores the lubricant and is fluidly coupled to the pump 204. The pump 204 supplies the lubricant into a supply line 244. A pressure limiting valve 208 is located downstream of the pump 204 and fluidly coupled to the reservoir 206 via a return line 246. In other implementations, a pressure sensor and pressure switch may be used. In some implementations, a pressure limiting valve 208 as well as a pressure switch and/or pressure sensor may be used.

In FIG. 33, the lubricant is supplied via the supply line 244 through a filter 262 or strainer. A pressure sensor 260 and pressure switch 264 are located downstream of the pump 204 along the supply line 244. The pressure switch 264 may be located upstream of the filter 262 and is configured to detect a flow blockage or restriction in the filter 262. The pressure sensor 260 is located downstream of the filter 262 and is configured to sense fluid or lubricant pressure in the supply line 244. Other arrangements of the pressure switch 264 and pressure sensor 260 is possible in other implementations. For example, in one implementation, the pressure sensor 260 and pressure switch 264 may be located upstream of the filter 262. In another implementation, the pressure sensor 260 and pressure switch 264 may be located downstream of the filter 262. In yet another implementation, there may be one or more pressure sensors 260 and pressure switches 264 located upstream and/or downstream of the filter 262. Although not shown, each pressure sensor 260 and pressure switch 264 may be in communication with a controller or control system to communicate signals thereto. The controller or control system may provide alerts or status information to an operator of the machine such as on a display in a cab of the machine or to a laptop, mobile phone, or other device located remote from the machine.

The lubricant is supplied via the pump 204 through the supply line 244 to a primary distributor 3302 located downstream of the pump system 202. The primary distributor 3302, also referred to as a progressive distributor, is configured to sequentially distribute lubricant to each picker unit. More specifically, the primary distributor 3302 is configured to distribute a specific volume of lubricant to the first picker unit 3306, then the second picker unit 3308, and then the third picker unit 3310. During operation, the primary distributor 3302 ensures that per cycle, each picker unit receives the same volume of lubricant as the other picker units. Thus, the lubrication system 3300 of FIG. 33 is not a restriction-based lubrication system. Instead, the primary distributor 3302 includes a sensor such as a proximity switch 212 that is configured to count cycles. The proximity switch 212 may be used to determine how much or what volume of lubricant is distributed to each picker unit. Moreover, the proximity switch 212 may be used to determine how many cycles are needed to achieve a threshold or sufficient amount of lubrication at each picker unit. The proximity switch 212 is not affected by temperature variations in the lubricant, but instead counts or detects a number of cycles lubrication is distributed to each picker unit.

As shown in FIG. 33, there are a plurality of fluid lines or hoses coupled to the primary distributor 3302 for supplying fluid downstream of the primary distributor 3302 and to one of the plurality of picker units. For example, a first fluid line 3314 is coupled to the primary distributor 3302 and supplies lubricant to the first picker unit 3306. A second fluid line 3316 of the plurality of fluid lines is coupled to the primary distributor 3302 and supplies lubricant to the second picker unit 3308. A third fluid line 3318 of the plurality of fluid lines is coupled to the primary distributor 3302 and supplies lubricant to the third picker unit 3310. The primary distributor 3302 may also include one or more fluid connections 3320 that are blocked. These fluid connections 3320 may be used in the event additional picker units were coupled to the picker head assembly 3304. Due to the location of the blocked fluid connections, the amount of lubricant that otherwise would be distributed to fluid lines coupled to the fluid connections 3320 is now distributed to the fluid connections on the opposite side of the primary distributor 3302. In other words, additional lubricant (e.g., approximately 1.5-2.0 times the amount) may be distributed through the first fluid line 3314, the second fluid line 3316 and the third fluid line 3318 since the opposite sides of the primary distributor 3302 to these fluid lines are blocked fluid connections 3320. In other implementations, the same amount of lubricant may be fluidly distributed to each of the three fluid lines shown in FIG. 33.

Similar to the picker head assembly 214 of FIG. 2, each picker unit of the picker head assembly 3304 of FIG. 33 may include its own secondary distributor. As previously described with respect to FIGS. 6 and 32, each secondary distributor may include an inlet for receiving lubricant from the primary distributor 3302. The lubricant is then distributed through the secondary distributor to different locations on the particular picker unit via one of a plurality of ports. Similar to the secondary distributor 600 of FIG. 6, the first picker unit 3306 may include a secondary distributor having eight (8) ports. In other implementations, the secondary distributor may include fewer or additional ports.

Individual fluid lines or hoses may be coupled to each of the ports of the secondary distributor for delivering lubricant to various locations on each picker unit. In FIG. 33, for example, a first supplemental fluid line 3324 may be fluidly coupled to a first port of the secondary distributor. A second supplemental fluid line 3326 may be fluidly coupled to a second port of the secondary distributor. A third supplemental fluid line 3328 and a fourth supplemental fluid line 3330 may be fluidly coupled to the third port and fourth port, respectively. Likewise, a fifth supplemental fluid line 3332 and a sixth supplemental fluid line 3334 may be fluidly coupled to the fifth port and sixth port, respectively, of the secondary distributor. The primary distributor 3302 in FIG. 33 includes blocked fluid connections 3320 or ports to which a fluid line or hose is not connected. As such, a first port 3334 and a second port 3338 are blocked off at the secondary distributor so that lubricant is not dispensed from the primary distributor 3302 through either port.

In the example implementation of FIG. 33, the first supplemental fluid line 3324 may be configured to supply lubricant to a front cam track on the first picker unit 3306. The second fluid line 3326 may be configured to supply lubricant to a rear cam track on the first picker unit 3306. The third supplemental fluid line 3328 and the fourth supplemental fluid line 3330 may be configured to supply lubricant to a front idler gear assembly and a rear idler gear assembly, respectively, on the first picker unit 3306. The fifth supplemental fluid line 3332 and the sixth supplemental fluid line 3336 are configured to supply lubricant to a front drum assembly and a rear drum assembly, respectively, on the first picker unit 3306. In a first cycle, the secondary distributor on the first picker unit 3306 in this example implementation can distribute the specific volume of lubricant into the fifth supplemental fluid line 3332 from two ports in the secondary distributor and then distribute the specific volume of lubricant into the sixth supplemental fluid line 3336 from two ports in the secondary distributor. Sequentially, the secondary distributor is able to supply the predefined amount of lubricant to each of the supplemental fluid lines in each cycle.

Figure 7:
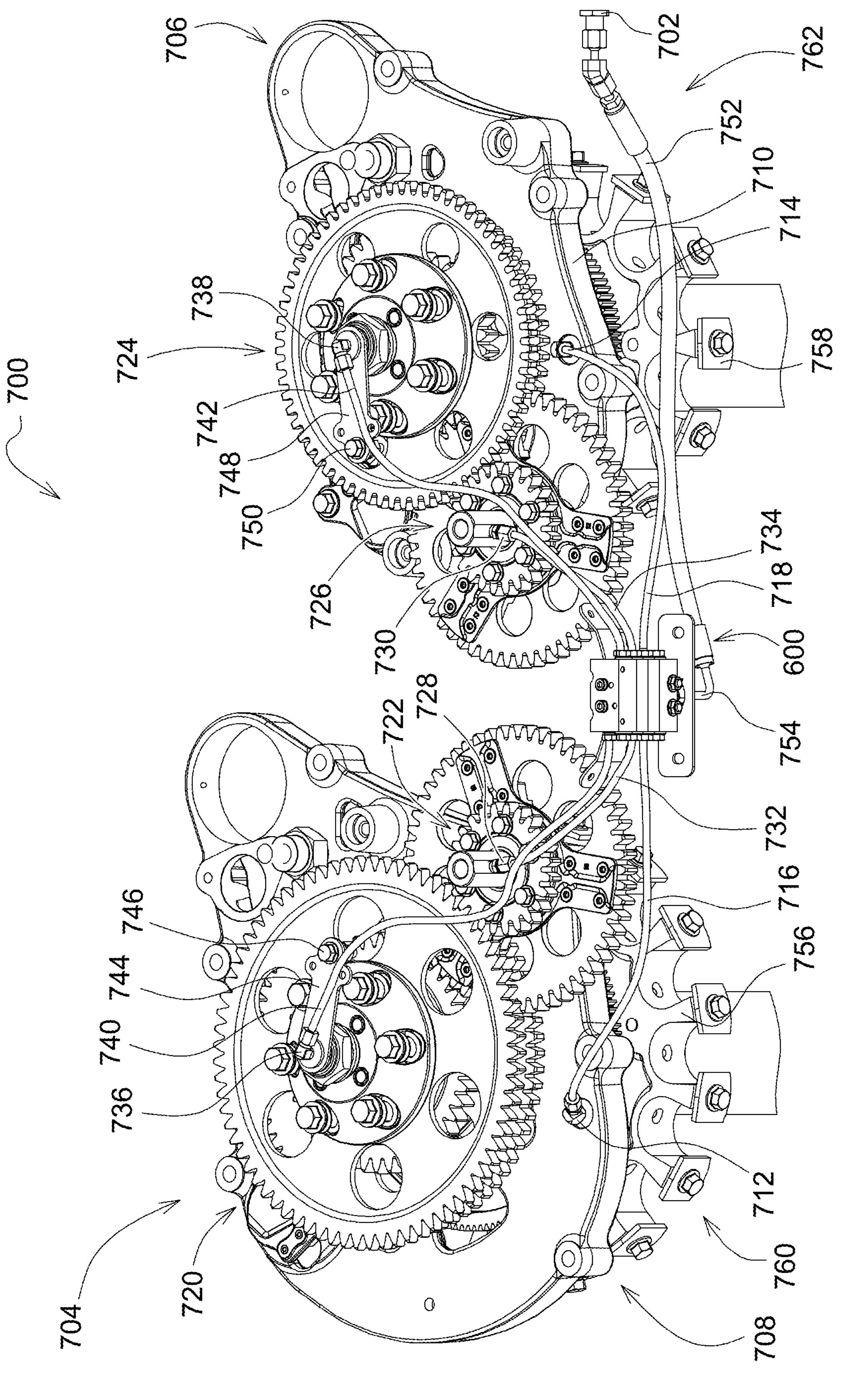
FIG. 7 is a perspective view of one example implementation of a partial cotton harvester unit and lubrication system.

Referring now to FIG. 7 of the present disclosure, a portion of a picker unit 700 is shown. The picker unit 700 may be similar to the first picker unit 216, the second picker unit 218, the third picker unit 220, the fourth picker unit 222, the fifth picker unit 224, and/or the sixth picker unit 226 in FIG. 2. The picker unit 700 may include a first or front assembly 704 and a second or rear assembly 706. The first or front assembly 704 includes a first cam track assembly 708, a first drive gear assembly 720, a first idler gear assembly 722, and a first drum assembly 760. The second or rear assembly 706 includes a second cam track assembly 710, a second drive gear assembly 724, a second idler gear assembly 726, and a second drum assembly 762. The first drum assembly 760 is shown including a first spider member 756, and the second drum assembly 762 is shown including a second spider member 758. The spider members will be described in further detail below.

A lubrication system similar to the one depicted in FIGS. 2-6 may be used to supply lubricant to each location in the picker unit 700. In the implementation of FIG. 7, for example, the picker unit 700 includes a secondary distributor 600 coupled to a frame or support member on the picker unit 700. The secondary distributor 600 is fluidly coupled to a supply line 752 that supplies lubricant to the secondary distributor 600 via a fluid supply 702. The fluid supply 702 may be the first fluid line 248, the second fluid line 250, the third fluid line 252, the fourth fluid line 254, the fifth fluid line 256, or the sixth fluid line 258. The fluid supply 702 may be fluidly coupled to the primary distributor 210 as described above. The secondary distributor 600 includes an inlet port 754 as shown in FIG. 7 to which the supply line 752 is fluidly coupled for supplying lubricant to the secondary distributor 600.

As described above, the secondary distributor 600 meters specific volumes of lubricant per cycle to each location on the picker unit 700. In one example implementation, the secondary distributor 600 distributes lubricant to the first cam track assembly 708 via a fluid line 716. The fluid line 716 may correspond with the first supplemental fluid line 228 of FIG. 2. A fluid fitting or coupler 712 may be coupled to the first cam track assembly 708 for delivering lubricant into the first cam track assembly 708. Once lubricant is supplied to the first cam track assembly 708, the secondary distributor 600 distributes a predefined amount of lubricant to the second cam track assembly 710 via another fluid line 718. The fluid line 718 may correspond with the second supplemental fluid line 230 of FIG. 2. A second fitting or coupler 714 may be coupled to the second cam track assembly 710 for supplying lubricant into the second cam track assembly 710. The manner in which lubricant is supplied to each cam track assembly will be described in further detail below.

Once each cam track assembly receives lubricant, the secondary distributor 600 is configured to distribute lubricant to the first idler gear assembly 722. As will be described below, the first idler gear assembly 722 is in meshing engagement with the first drive gear assembly 720 such that the lubrication of the first idler gear assembly 722 also distributes lubricant to lubricate the first drive gear assembly 720. In the same way, lubricating the second idler gear assembly 726 also distributes lubricant to lubricate the second drive gear assembly 724. In any event, in FIG. 7, the secondary distributor 600 distributes a predefined amount of lubricant to the first idler gear assembly 722 via fluid line 732. Fluid line 732 may correspond with the third supplemental fluid line 232 of FIG. 2. A fluid fitting or coupler 728 may be coupled to the first idler gear assembly 722 as shown in FIG. 7 for supplying lubricant into the first idler gear assembly 722. Once lubricant is supplied to the first idler gear assembly 722, the secondary distributor 600 distributes a predefined amount of lubricant to the second idler gear assembly 724 via another fluid line 734. Fluid line 734 may correspond with the fourth supplemental fluid line 234 of FIG. 2. Another fluid fitting or coupler 730 may be coupled to the second idler gear assembly 724 for supplying lubricant into the second idler gear assembly 724.

Once both idler gear assemblies are lubricated, the secondary distributor 600 may operably distribute lubricant to the first drum assembly 760 via a fluid line 740. The fluid line 740 may correspond with the fifth supplemental fluid line 238 of FIG. 2. A fluid fitting or coupler 736 may be coupled to the first drum assembly 760 for delivering lubricant to the first drum assembly 760. Once the first drum assembly 760 is lubricated, the secondary distributor 600 is configured to supply lubricant to the second drum assembly 762 via another fluid line 742. The fluid line 742 may correspond with the sixth supplemental fluid line 236 of FIG. 2. A fluid fitting or coupler 738 may be coupled to the second drum assembly 762 for delivering lubricant to the second drum assembly 762.

As shown in FIG. 7, the fluid fitting 736 may be coupled to the first drum assembly 760 via a first plate 744. The first plate 744 may be coupled to the first drum assembly 760 via a fastener 746. Similarly, the fluid fitting 738 may be coupled to the second drum assembly 762 via a second plate 748. The second plate 748 may be coupled to the second drum assembly 762 via another fastener 750.

While the sequential order in which the secondary distributor 600 distributes lubricant to each location is described in one example implementation above, in other implementations the secondary distributor 600 may be configured to supply lubricant to the locations in different sequential orders. For example, in one implementation, the secondary distributor 600 may distribute lubricant to the first and second idler gear assemblies or first and second drum assemblies before the cam track assemblies. In other implementations, the first or front cam track assembly, idler gear assembly, and drum assembly may be lubricated and then the second or rear cam track assembly, idler gear assembly, and drum assembly may be lubricated. In other words, the order in which the various locations are lubricated may vary in different implementations, and the present disclosure is not intended to be limiting as to any particular order in which the different locations receive lubrication.

Figure 8:
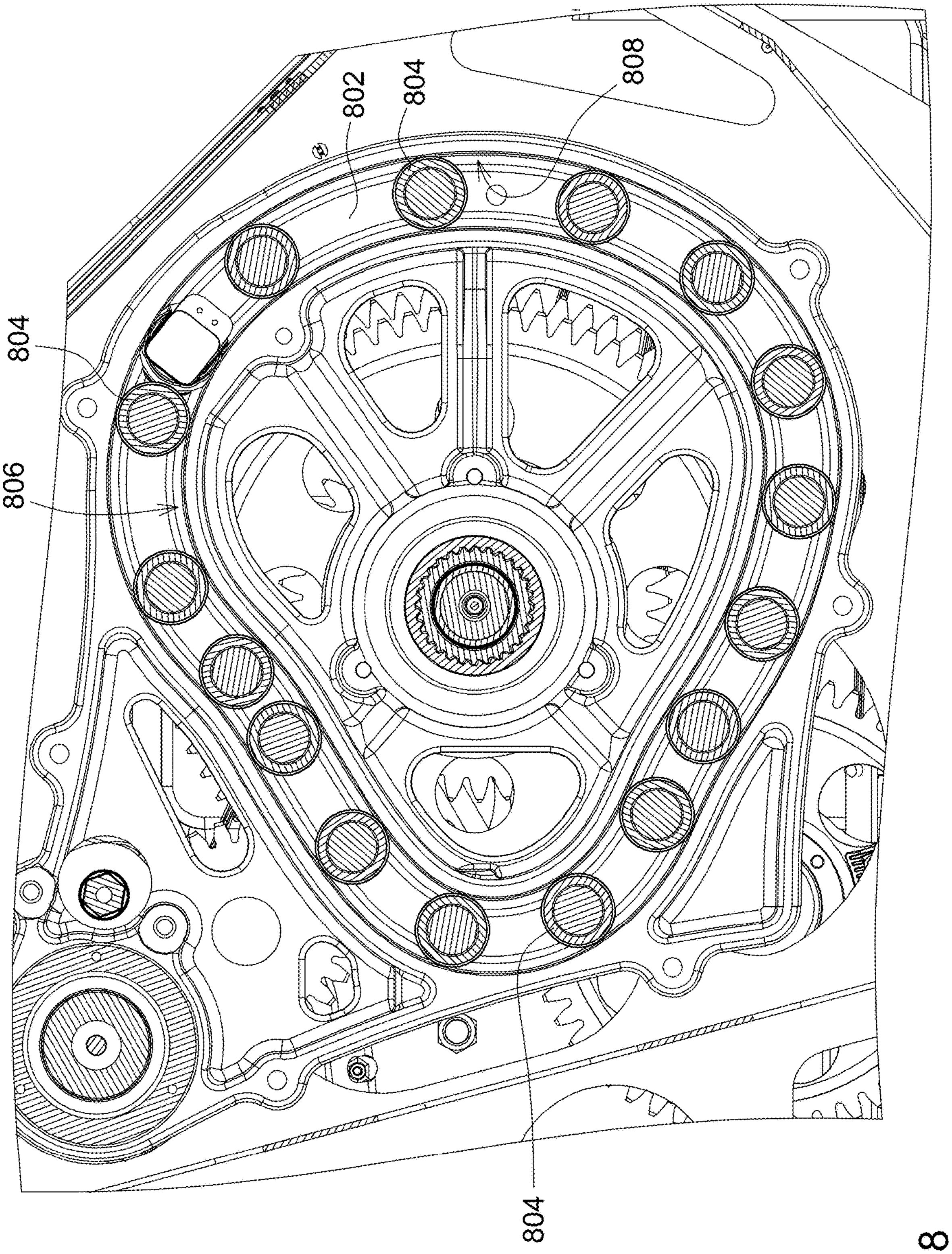
FIG. 8 is a schematic of one example implementation of a cam track assembly.
Figure 9:
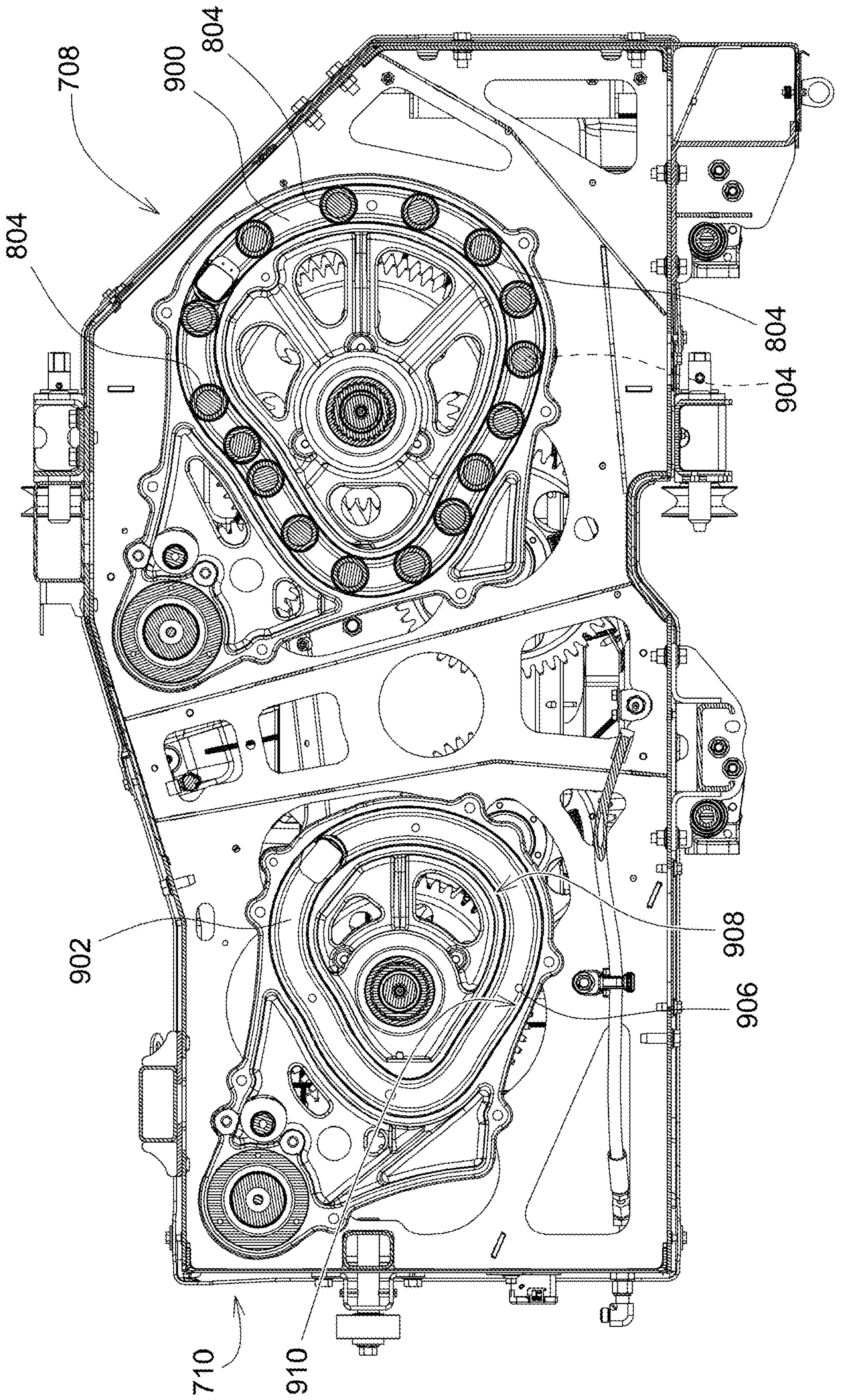
FIG. 9 is a perspective view of one example implementation of cam track assemblies of a cotton harvester unit.

In FIGS. 8 and 9, example implementations of one or more cam track assemblies are shown. In FIG. 8, for example, a cam track assembly 800 is illustrated. The cam track assembly 800 may be similar to the first cam track assembly 708 and the second cam track assembly 710 of FIG. 7. The cam track assembly 800 includes a track 802 defined between an inner wall surface 806 and an outer wall surface 808. One or more rollers 804 are configured to be operably driven about the track 802. As the one or more rollers 804 are driven about the track 802, the rollers 804 may contact the inner wall surface 806 and outer wall surface 808. The one or more rollers 804 may be in rolling or sliding contact with the two surfaces 806, 808.

Each roller 804 is coupled to a cam arm (not shown) and a picking bar (not shown). The picking bar is coupled directly to the cam arm, and the cam arm is coupled directly to the roller 804. The geometry or shape of the cam track 802 helps align and orient the picker bars relative to one another and the cotton plant during the harvesting operation. The cam arm may be oriented via the roller 804 and cam track 800 such that a picker bar or spindle is able to pull or pick the cotton from the plant during a picking operation. As it does, the picker bar or spindle is moved to sweep across a doffer to remove the cotton from the spindle. Each roller 804 moves about the track 802 to maneuver and orient the picker bar and spindle for removing the cotton from the plant, moving the spindle across the doffer to remove the cotton from the spindle, and then move the spindle under a moisture column (not shown) to clean and wet the spindle for another picking operation.

During a lubricating process, the cam track assembly 800 receives lubrication into a cavity which allows the rollers

804 to help distribute the lubricant about the track 802. The location of where the lubricant is dispensed into the cam track assembly is shown in FIG. 9. In FIG. 9, one implementation is shown of a first cam track 900 and a second cam track 902. A plurality of rollers 804 are shown in the first cam track, whereas the roller are removed from the second cam track 902 to better illustrate the location of where lubricant enters. As shown, in one implementation a first opening 904 is shown in the first cam track 900 and a second opening 906 is shown in the second cam track 902. Each of the first and second openings 904, 906 are located between an inner wall 908 and an outer wall 910 that defines the cam track. Each opening may be threaded to allow a fitting (e.g., fittings 708, 710) to be threadably coupled to the opening for dispensing lubricant into the cam track via the opening. In other implementations, the fitting may be coupled to the opening via press-fit, a mechanical fastener, welding, adhesive, or in another known manner.

In some implementations, the first and second openings 904, 906 may be located at any location in the cam track between the inner wall 908 and outer wall 910. In several implementations, the first and second openings 904, 906 may be located offset from a center of the track and adjacent to the inner wall 908. In other implementations, the first and second openings 904, 906 may be located offset from a center of the track and adjacent to the outer wall 910. In the illustrated implementation of FIG. 9, the first and second openings 904, 906 are located offset from a center of the cam tracks 900, 902, respectively, and positioned against or in close proximity to the outer wall 910. In this implementation, the rollers 804 are designed to move about the cam track quickly enough to prevent or reduce the amount of lubricant from leaking past the rollers 804. Moreover, the rollers 804 contact the lubricant as it is dispensed into the cavity formed by the cam track 900, 902 and increases the roller and lubricant contact with the track. The lubricant may also flow along the outer wall 910 such that the rollers 804 are able to equally distribute the lubricant about the outer wall 910 about the perimeter of the cam track. Further, as the rollers 804 move about the cam track 900, 902, the contact between the rollers 804 and the lubricant can also distribute the lubricant along the inner wall 908 and at locations along the track 900, 902 between the inner wall 908 and the outer wall 910.

As described previously, in some implementations, the secondary distributor 600 is configured to distribute lubricant to the first cam track assembly 708 and second cam track assembly 710 during a lubricating operation. As also noted above, in other implementations, the secondary distributor 600 may be configured to distribute lubrication to the idler gear assemblies or drum assemblies first. In any event, referring to the implementations shown in FIGS. 10-17, the lubrication of the drive gear assemblies and idler gear assemblies will now be described.

As described above, during a lubricating process of a conventional picker unit, the cotton harvester is reduced to a low idle speed and/or shifted into a park mode before the lubricating process is initiated. As a result, the lubricating process cannot be performed while the cotton harvester is performing a harvesting operation. A timer is often used to trigger when it is time to perform another lubricating process. Thus, an operator may perform a lubricating process before the harvesting operation (e.g., in the morning) and then after a period of time (e.g., several hours of operation) the timer alerts the operator to reduce the machine to a slow idle speed to perform another lubricating process. By discontinuing the harvesting operation to re-lubricate the machine, this reduces productivity and takes more time to perform the harvesting operation.

In the present disclosure, the use of the primary distributor and secondary distributor helps overcome volume distribution issues in conventional lubrication systems. Moreover, the lubrication system of the present disclosure also allows the agricultural machine to continue performing the harvesting operation at the same time the lubrication process is being executed. In conventional machines, operating at high speeds generally results in the lubricant being flung everywhere without consistently reaching the desired locations. This is particularly true with the drive gear assemblies which rotate at high speeds during the harvesting operation. To overcome this, the lubrication system of the present disclosure is designed to dispense lubricant along different flow paths formed in the idler gear assembly such that the lubricant is able to flow to the drive gear assembly and lubricant the gears. The idler gear assemblies allow for lubrication during both harvesting at high operating speeds and at low idle speeds. This flexibility allows for improved productivity.

Figure 10:
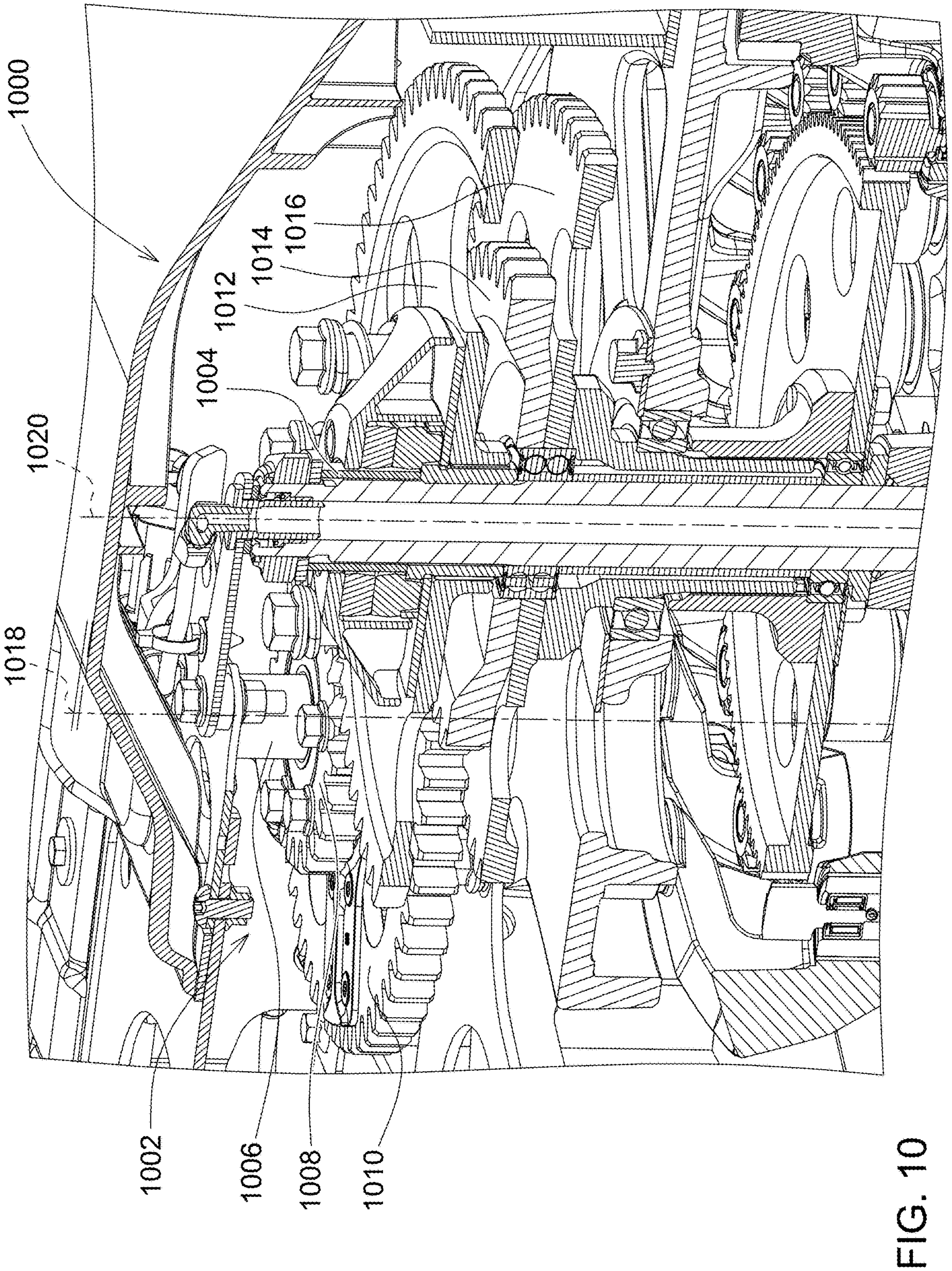
FIG. 10 is a partial cross-sectional view of one example implementation of a drive gear assembly and idler gear assembly for a cotton harvester unit.

In FIG. 10, a drum and drive gear assembly 1000 is depicted in meshing engagement with an idler gear assembly 1002. The drum and drive gear assembly 1000 includes a central drive shaft 1004 that defines a second rotation axis 1020. A drum drive gear 1012 is coupled to the drive shaft 1004 and is configured to be rotatably driven about the second rotation axis 1020 via a first idler gear 1008. The first idler gear 1008 is part of the idler gear assembly 1002, and the first idler gear 1008 is rotatably driven about a first rotation axis 1018. The first idler gear 1008 includes a plurality of teeth 1106 radially disposed about its circumference, and the drum drive gear 1012 includes a plurality of teeth radially disposed about its circumference. The gear teeth 1106 of the first idler gear 1008 is in meshing engagement with the gear teeth of the drum drive gear 1012. Power from an engine or power-generating device on the agricultural machine may be used for rotatably driving the idler gear 1008 and thus the drum drive gear 1012. In turn, the drum drive gear 1012 operably drives a drum assembly (not shown) that carries the picker bars (not shown).

Figure 17:
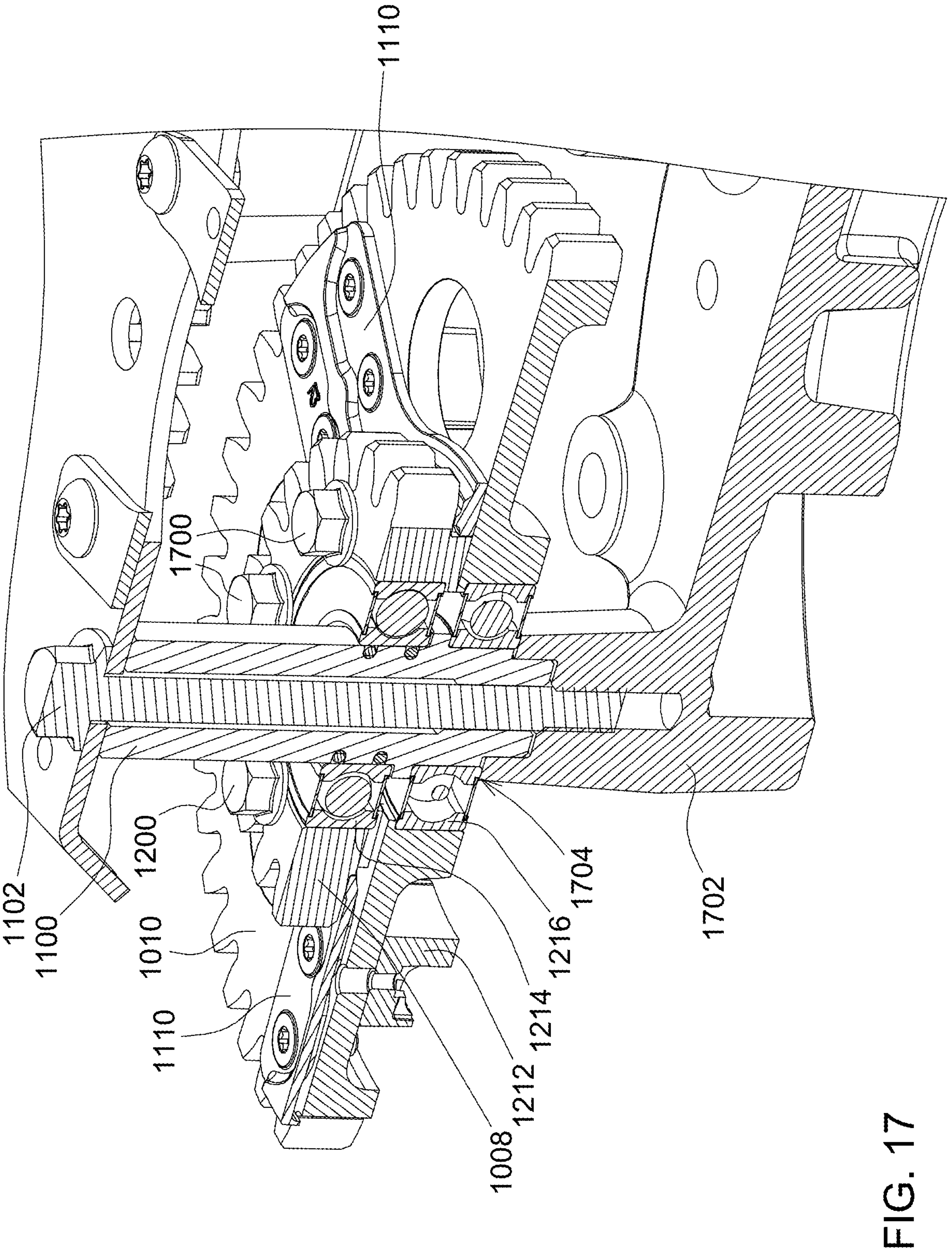
FIG. 17 is a cross-sectional perspective view of the idler gear assembly of FIG. 11.

As also shown in FIG. 10, the drum and drive gear assembly 1000 includes a spindle drive gear 1014. The spindle drive gear 1014 is located along the second rotation axis 1020 below the drum drive gear 1012. The spindle drive gear 1014 operably drives the spindles (not shown) and is rotatably driven about the second rotation axis 1020 via a second idler gear 1010. The first idler gear 1008 and the second idler gear 1010 may be coupled to one another via one or more fasteners 1700 so that the pair of idler gears rotate together, as shown in FIG. 17. In an alternative implementation (e.g., FIG. 26), the first idler gear 1008 and the second idler gear 1010 may not be coupled to one another such that both idler gears are free to rotate independently of one another. In any event, in FIG. 17, the second idler gear 1010 is part of the idler gear assembly 1002, and the second idler gear 1010 is rotatably driven about the first rotation axis 1018. The second idler gear 1010 includes a plurality of teeth 1108 radially disposed about its circumference, and the spindle drive gear 1014 includes a plurality of teeth radially disposed about its circumference. The gear teeth 1108 of the second idler gear 1010 is in meshing engagement with the gear teeth of the spindle drive gear 1014.

Further, the drum and drive gear assembly 1000 includes a doffer drive gear 1016. The doffer drive gear 1016 operably drives the doffer assembly (not shown) for removing cotton from the spindles during the harvesting operation. The doffer drive gear 1016 is located along the second rotation axis 1020 at a position below the spindle drive gear 1014. As shown best in FIGS. 12 and 14, a brush fin 1212 may be coupled to the idler gear assembly 1002 (e.g., the second idler gear 1010) for engaging with and operably driving the doffer drive gear 1016. As shown in one implementation of FIG. 14 and another implementation shown in FIG. 24, the doffer drive gear 1016 includes a plurality of gear teeth 1400 radially disposed about its outer circumference. The plurality of gear teeth 1400 of the doffer drive gear 1016 are configured to engage with the brush fin 1212, and the brush fin 1212 operably rotates the doffer drive gear 1016 about the second rotation axis 1020. In some implementations, there are a plurality of brush fins 1212 operably coupled to the second idler gear 1010 at different radial positions along an underside thereof. Each of the plurality of brush fins 1212 may come into contact or engagement with the gear teeth 1400 of the doffer drive gear 1016 during operation.

Figure 14:
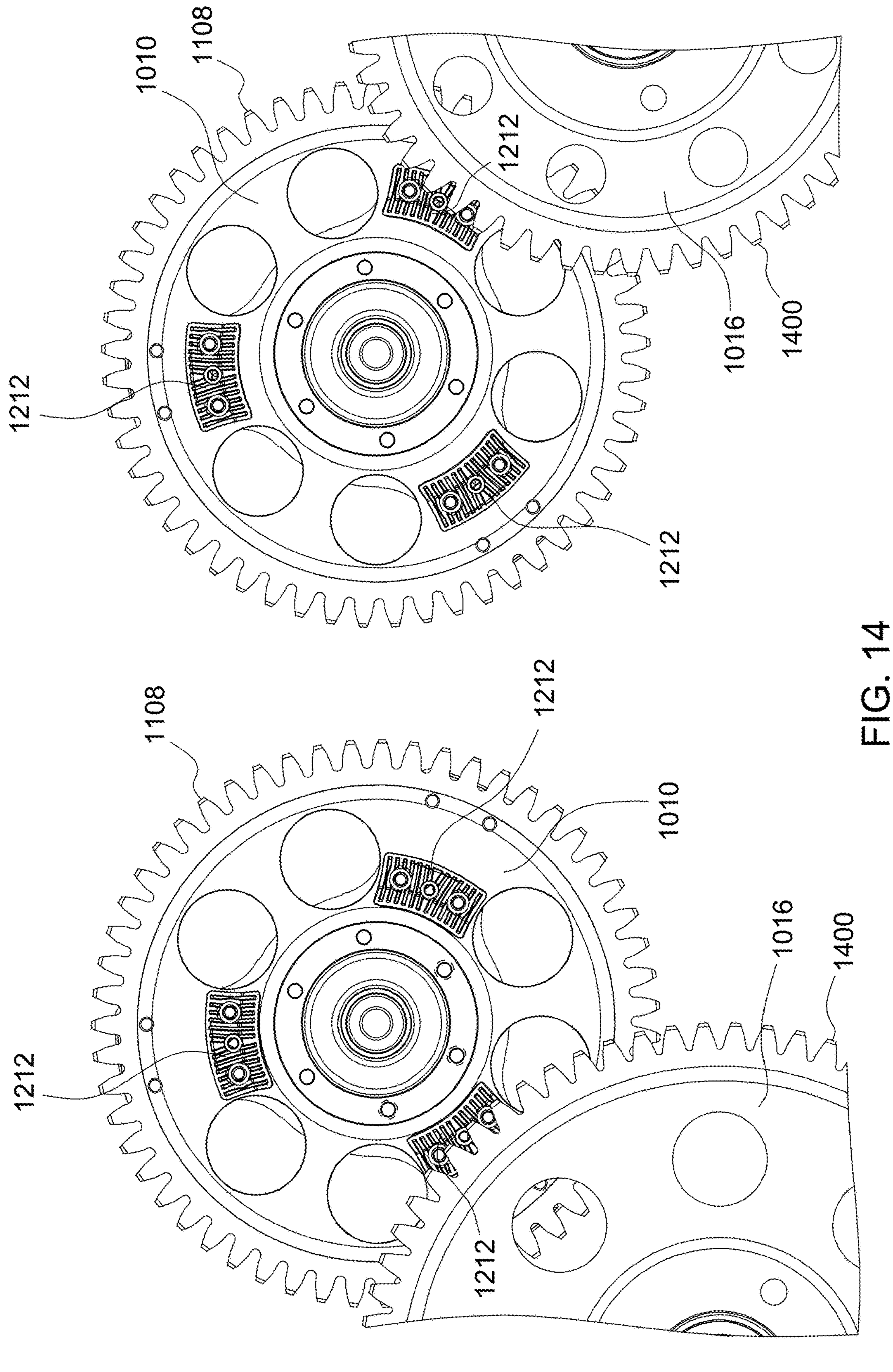
FIG. 14 is a bottom perspective view of the idler gear assemblies of FIG. 11.
Figure 24:
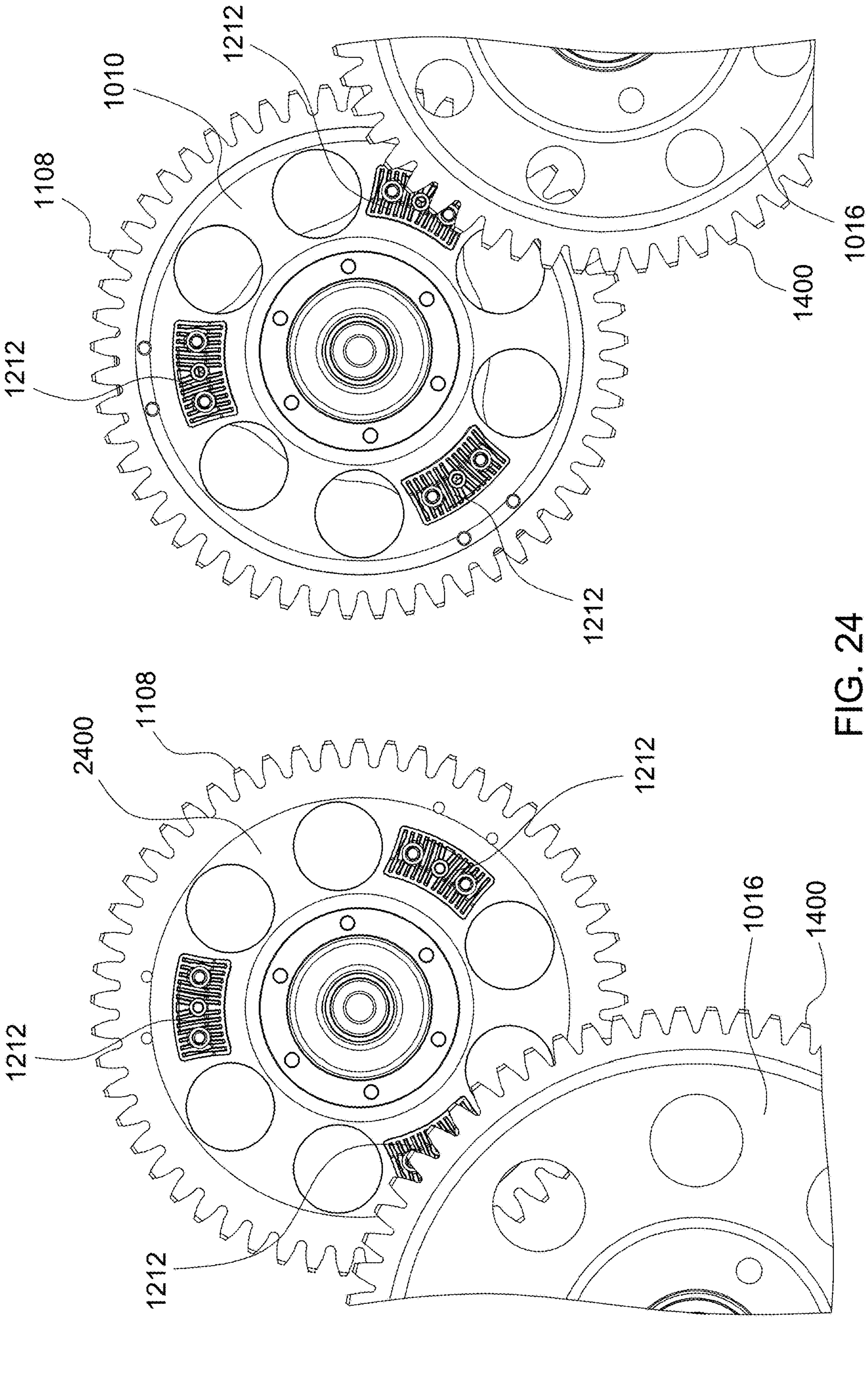
FIG. 24 is a bottom perspective view of another example implementation of the idler gear assemblies of FIG. 11.

In one implementation, the second idler gear of the front assembly (e.g., front assembly 704) and the second idler gear of the rear assembly (e.g., rear assembly 706) may be sized similarly, e.g., the diameter is the same. In another implementation, the second idler gear of the front assembly may be sized differently from the second idler gear of the rear assembly. In FIG. 14, for example, the second idler gears 1010 may have a different diameter. For example, the front assembly may include a second idler gear having a larger diameter than the second idler gear on the rear assembly. In other implementations, the rear assembly may have a second idler gear with a larger diameter than the second idler gear on the front assembly. In FIG. 24, the front assembly may include a second idler gear 2400 having a diameter that is approximately the same as the diameter of the second idler gear 1010 on the rear assembly. Each second idler gear 1010, 2400, however, includes brush fins 1212 as shown.

Figure 11:
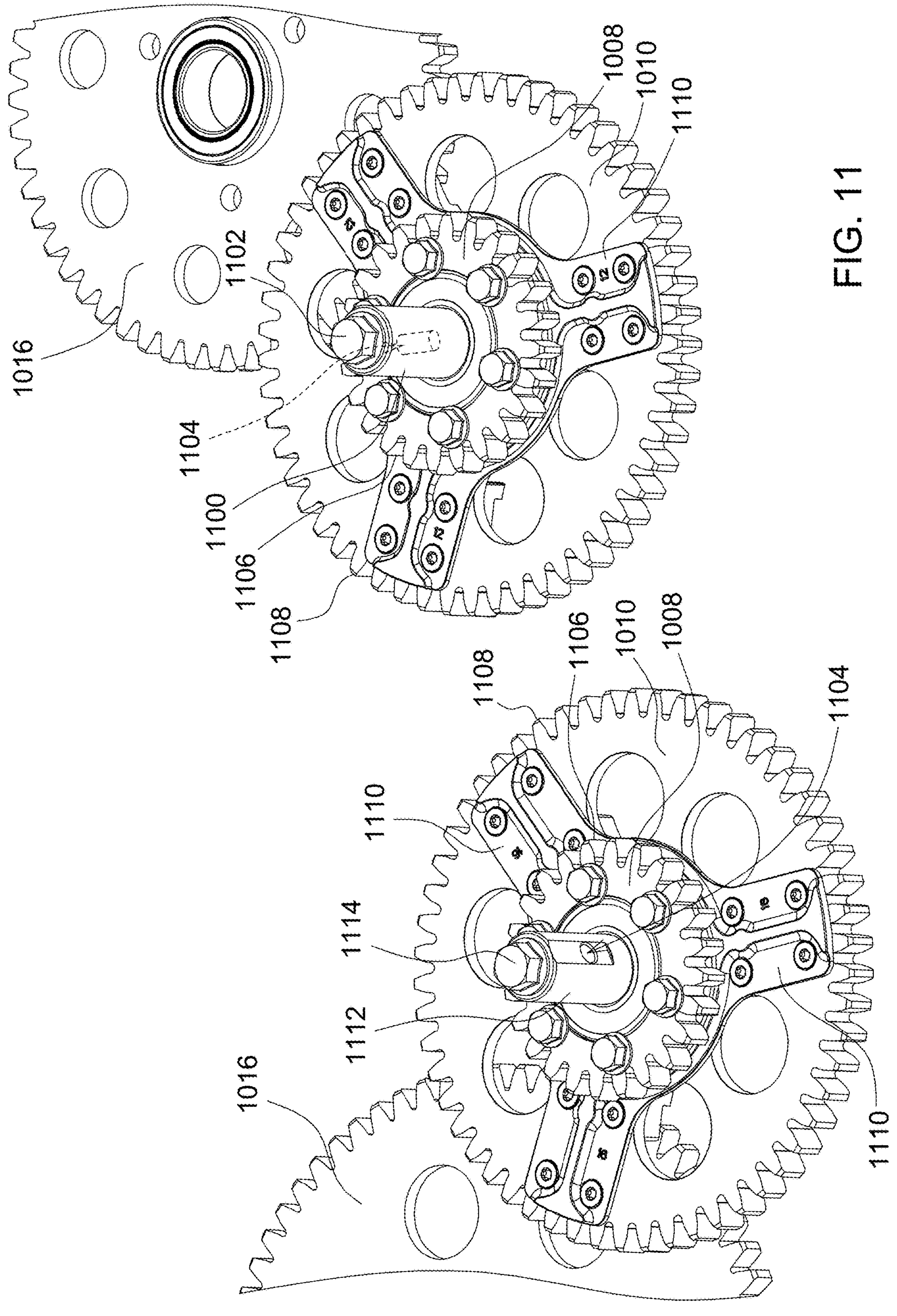
FIG. 11 is a top perspective view of one example implementation of idler gear assemblies for a cotton harvester unit.
Figure 13:
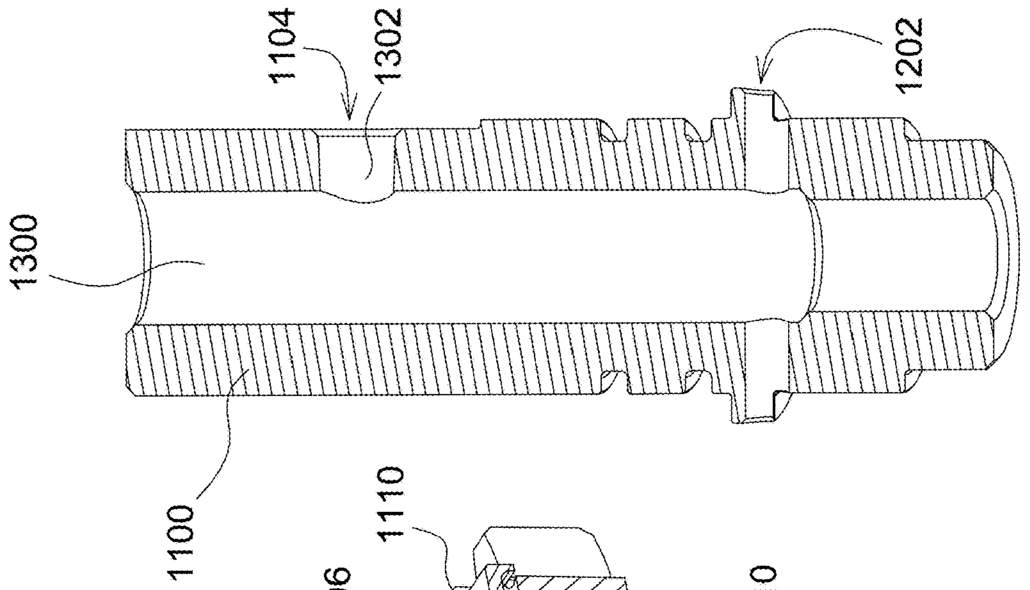
FIG. 13 is a cross-sectional view of a pin shaft of the idler gear assembly of FIG. 12.
Figure 12:
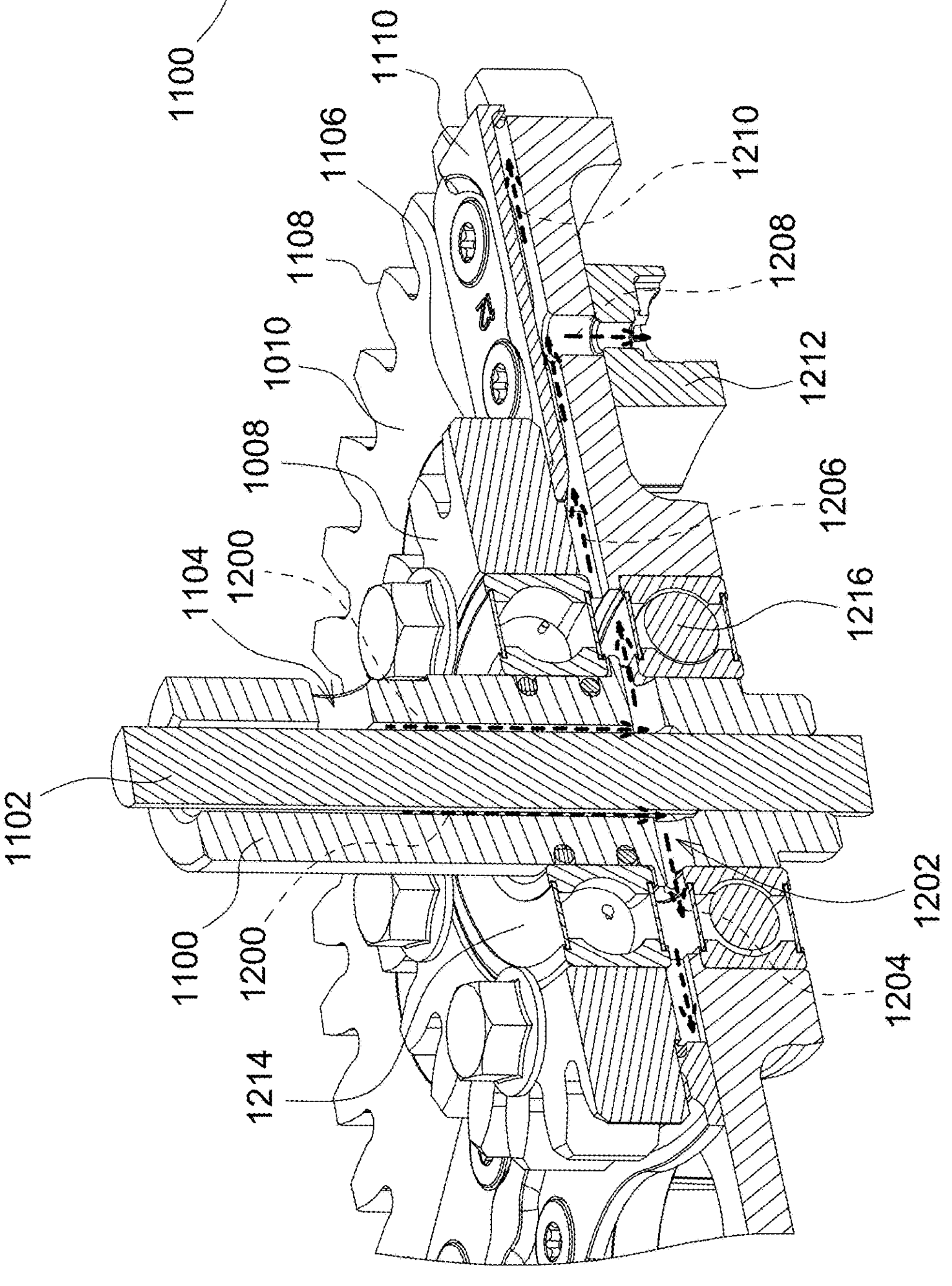
FIG. 12 is a partial cross-sectional view of one example implementation of the idler gear assembly of FIG. 11.

In FIG. 10, the idler gear assembly 1002 includes a pin shaft 1006. The pin shaft 1006 is designed with a fluid passage for receiving lubricant from a fluid fitting such as the fittings 728, 730 of FIG. 7. Referring to FIGS. 11-13, the pin shaft 1006 is shown as a first pin shaft 1100 and a second pin shaft 1112 for a first or front idler gear assembly 722 and a second or rear idler gear assembly 726, respectively. The first pin shaft 1100 and the second pin shaft 1112 include inlets that are fluidly coupled to a fluid passageway that allows lubricant to flow along an inner diameter of the respective pin before the fluid passageway is intersected by a fluid channel that distributes the lubricant radially outward from the idler gear assembly. In particularly, the first pin shaft 1100 includes an internal bore defined therethrough as shown in the implementation of FIG. 13. A first inlet 1104 is formed in the first pin shaft 1100 via an inlet channel 1302. A fluid fitting such as fluid fitting 728 of FIG. 7 may be coupled to the first inlet 1104. In some implementations, the first inlet 1104 may be threaded such that the fluid fitting is threadably coupled to the first inlet 1104. In other implementations, the fluid fitting 728 may be coupled to the first inlet 1104 via press fit, a mechanical fastener, welding, adhesive, or any other known manner.

A first bolt 1102 passes through the internal bore 1300 of the first pin shaft 1100 for coupling the plurality of idler gears to one another in the idler gear assembly. The first bolt 1102 has an outer diameter that is less than the inner diameter of the internal bore 1300. Thus, lubricant can be distributed into the first inlet 1104 from a fluid line 732 coupled between the secondary distributor 600 and the fluid fitting 728. As lubricant is supplied to the first inlet 1104, the lubricant flows through the inlet channel 1302 and into the fluid passageway formed between the first pin shaft 1100 and the first bolt 1102. As shown in FIG. 12, the lubricant is able to flow in a first flow direction indicated by arrow 1200 between the first bolt 1102 and the inner diameter of the first pin shaft 1100.

As shown in the implementation of FIGS. 12 and 13, the first pin shaft 1100 includes a cross-drilled opening 1202 that intersects the fluid passageway. As lubricant flows down the fluid passageway, the lubricant reaches the intersection of the opening 1202 such that the lubricant is able to flow radially outward. More specifically, with reference to FIG. 12, a first portion of the lubricant flows radially outward in a second flow direction 1204 and a second portion of the lubricant flows in a third flow direction 1206. The idler gear assembly may include one or more bearings such as a first bearing 1214 and a second bearing 1216. Alternatively, the first bearing 1214 and second bearing 1216 may be a single bearing. As shown in FIG. 17, the second bearing 1216 may be located below the first bearing 1214 and supported by a portion of a cam track assembly 1702 (e.g., the first cam track assembly 708 or second cam track assembly 710 of FIG. 7). The cam track assembly 1702 may form a surface upon which the second bearing 1216 contacts to form an interface 1704. Between the one or more fasteners 1700 and the cam track assembly 1702, the first bearing 1214, the second bearing 1216, and the distributor plate 1110 may be compressed together. As such, the lubricant is able to flow through or around the bearings 1214, 1216 for lubrication.

Figure 15:
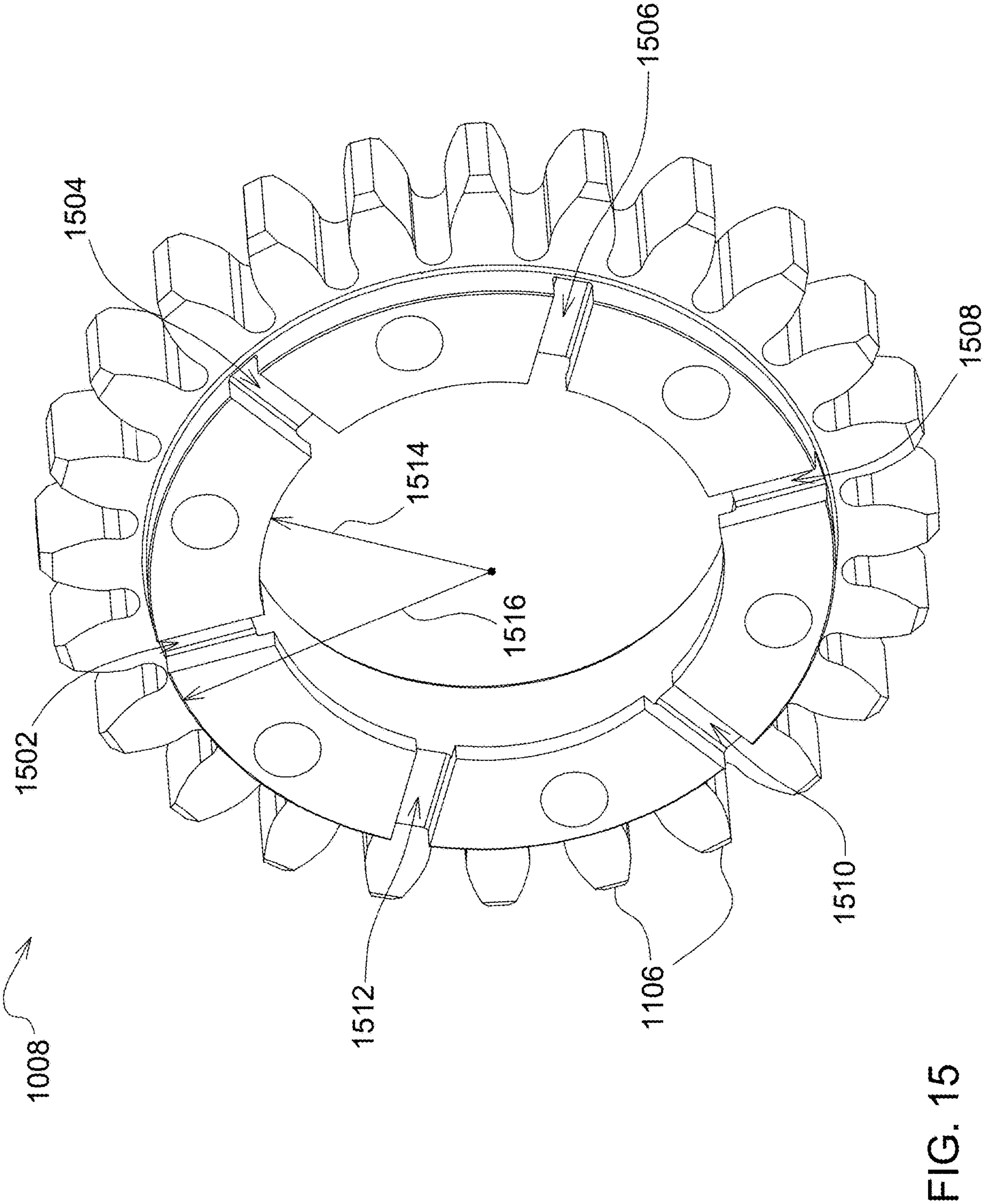
FIG. 15 is a perspective view of one example implementation of an idler gear of the idler gear assemblies of FIG. 11.

As the lubricant flows along the second flow direction 1204, the lubricant is able to lubricate the first idler gear 1008 and the drum drive gear 1012. With reference to FIG. 15, the first idler gear 1008 includes an inner diameter 1514 and an outer diameter 1516. In addition, the first idler gear 1008 includes a plurality of fluid channels formed therein between the inner diameter 1514 and the outer diameter 1516. In the implementation of FIG. 15, the fluid channels are formed on a bottom surface of the first idler gear 1008. In other implementations, the fluid channels may be formed through a different surface of the gear and/or as through openings in the gear. In the illustrated implementation of FIG. 15, the plurality of fluid channels includes a first fluid channel 1502, a second fluid channel 1504, a third fluid channel 1506, a fourth fluid channel 1508, a fifth fluid channel 1510, and a sixth fluid channel 1512.

In several implementations, one or more of the plurality of fluid channels is configured to distribute the lubricant to the spindle drive gear 1014 and the doffer drive gear 1016. In one implementation, for example, two or more of the plurality of fluid channels distribute lubricant to the spindle drive gear 1014 and two or more of the plurality of fluid channels distribute lubricant to the doffer drive gear 1016. In another implementation, three or more of the plurality of fluid channels distribute lubricant to the spindle drive gear 1014 and three or more of the plurality of fluid channels distribute lubricant to the doffer drive gear 1016.

In some implementations, the first idler gear 1008 includes two of more fluid channels. In other implementations, the first idler gear 1008 includes three or more fluid channels. In another implementation, the first idler gear 1008 includes four or more fluid channels. In a different implementation, the first idler gear 1008 includes five or more fluid channels. In yet another implementation, the first idler gear 1008 includes six or more fluid channels. In yet other implementations, the first idler gear 1008 is configured to distribute lubricant to the drum drive gear 1012, the spindle drive gear 1014, and/or the doffer drive gear 1016.

As the second portion of the lubricant flows along the third flow direction 1206, a portion of the lubricant flows along a fourth flow direction 1208 towards the brush fin 1212 and another portion of the lubricant flows along a fifth flow direction 1210 to the outer diameter of the second idler gear 1010. The portion of lubricant that flows along the fourth flow direction 1208 is able to lubricate the doffer drive gear 1016, whereas the portion of lubricant that flows along the fifth flow direction 1210 is able to lubricate the drum drive gear 1012.

The idler gear assembly also includes a distributor plate 1110 as shown in FIGS. 11-17. In FIGS. 16A-B, the distributor plate 1110 is formed as a body having a plurality of arm portions. For example, in the illustrated implementation, the distributor plate 1110 includes a first arm portion 1606, a second arm portion 1608, and a third arm portion 1610. Each arm portion extends radially outward. In one implementation, each arm portion is angularly offset from the other arm portions. In the implementation of FIGS. 16A-16B, each arm portion may be angularly offset by 120° from the other arm portions. In an implementation with four arm portions, for example, each arm portion may be angularly offset by 90° from two of the other three arm portions. In some implementations, the arm portions may not be angularly offset from the other arm portions by equal distances.

Figure 16B:
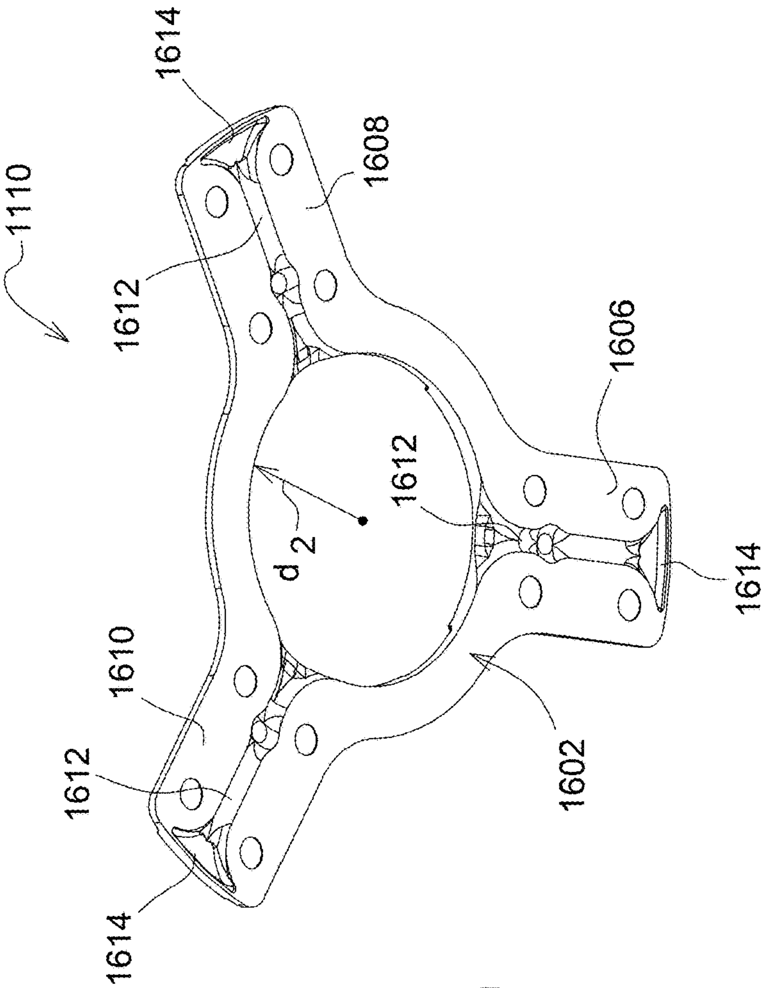
FIG. 16B is a bottom perspective view of one example implementation of a distributor plate of the idler gear assemblies of FIG. 11.
Figure 16A:
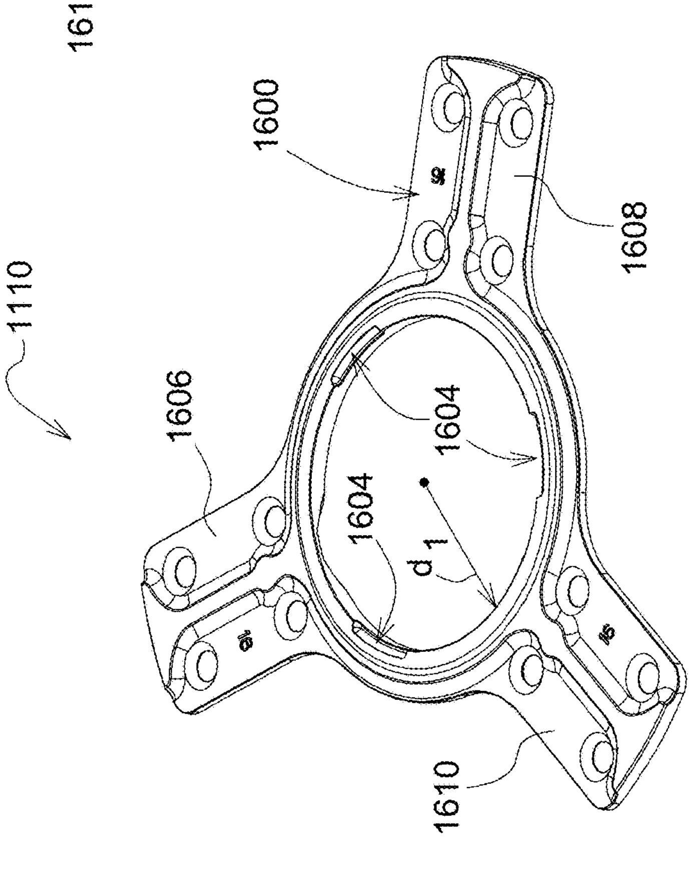
FIG. 16A is a top perspective view of one example implementation of a distributor plate of the idler gear assemblies of FIG. 11.

In FIG. 16A, a top surface 1600 of the distributor plate 1110 is shown. The top surface 1600 of the distributor plate 1110 includes an inner radius $d_1$. One or more fluid cutouts 1604 or cavities are formed in the top surface 1600 of the distributor plate 1110 along portions of the inner radius $d_1$. In the illustrated implementation of FIG. 16A, there are three fluid cutouts 1604 formed in the top surface 1600. In another implementation, there may be two or more fluid cutouts 1604. In other implementations, there may be four or more fluid cutouts 1604. In some implementations, there may be five or more fluid cutouts 1604. During the lubricating process, lubricant flows along the second flow direction 1204 and fills each of the one or more fluid cutouts 1604 formed in the top surface 1600 of the distributor plate 1110. As lubricant fills each of the one or more fluid cutouts 1604, the first idler gear 1008 is lubricated. Specifically, lubricant is able to flow to the gear teeth 1106 of the first idler gear 1008 where the lubricant is distributed to the gear teeth of the drum drive gear 1012. Some of the lubricant may also be distributed to the second idler gear 1010 and/or the spindle drive gear 1014.

As shown in FIG. 16B, a bottom surface 1602 of the distributor plate 1110 includes an inner radius $d_2$. In one implementation, the inner radius $d_1$ of the top surface 1600 is the same as the inner radius $d_2$ of the bottom surface 1602. In other implementations, the inner radius $d_1$ of the top surface 1600 is different from the inner radius $d_2$ of the bottom surface 1602. As shown on the bottom surface 1602, each arm portion includes a fluid passage 1612 formed therein. Each fluid passage 1612 may be formed from the inner radius $d_2$ of the bottom surface 1602 to an outermost end portion of the arm portion (e.g., an outer diameter of the distributor plate 1110). In some implementations, the outermost end portion of each arm portion may open up forming a collection area or cavity 1614. In yet other implementations, the fluid passage 1612 may have one or more openings or ports formed along the fluid passage 1612. In one implementation, the fluid passage 1612 has a first width or diameter, and the cavity 1614 has a second width or diameter. The first width or diameter of the fluid passage 1612 is smaller than the second width or diameter of the cavity 1614. The outlet of each fluid passage 1612 may intersect with the cavity 1614 such that the cavity 1614 has a smaller width or diameter at the intersection point with the outlet of the fluid passage than its width or diameter at the outermost end of the arm portion. In the implementation of FIG. 16B, the cavity 1614 may form a Y-shaped or V-shaped cavity. As lubricant flows through the fluid passage 1612 and cavity 1614 in each arm portion, the lubricant may flow in the fourth flow direction 1208 to lubricate the doffer drive gear 1016 or the fifth flow direction 1210 to lubricate the second idler gear 1010 and spindle drive gear 1014.

Figure 25B:
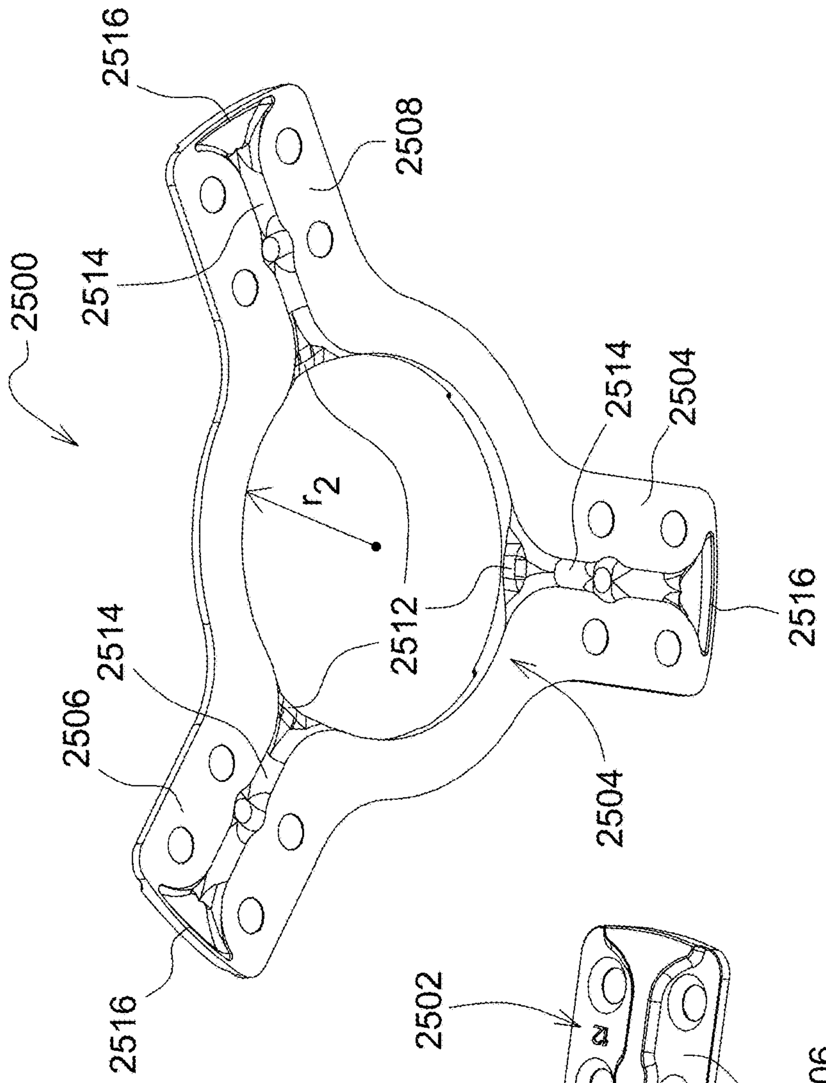
FIGS. 25A-B are a top and bottom perspective views, respectively, of another example implementation of a distributor plate of the idler gear assemblies of FIG. 11.
Figure 25A:
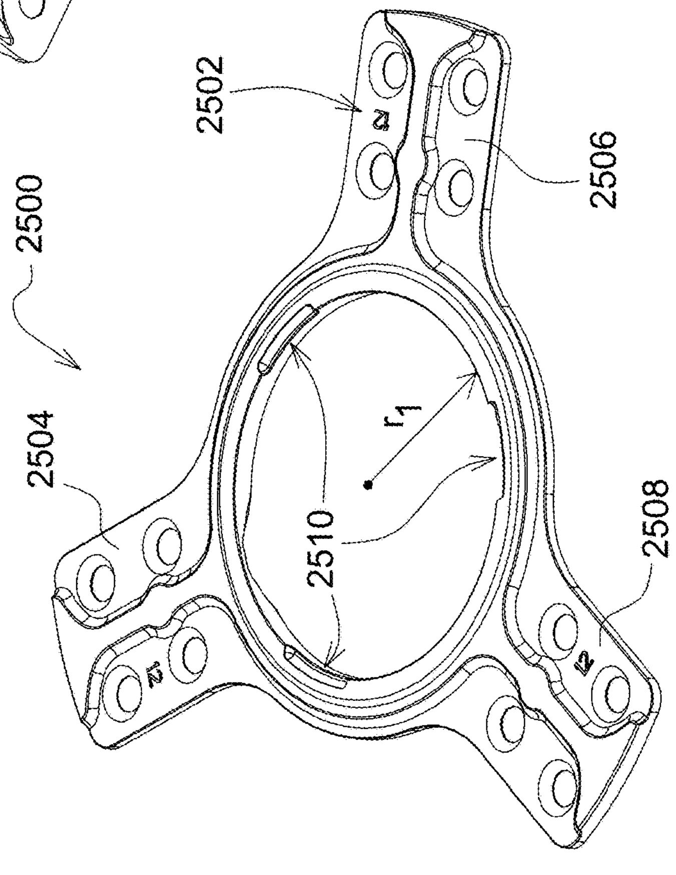

Another implementation of a distributor plate 2500 is shown in FIGS. 25A-B. The distributor plate 2500 is similar to the distributor plate 1110 of FIGS. 16A-B. In particular, the distributor plate 2500 includes a top surface 2502 (FIG. 25A) and a bottom surface 2504 (FIG. 25B). As shown, the top surface 2502 of the distributor plate 2500 includes a first inner radius, $r_1$, and the bottom surface 2504 includes a second inner radius, $r_2$. The distributor plate 2500 may also include one or more cutouts 2510 or cavities formed in the top surface 2502. The cutouts 2510 may facilitate the transfer of lubricant to grease the different idler gears, as described above. In FIGS. 25A-B, there are three fluid cutouts 2510. In other implementations, there may be four or more fluid cutouts 2510. In some implementations, there may be five or more fluid cutouts 2510. During the lubricating process and similar to the implementation of FIG. 12, lubricant flows along the second flow direction 1204 and fills each of the one or more fluid cutouts 2510 formed in the top surface 2502 of the distributor plate 2500. As lubricant fills each of the one or more fluid cutouts 2510, the first idler gear 1008 is lubricated. Specifically, lubricant is able to flow to the gear teeth 1106 of the first idler gear 1008 where the lubricant is distributed to the gear teeth of the drum drive gear 1012. Some of the lubricant may also be distributed to the second idler gear 1010 and/or the spindle drive gear 1014.

In FIGS. 25A-B, the distributor plate 2500 is formed as a body having a plurality of arm portions similar to that of the distributor plate 1110. For example, in the illustrated implementation of FIGS. 25A-B, the distributor plate 2500 includes a first arm portion 2504, a second arm portion 2506, and a third arm portion 2508. Each arm portion extends radially outward. In one implementation, each arm portion is angularly offset from the other arm portions. In the implementation of FIGS. 25A-16B, each arm portion may be angularly offset by 120° from the other arm portions. In an implementation with four arm portions, for example, each arm portion may be angularly offset by 90° from two of the other three arm portions. In some implementations, the arm portions may not be angularly offset from the other arm portions by equal distances.

Referring to FIG. 25B, the bottom surface 2504 of the distributor plate 2500 includes an inner radius $r_2$. In one implementation, the inner radius $r_1$ of the top surface 2502 is the same as the inner radius $r_2$ of the bottom surface 2504. In other implementations, the inner radius $r_1$ of the top surface 2502 is different from the inner radius $r_2$ of the bottom surface 2504. As shown on the bottom surface 2504, each arm portion includes a fluid passage 2514 formed therein. Each fluid passage 2514 may be formed from the second inner radius $r_2$ of the bottom surface 2504 to an outermost end portion of the arm portion (e.g., an outer diameter of the distributor plate 2500). At the second inner radius $r_2$, the fluid passage 2514 may form an inlet or inlet cavity 2512 for lubricant or other fluid to enter the fluid passage 2514. The lubricant or other fluid may flow from the inlet 2512 through the fluid passage 2514 to an outlet or outlet cavity 2516. Similar to the distributor plate 1110 described above, the outermost end portion of each arm portion may open up forming the outlet or cavity 2516. In yet other implementations, the fluid passage 2512 may have one or more openings or ports formed along the fluid passage 2514. In one implementation, the fluid passage 2514 has a first width or diameter, and the inlet 2512 has a second width or diameter, and the outlet has a third width or diameter. The first width or diameter of the fluid passage 2514 may be smaller than the second and third widths or diameters of the inlet 2512 and outlet 2516, respectively. The outlet 2516 of each fluid passage 2514 may intersect with the fluid passage 2514 such that the outlet or outlet cavity 2516 has a smaller width or diameter at the intersection point with the fluid passage 2514 than its width or diameter at the outermost end of the arm portion. The same may be true with respect to the inlet 2512. In the implementation of FIG. 25B, the inlet and outlet may form a Y-shaped or V-shaped cavity. As lubricant flows through the fluid passage 2514 and outlet 2516 in each arm portion, for example, the lubricant may flow in the fourth flow direction 1208 to lubricate the doffer drive gear 1016 or the fifth flow direction 1210 to lubricate the second idler gear 1010 and spindle drive gear 1014. In FIG. 11, the second pin shaft 1112 is similarly structured as the first pin shaft 1100. A second bolt 1114 may be disposed within an internal bore 1300 of the second pin shaft 1112 such that a flow passage is formed between the internal bore and the second pin shaft 1112 to facilitate the lubrication of a second drum and drive gear assembly.

Figure 26:
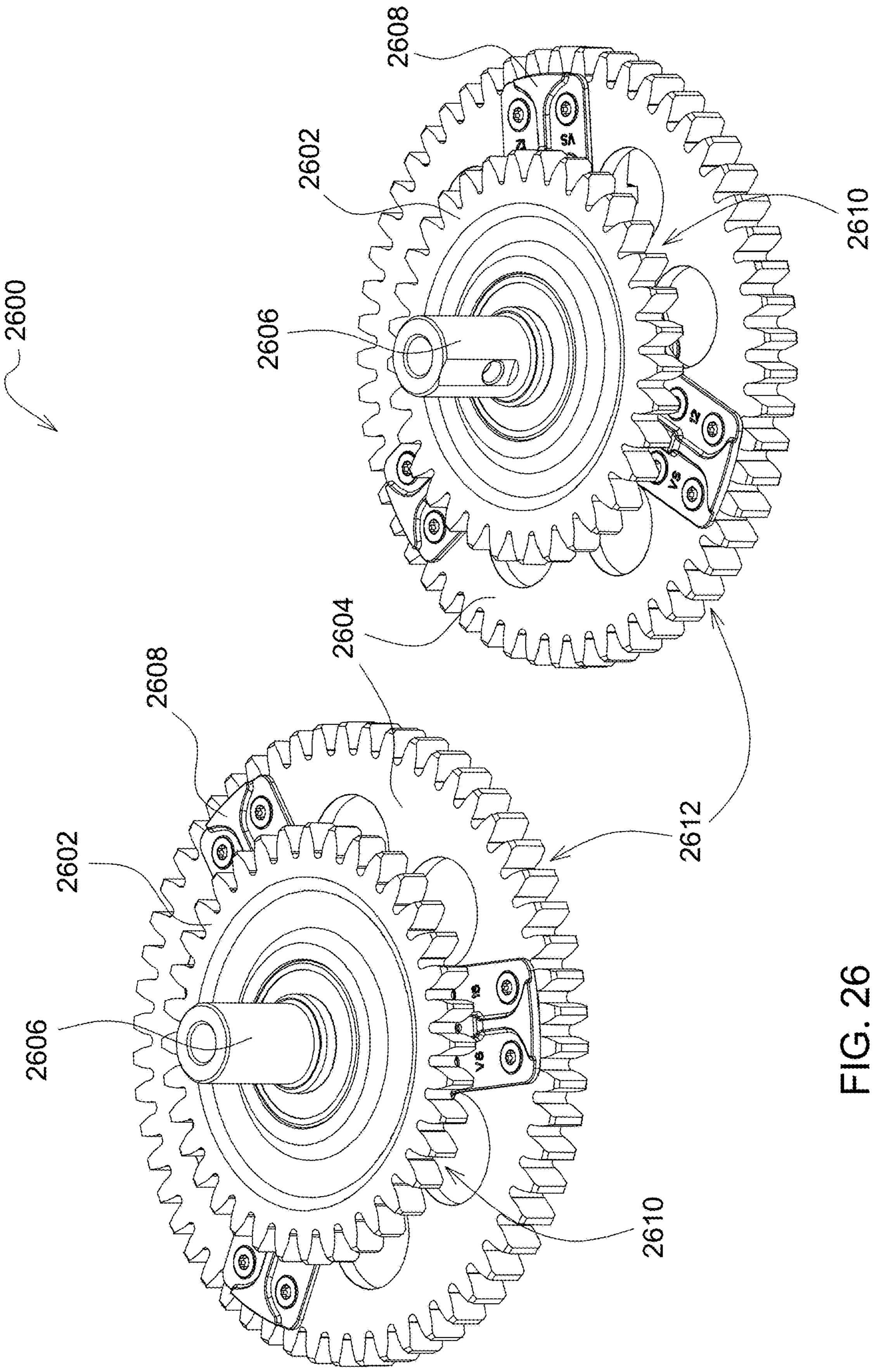
FIG. 26 is a perspective view of an idler gear assembly for a cotton harvester.

Referring to FIG. 26 of the present disclosure, an alternative implementation of an idler gear assembly 2600 is illustrated. In this implementation, the idler gear assembly 2600 may be similar to the idler gear assembly 1002 of FIG. 10. The idler gear assembly 2600, for example, may include a first idler gear 2602 and a second idler gear 2604. A distributor plate 2608 may be disposed between the first and second idler gears. A pin shaft 2606 may operably rotate the idler gear assembly 2600 about a rotation axis. Contrary to the idler gear assembly 1002 of FIG. 10, however, the idler gear assembly 2600 of FIG. 26 is provided whereby the first idler gear 2602 and the second idler gear 2604 are not coupled to one another by fasteners. In this implementation, the first idler gear 2602 and the second idler gear 2604 are able to rotate independently of one another. In some implementations, the first idler gear 2602 may be larger (e.g., have a larger diameter) than the first idler gear 1008 of the idler gear assembly 1002 in FIG. 10. In several implementations, the first idler gears 2602 and second idler gears 2604 may include different size diameters. For example, the first idler gear 2602 may have at least a smaller diameter for some implementations and a larger diameter in other implementations. In further implementations, the first idler gear 2602 may have two or more different diameters. Likewise, the second idler gear 2604 may have two or more different diameters. Moreover, the distributor plate 2608 may include different sizes based on the diameters of the respective idler gears 2602, 2604. In any event, the first idler gear 2602 may include a plurality of gear teeth 2610 spaced at the outer diameter thereof. Further, the second idler gear 2604 may include a plurality of gear teeth 2612 radially spaced from one another about the outer diameter of the second idler gear 2604.

Figure 27:
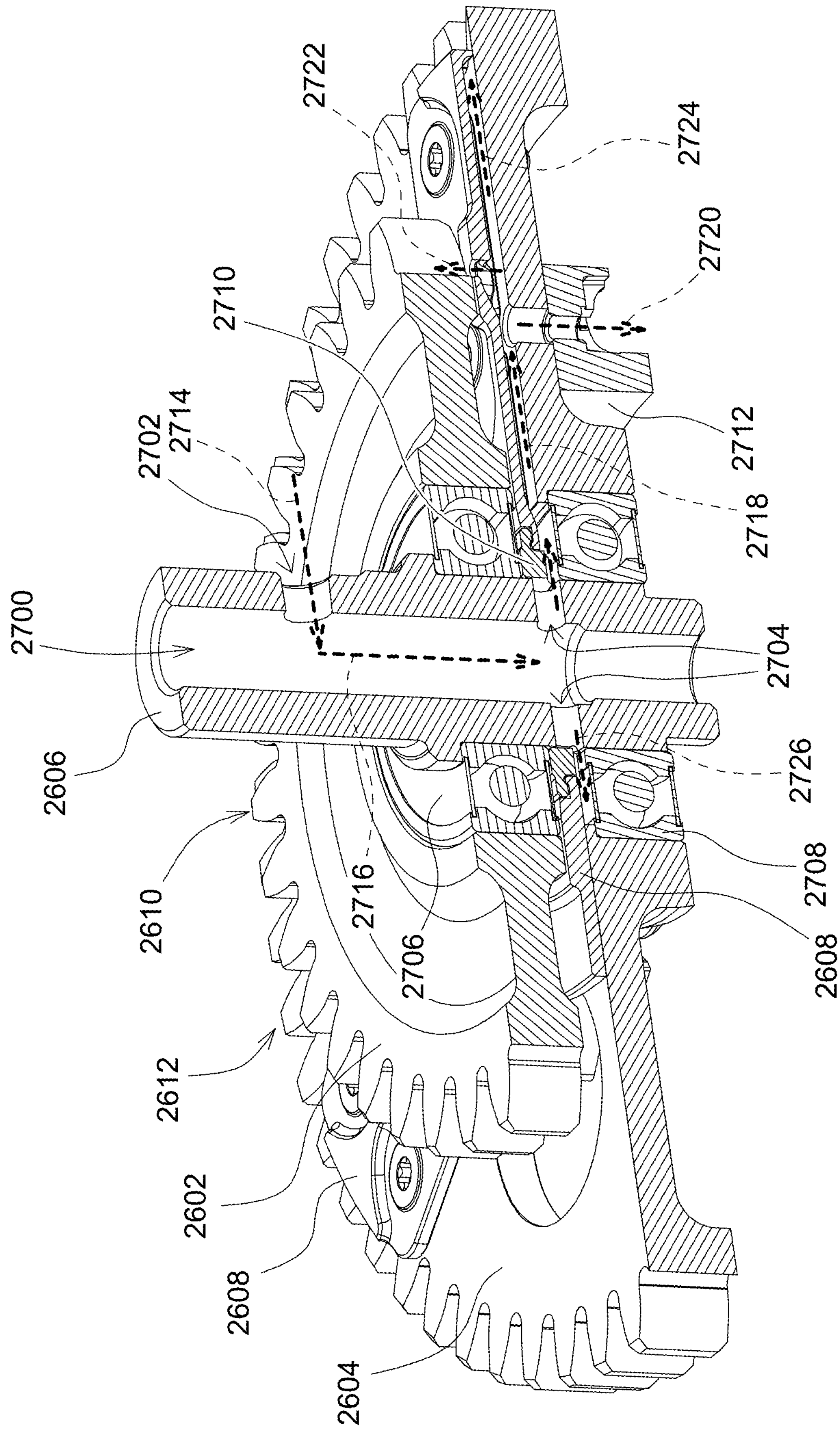
FIG. 27 is a partial perspective cross-sectional view of the idler gear assembly of FIG. 26.

The idler gear assembly 2600 is shown in greater detail in FIG. 27. Here, the pin shaft 2606 includes an internal bore 2700 with a first opening 2702 formed therein. A second cross-drilled opening 2704 is also formed in the pin shaft 2606 at a location longitudinally offset from the first opening 2702. The idler gear assembly 2600 may include one or more bearings. In FIG. 27, a first bearing 2706 and a second bearing 2708 are shown. The first and second bearings may be similar to the first bearing 1214 and second bearing 1216 described above and shown in FIG. 12. In some implementations, the first bearing 2706 and second bearing 2708 may be a single bearing.

The distributor plate 2608 may be at least partially disposed between the first bearing 2706 and the second bearing 2708 of the idler gear assembly 2600. A spacer 2710 is also located between the first and second bearings. Moreover, the spacer 2710 may be radially spaced between the pin shaft 2606 and the distributor plate 2608.

Figure 28:
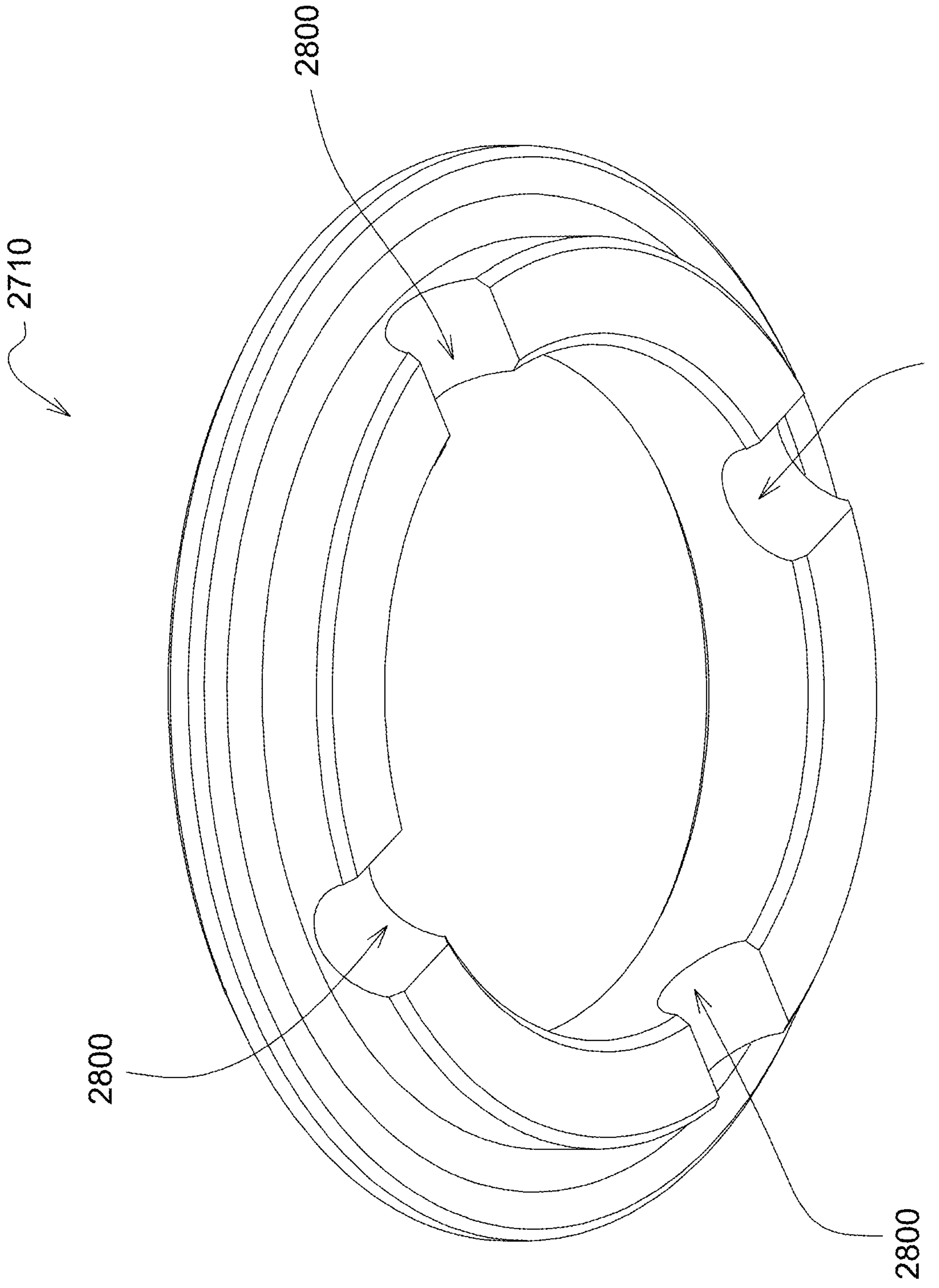
FIG. 28 is a bottom perspective view of a spacer.

The spacer 2710 is shown in greater detail in FIG. 28. Here, the spacer 2710 may include an inner diameter and an outer diameter. As shown in FIG. 28, a bottom surface of the spacer 2710 may include one or more slots 2800. In some implementations, there may be a plurality of slots 2800. In other implementations, there may be two or more slots 2800. In FIG. 28, the spacer 2710 includes four slots 2800. Each slot may be radially-shaped. Other geometries of the slot 2800 is possible including square, rectangular, triangular, or polygonal. The slots 2800 may permit lubricant to flow therethrough as will be described below.

Figure 29:
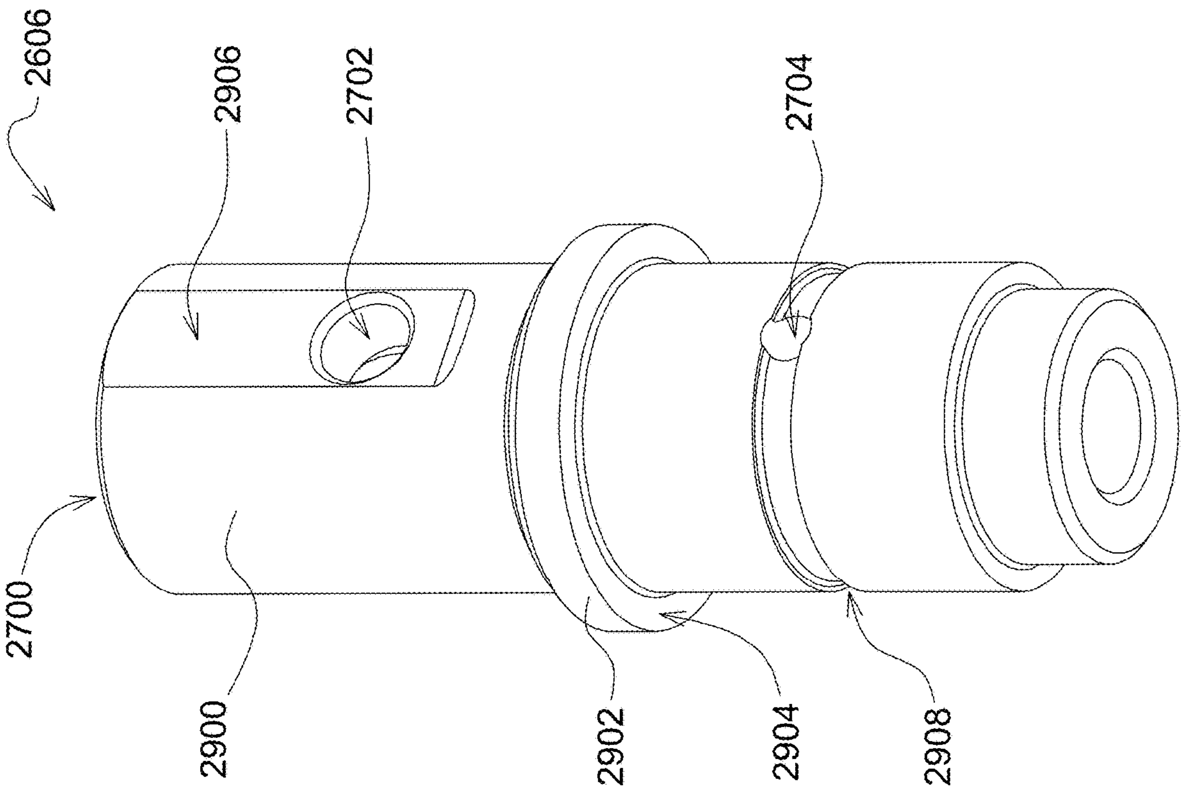
FIG. 29 is a perspective view of a pin shaft.

The pin shaft 2606 is shown in more detail in FIG. 29. Here, the pin shaft 2606 may include a generally cylindrical body 2900. At one portion of the body 2900, the pin shaft 2606 may include a reduced radial portion 2906. The first opening 2702 may be formed in the reduced radial portion 2906 as shown. At another portion of the body 2900, the pin shaft 2606 may include the second cross-drilled opening 2704. The second opening 2704 may include a pair of openings 2704 radially offset from one another. In one implementation, the pair of second openings 2704 may be radially offset by at least 90°. In another implementation, the pair of second openings 2704 may be radially offset by at least 120°. In a further implementation, the pair of second openings 2704 may be radially offset by at least 150°. In yet a further implementation, the pair of second openings 2704 may be radially offset by approximately 180°. In yet other implementations, there may be more than two second openings 2704 radially offset from one another.

The second opening 2704 may be formed in a groove 2908 in the body 2900. The second opening 2704 may be fluidly coupled to the first opening 2702 via the bore 2700. In other words, fluid may flow between the first opening 2702 and second opening 2704 through the bore 2700. The pin shaft 2606 may also include a shoulder of flange portion 2902 that protrudes radially outward from the body 2900. The shoulder or flange portion 2902 may form a surface 2904 upon which the first bearing 2706 may contact in the coupled configuration of FIG. 27. Similar to the implementation of FIG. 17, the second bearing 2708 may contact the cam track body (e.g., cam track body 1702) and form a similar interface as the interface 1704 in FIG. 17. In this manner, the first bearing 2706, the second bearing 2708, the distributor plate 2608 and the spacer 2710 are disposed between the shoulder portion 2902 of the pin shaft 2606 and the cam track body.

Referring to FIG. 27, lubricant can be distributed into the first opening 2702 of the pin shaft 2606 from a fluid line (e.g., fluid line 732) coupled between a secondary distributor 600 and a fluid fitting 728. As lubricant is supplied to the first opening 2702, the lubricant flows in a first flow direction 2714 through the first opening 2702 and into the fluid passageway formed between the pin shaft 2606 and a bolt (e.g., bolt 1102, 1114). As shown in FIG. 27, the lubricant is able to flow in a second flow direction indicated by arrow 2716 along the fluid passageway defined in the pin shaft 2606.

As described above and shown in FIG. 27, the pin shaft 2606 includes a second opening 2704 in the form of a cross-drilled opening that intersects the fluid passageway. As lubricant flows down the fluid passageway in the second flow direction 2716, the lubricant reaches the intersection of the second opening 2704 such that the lubricant is able to flow radially outward. More specifically, with reference to FIG. 27, a first portion of the lubricant flows radially outward in a third flow direction 2718 and a second portion of the lubricant flows in a seventh flow direction 1726. As previously described, the idler gear assembly 2600 may include one or more bearings such as the first bearing 2706 and the second bearing 2708.

As the lubricant flows along the third flow direction 2718, the lubricant is able to lubricate the first idler gear 2602 and the drum drive gear (not shown). The first idler gear 2602 may be structurally similar to the first idler gear 1008 with similar fluid channels as shown in FIG. 15 and described above. In several implementations, one or more of the plurality of fluid channels formed in the first idler gear 2602 is configured to distribute the lubricant to the spindle drive gear (e.g., spindle drive gear 1014) and the doffer drive gear (e.g., doffer drive gear 1016).

As the second portion of the lubricant flows along the third flow direction 2718, a portion of the lubricant flows along a fourth flow direction 2720 towards a brush fin 2712 and another portion of the lubricant flows along a fifth flow direction 2722 to the outer diameter of the second idler gear 2604. The portion of lubricant that flows along the fourth flow direction 2720 is able to lubricate the doffer drive gear, whereas the portion of lubricant that flows along the fifth flow direction 2722 is able to lubricate the drum drive gear. The brush fin 2712 of FIG. 27 may be structurally and functionally similar to the brush fin 1212 of FIG. 12.

As shown best in FIG. 27, the first idler gear 2602 may include a plurality of fluid channels that allow lubricant to flow along a sixth flow direction indicated by arrow 2722. The flow of lubricant along the sixth flow direction 2722 is similar to the flow of lubricant along flow direction 1204 of FIG. 12.

Figure 30:
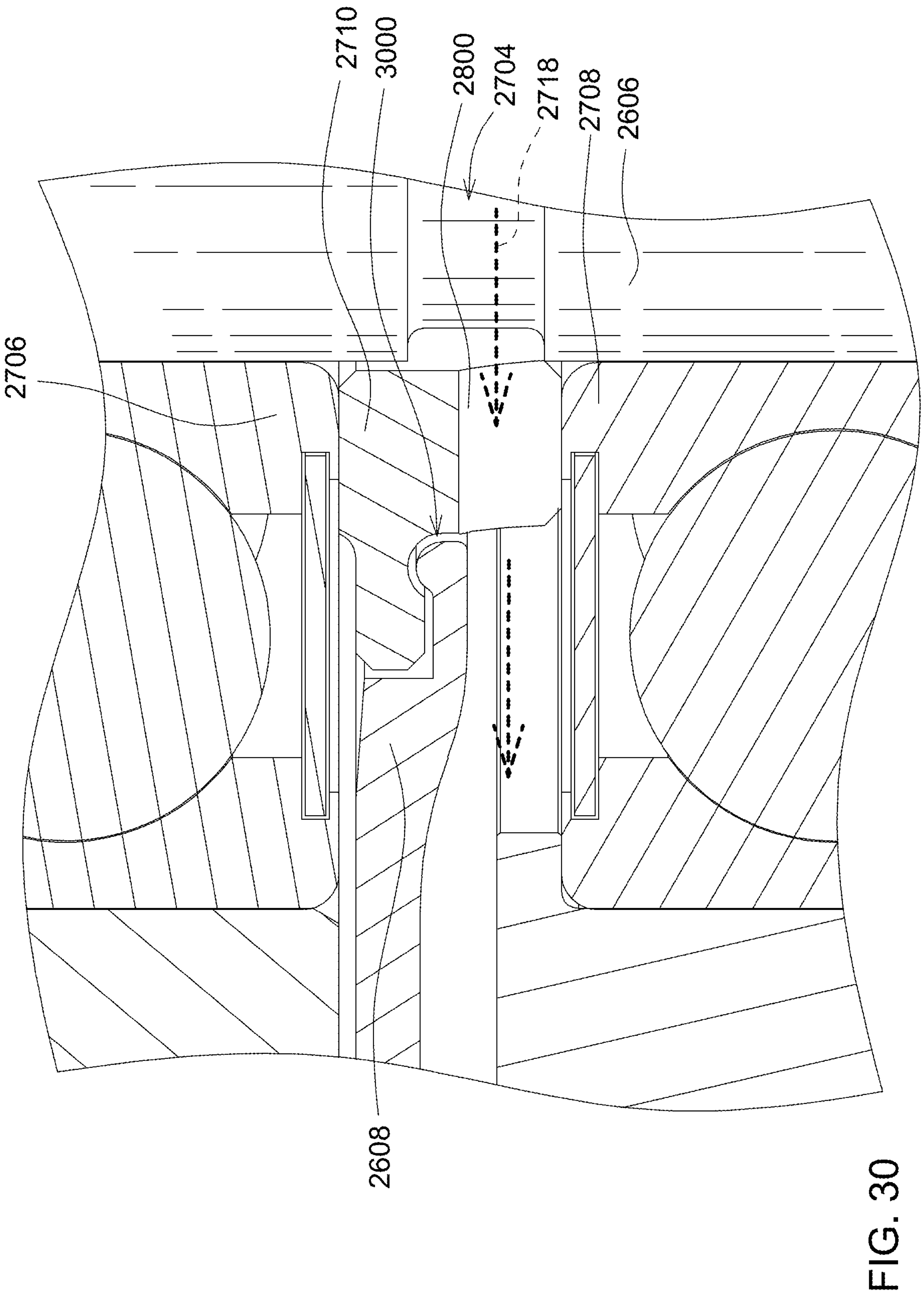
FIG. 30 is a partial cross-sectional view of the idler gear assembly of FIG. 26.

In FIG. 30, the lubricant that flows along the third flow direction 2718 and seventh flow direction 2726 is shown flowing through the second opening 2704 in the pin shaft 2606 and the slot 2800 in the spacer 2710. The lubricant is then able to flow through one or more fluid passages or channels 3112 formed in the distributor plate 2608. This will be described below in further detail. As shown in FIG. 30, a gap 3000 is formed between the interface of the spacer 2710 and the distributor plate 2608. The gap 3000 is formed as a labyrinth or circuitous path with reduced cross-section compared to the size of the second opening 2704 and slot 2800. As such, the size difference between the second opening 2704 and slot 2800 relative to the gap 3000 allows all of or the majority of lubricant to flow radially outward along flows directions 2718, 2726. A small portion of lubricant may flow into the gap 3000 in some implementations. In one implementation, the lubricant is encouraged to not flow through the gap 3000. In other implementations, most of the lubricant flows radially outward without entering the gap 3000. In several implementations, the size of the gap 3000 is restrictive such that lubricant does not flow into the gap 3000.

Figure 31B:
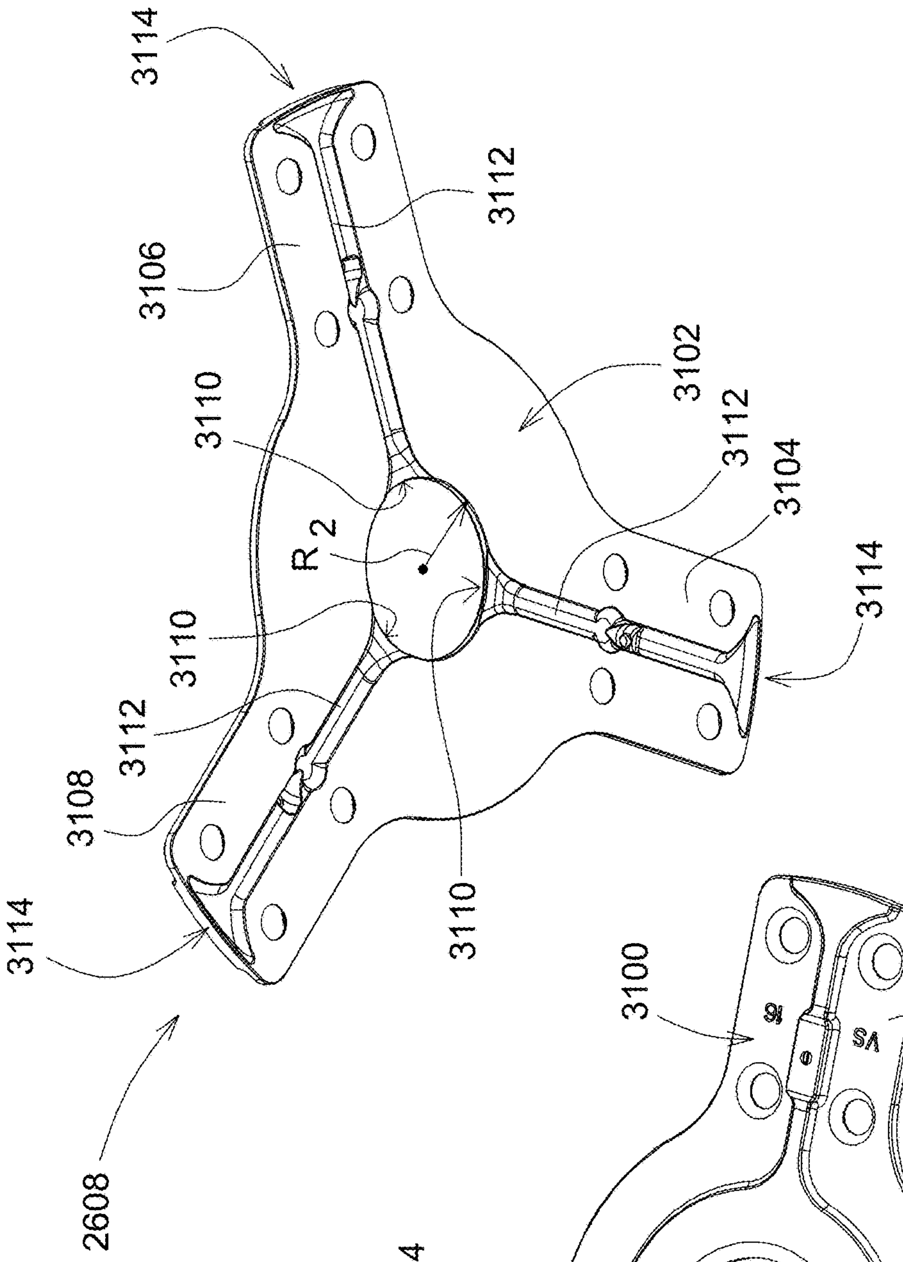
FIGS. 31A-B are a top and bottom perspective views, respectively, of another example implementation of a distributor plate of the idler gear assembly of FIG. 26.
Figure 31A:
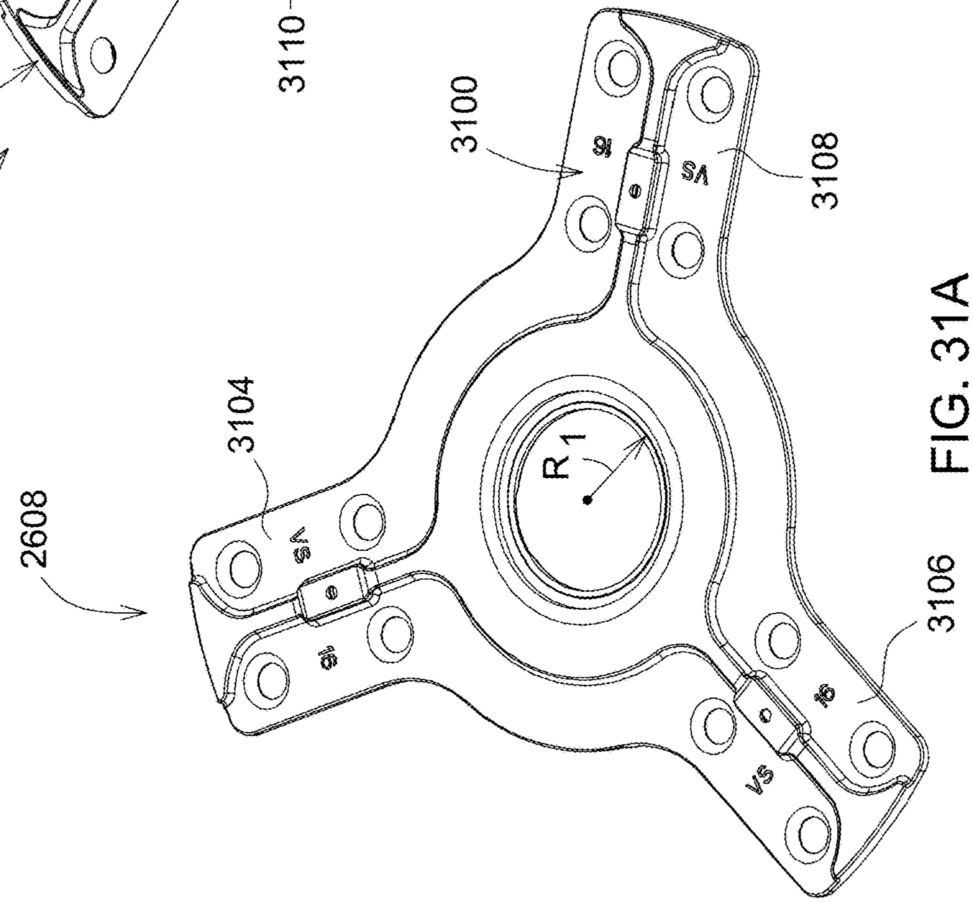

Another implementation of a distributor plate 2608 in accordance with the present disclosure is illustrated in FIGS. 31A-B. The distributor plate 2608 is similar to the distributor plate of FIGS. 16A-B and FIG. 25A-B. In particular, the distributor plate 2608 includes a top surface 3100 (FIG. 31A) and a bottom surface 3102 (FIG. 31B). As shown, the top surface 3100 of the distributor plate 2608 includes a first inner radius, $R_1$, and the bottom surface 3102 includes a second inner radius, $R_2$. At the first inner radius $R_1$, a latching feature is formed to engage or form an interface with the spacer 2710 as described above.

Unlike the distributor plate 2500 of FIGS. 25A-B, the distributor plate 2608 does not include one or more cutouts or cavities formed in the top surface 3100. As described above, during the lubricating process, lubricant flows in the third flow direction 2718 and along the bottom surface 3102 of the distributor plate 2608. Lubricant is able to flow to the root of the gear teeth 2610 of the first idler gear 2602 where the lubricant is distributed to the gear teeth of the drum drive gear. Some of the lubricant may also be distributed to the second idler gear 2604 and/or the spindle drive gear.

In FIGS. 31A-B, the distributor plate 2608 is formed as a body having a plurality of arm portions similar to that of the other distributor plates 2500, 1110 described herein. For example, in the illustrated implementation of FIGS. 31A-B, the distributor plate 2608 includes a first arm portion 3104, a second arm portion 3106, and a third arm portion 3108. Each arm portion extends radially outward. In one implementation, each arm portion is angularly offset from the other arm portions. In the implementation of FIGS. 31A-16B, each arm portion may be angularly offset by 120° from the other arm portions. In an implementation with four arm portions, for example, each arm portion may be angularly offset by 90° from two of the other three arm portions. In some implementations, the arm portions may not be angularly offset from the other arm portions by equal distances.

Referring to FIG. 31B, the bottom surface 3102 of the distributor plate 2608 includes an inner radius $R_2$. In one implementation, the inner radius $R_1$ of the top surface 3100 is the same as the inner radius $R_2$ of the bottom surface 3102. In other implementations, the inner radius $R_1$ of the top surface 3100 is different from the inner radius $R_2$ of the bottom surface 3102. As shown on the bottom surface 3102, each arm portion includes a fluid passage 3112 formed therein. Each fluid passage 3112 may be formed from the second inner radius $R_2$ of the bottom surface 3102 to an outermost end portion of the arm portion (e.g., an outer diameter of the distributor plate 2608). At the second inner radius $R_2$, the fluid passage 3112 may form an inlet 3110 for lubricant or other fluid to enter the fluid passage 3112. The lubricant or other fluid may flow from the inlet 3110 through the fluid passage 3112 to an outlet 3114. Similar to the distributor plates described above, the outermost end portion of each arm portion may open up forming the outlet 3114. In yet other implementations, the fluid passage 3112 may have one or more openings or ports formed along the fluid passage 3112. In one implementation, the fluid passage 3112 has a first width or diameter, and the inlet 3110 has a second width or diameter, and the outlet 3114 has a third width or diameter. The first width or diameter of the fluid passage 3112 may be smaller than the second and third widths or diameters of the inlet 3110 and outlet 3114, respectively. In one implementation, the second width or diameter may be larger than the third width or diameter. In another implementation, the second width or diameter may be smaller than the third width or diameter. In yet another implementation, the second width or diameter may be approximately the same as the third width or diameter. The outlet 3114 of each fluid passage 3112 may intersect with the fluid passage 3112 such that the outlet 3114 has a smaller width or diameter at the intersection point with the fluid passage 3112 than its width or diameter at the outermost end of the arm portion. The same may be true with respect to the inlet 3110. In the implementation of FIG. 31B, the inlet 3110 and outlet 3114 may form a Y-shaped or V-shaped cavity. As lubricant flows through the fluid passage 3112 and outlet 3114 in each arm portion, for example, the lubricant may flow in the fourth flow direction 2720 to lubricate the doffer drive gear or the sixth flow direction 2724 to lubricate the second idler gear 2604 and spindle drive gear.

Figure 18:
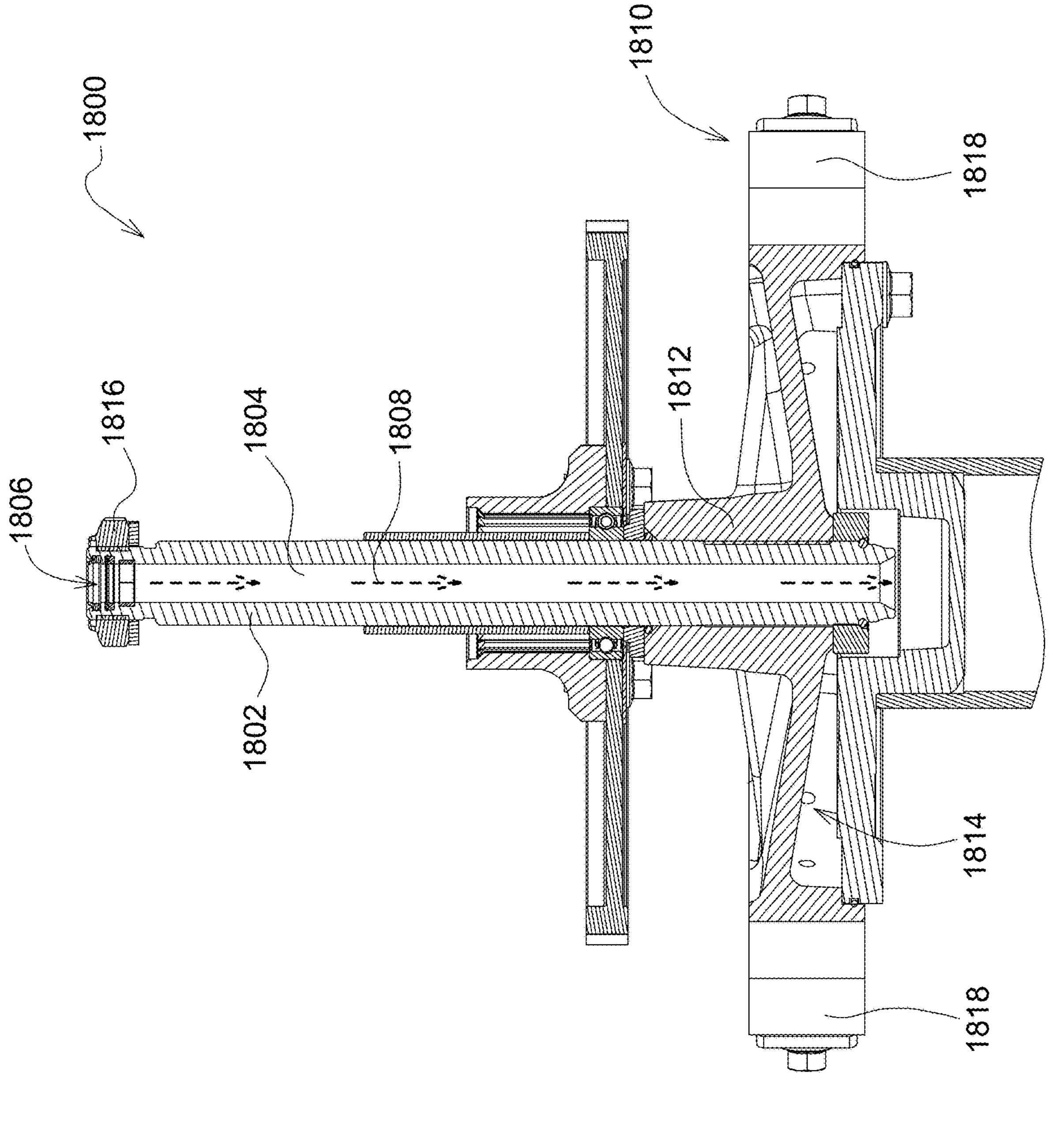
FIG. 18 is a cross-sectional view of a portion of one example implementation of a picker drum assembly.

The lubrication system 200 of the present disclosure also supplies lubricant to the drum assemblies. In FIG. 18, a drum assembly 1800 similar to the first drum assembly 760 and second drum assembly 762 is shown. The drum assembly 1800 includes a shaft 1802 that defines an internal bore 1804. One end of the bore 1804 formed in the shaft 1802 defines an inlet opening 1806 for receiving lubricant. A fluid fitting such as the first drum fitting 736 or second drum fitting 738 may be used for dispensing lubricant into the bore 1804 of the shaft 1802. As the lubricant is supplied into the bore 1804, the lubricant flows in a flow direction indicated by arrow 1808 in FIG. 18. Once the lubricant flows through the shaft 1802, the lubricant then fills a cavity formed on a backside portion 1814 of a spider member 1810. The spider member 1810 may be similar to the first spider member 756 and second spider member 758 of FIG. 7. The spider member 1810 includes a base portion 1812 coupled to the shaft 1802 and one or more arm portions 1818 that extend radially outward relative to the base portion 1812. A nut 1816 is coupled to the shaft 1802 at an end near the inlet opening 1806. The nut 1816 may be adjusted for securing or releasing the drum assembly 1800 or portions thereof from the drum assembly 1800.

Figure 19:
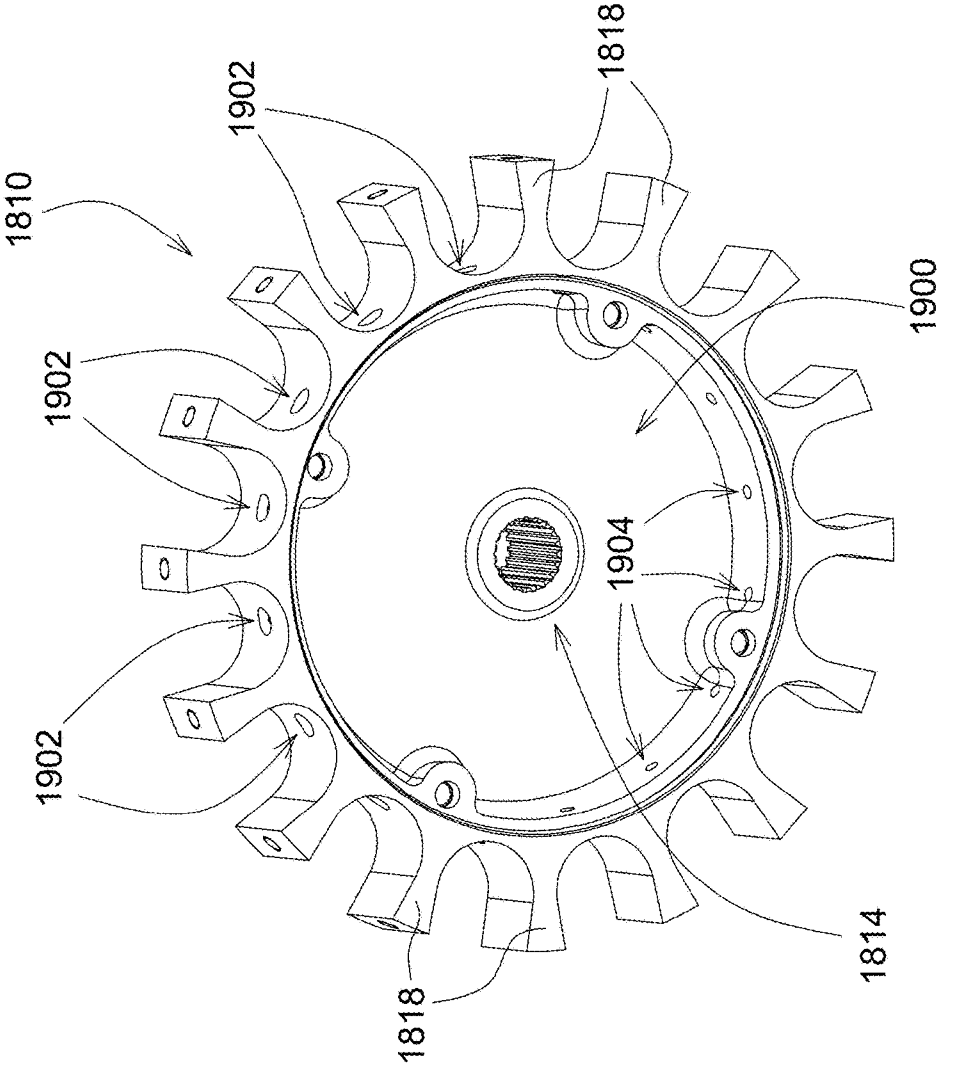
FIG. 19 is a bottom perspective view of one example implementation of a spider member of the picker drum assembly of FIG. 18.

The backside portion 1814 of the spider member 1810 forms a cavity 1900 as shown in FIG. 19. As the cavity 1900 fills with lubricant, the lubricant can be distributed to individual picker bars. More specifically, referring to the implementation of FIG. 19, as lubricant fills the cavity 1900, the lubricant may flow through one or more fluid inlets 1904 and out of one or more fluid outlets 1902 for lubricating each picker bar. As the spider member 1810 rotates about a rotation axis formed through the shaft 1802, centrifugal force can urge or induce the lubricant to flow radially outward towards and through one or more of the plurality of fluid inlets 1904.

In the implementation of FIG. 19, each fluid inlet 1904 is fluidly coupled to a corresponding fluid outlet 1902. More particularly, each fluid inlet 1904 and fluid outlet 1902 is fluidly coupled to a corresponding picker bar (not shown) that is coupled to the drum assembly 1800. In the illustrated implementation, only centrifugal force is used to induce the lubricant to flow through each fluid inlet 1904 and fluid outlet 1902 for lubricating each picker bar.

In an alternative implementation, the cavity of the spider member 1810 may include a plurality of channels formed on the backside portion 1814 thereof for restricting the flow of lubricant from the bore 1804 to each fluid inlet 1904. The plurality of channels may fill with lubricant such that the cavity 1900 does not fill with lubricant as in the implementation of FIG. 19. In this alternative implementation, the distribution of lubricant to each picker bar is not solely dependent on centrifugal force. Moreover, the plurality of channels may be grooves formed in the backside of the spider member 1810. Alternatively, fluid channels, openings, or passageways may be formed to fluidly couple the bore 1804 to each of the plurality of fluid inlets 1904 and fluid outlets 1902 for lubricating each picker bar.

Figure 20:
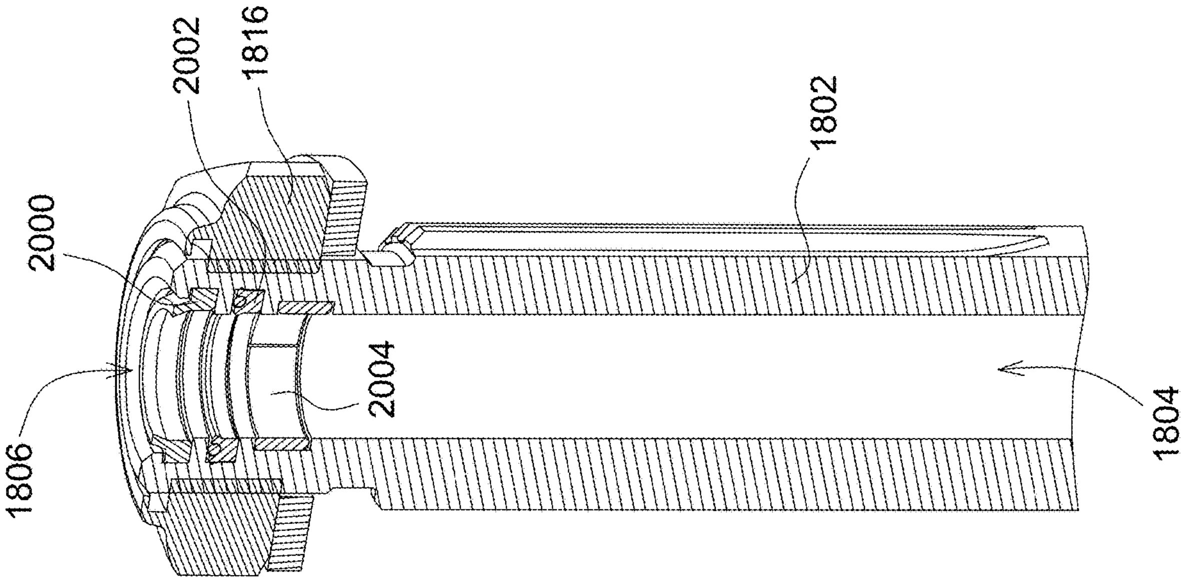
FIG. 20 is a partial cross-sectional view of one example implementation of a shaft of the picker drum assembly of FIG. 18.

As shown in the implementation of FIG. 20, the drum assembly 1800 may include one or more seals coupled to the shaft 1802 at or adjacent to the inlet opening 1806. As shown, a first seal 2000 is coupled to an internal groove formed in the bore 1804 of the shaft 1802 closest to the inlet opening 1806. The first seal 2000 may be a dirt seal or the like configured to reduce or prevent dirt and other contaminants from accessing the internal bore 1804 of the shaft 1802. A second seal 2002 may be coupled to an internal groove or location in the internal bore 1804 below the first seal 2000. The second seal 2002 may be configured to prevent lubricant from flowing in an opposite direction of the flow direction 1808 in FIG. 18. In other words, the second seal 2002 may include a lip or other feature that prevents lubricant from flowing back towards the inlet opening 1806. A third seal 2004 may be disposed within an internal groove or location in the internal bore 1804 of the shaft 1802. The third seal 2004 may be located below the first seal 2000 and the second seal 2002. The third seal 2004 may be a wear seal or ring. The seals may allow pressure to build in the internal bore 1804 of the shaft 1802 to induce the lubricant to flow through the shaft 1802 in the flow direction 1808 towards the spider member 1810.

Figure 21:
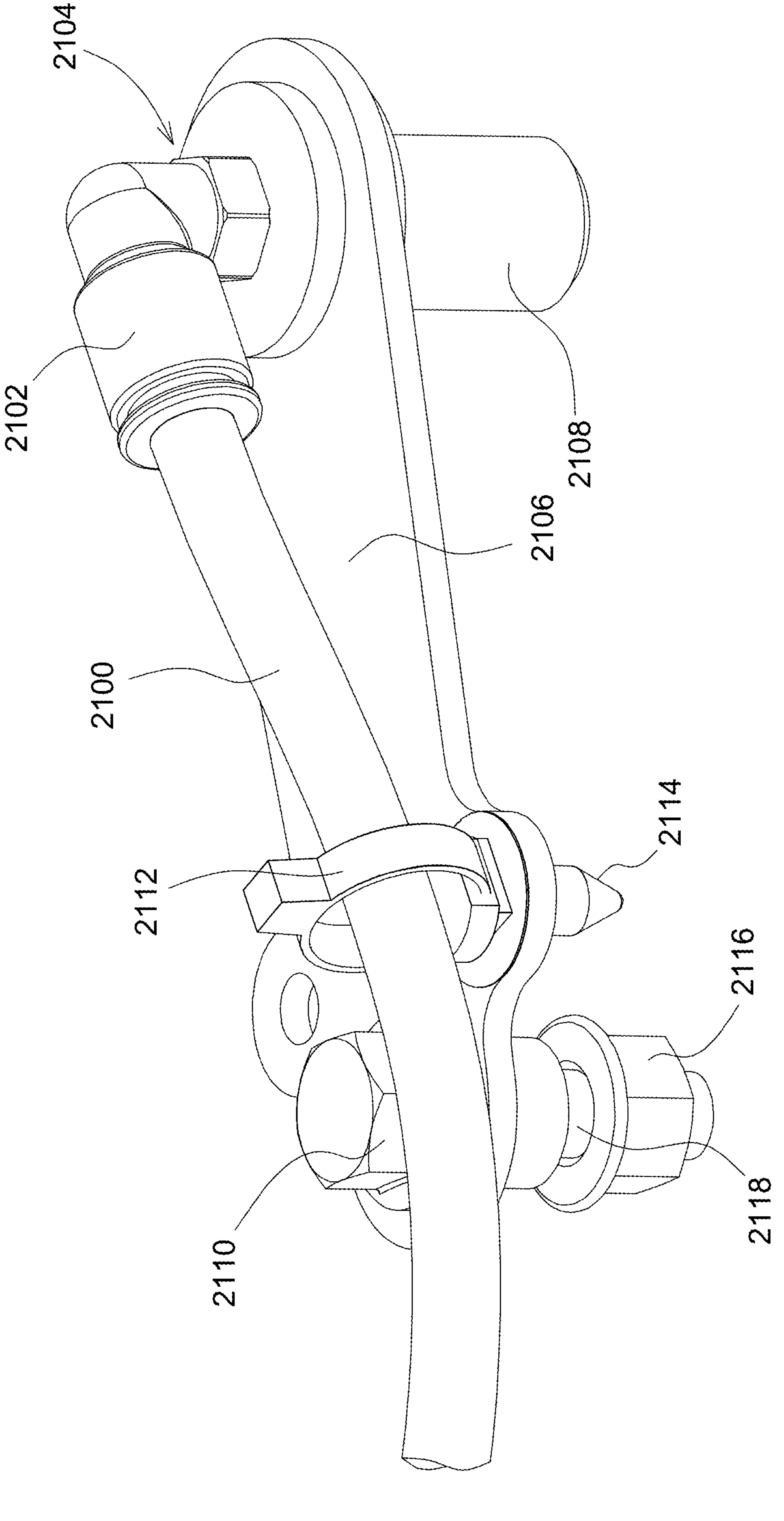
FIG. 21 is a perspective view of one example implementation of a lubrication fitting and securement plate of a lubrication system for a cotton harvester unit.
Figure 22:
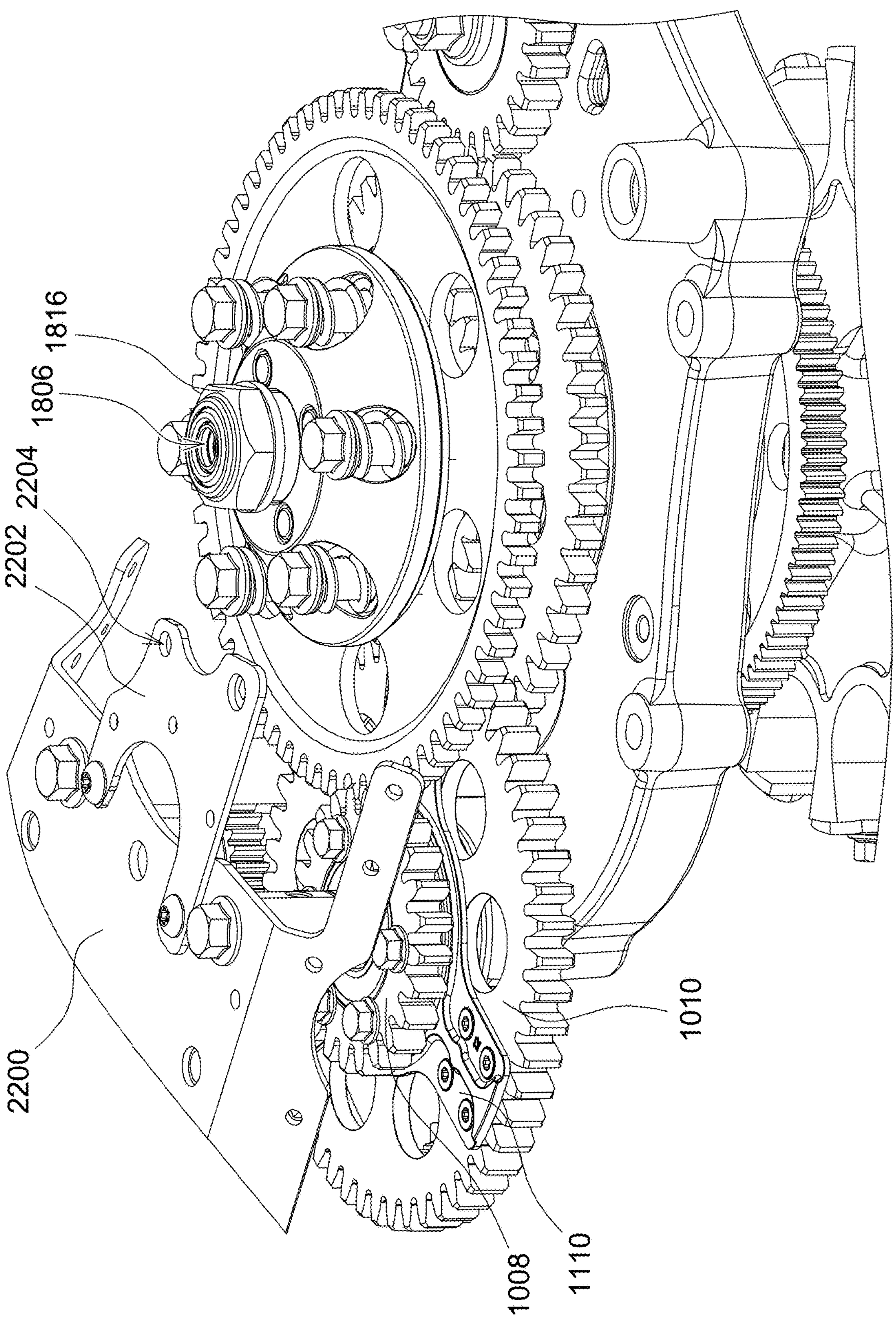
FIG. 22 is a partial perspective view of one implementation of a mounting plate for the lubrication fitting and securement plate of FIG. 21.

To dispense lubricant into the inlet opening 1806 of the shaft 1802, a fluid fitting or drum fluid fitting may be coupled to the inlet opening 1806. In FIG. 21, a fluid fitting 2102 having a fly pin 2108 may be disposed within the inlet opening 1806 for dispensing lubricant into the shaft 1802. Other types and styles of fittings may be used besides the fluid fitting in FIG. 21, and no particular type or style of fitting is intended to limit the scope of the present disclosure. In some implementations, the fitting may be threadably coupled to the shaft 1802 via external threads on the pin 2108 and internal threads in the internal bore 1804 of the shaft 1802. Another implementation of a fluid fitting that may be used is a compression-style fitting as shown in FIG. 23. The compression-style fitting 2300 may include a stem portion 2304 that is disposed within the internal bore 1804 of the shaft 1802. The fitting 2300 may include a connector portion 2302 that is coupled to a fluid line 2100 via a fastener 2306. In FIG. 21, a fastener 2104 may be used for coupling the fluid fitting 2102 to a securement plate 2106. The securement plate 2106 may be similar to the first plate 744 and second plate 748 in FIG. 7. The securement plate 2106 may be coupled to a frame member 2200 of the picker unit. In FIG. 22, for example, the frame member 2200 may include a mounting plate 2202 coupled thereto. The mounting plate 2202 may include an opening 2204 through which a post 2118 is positioned. A first fastener 2110 and a second fastener 2116 may couple the post 2118 to the mounting plate 2202.

Lubricant can be supplied to the inlet opening 1806 in the shaft 1802 via a fluid line 2100. The fluid line 2100 may correspond with the fluid lines 740, 742 in FIG. 7. The fluid line 2100 may be a rubber or plastic hose or a metal line, for example. In any event, the fluid line 2100 may be fluidly coupled to the fluid fitting 2102. In some implementations, the fluid line 2100 may have a long length and thus it is coupled to the securement plate 2106. The securement plate 2106 includes an opening through which a line post 2114 of a line attachment 2112 is coupled. The line attachment 2112 may securely position and orient the fluid line 2100 such that the fluid line 2100 does not form a kink or other restriction.

During operation, the drum assembly 1800 rotates about a rotation axis formed through the shaft 1802. The pin 2108, however, does not rotate and thus is supported in the shaft 1802 via the one or more seals shown in FIG. 20.

One or more pressure sensors may be incorporated at different locations along the various fluid lines in the lubrication system. Each pressure sensor may be configured to sense a blockage or other flow restriction in the fluid line. In this way, the one or more pressure sensors form a diagnostic system for the lubrication system. Each sensor may be in communication with a controller or control unit, and an operator of the agricultural machine may be alerted when there is a flow blockage or restriction in one line. The sensor may sense the pressure in the fluid line and compare the pressure to a threshold. If the pressure exceeds or otherwise does not satisfy the threshold, the sensor may communicate a signal to the controller or control unit indicating a possible flow blockage or restriction as well as a possible location of the blockage based on where the sensor is coupled to the fluid line.

While this disclosure has been described with respect to at least one implementation, the present disclosure can be further modified within the spirit and scope of this disclosure. This application is therefore intended to cover any variations, uses, or adaptations of the disclosure using its general principles. Further, this application is intended to cover such departures from the present disclosure as come within known or customary practice in the art to which this disclosure pertains and which fall within the limits of the appended claims.

The invention claimed is:

1. A lubrication system for lubricating a plurality of picker units connected to an agricultural machine, each of the plurality of picker units including a cam track assembly, an idler gear assembly, a drum and drive gear assembly, and a drum assembly, comprising:

a supply of lubricant;

a pump fluidly coupled to the supply, the pump configured to supply the lubricant to a supply line;

a primary distributor fluidly coupled to the pump via the supply line, the primary distributor comprising a plurality of outlets configured to be fluidly coupled to each of the plurality of picker units; and a plurality of secondary distributors each fluidly coupled to one of the plurality of outlets of the primary distributor, each of the plurality of secondary distributors fluidly coupled to one of the plurality of picker units, wherein, the primary distributor is configured to distribute an equal amount of lubricant in a given cycle to each of the plurality of secondary distributors, and the plurality of secondary distributors are each configured to meter and distribute different predefined amounts of lubricant to a plurality of locations of a corresponding picker unit of the plurality of picker units;

wherein the drum assembly comprises:

a shaft with a defined internal bore, the internal bore including an inlet opening at one end thereof configured to receive lubricant from the corresponding secondary distributor; and a spider member coupled to the shaft, the spider member defining a cavity for receiving lubricant that flows through the internal bore;

wherein, the spider member comprises:

a plurality of fluid outlets formed in the cavity and fluidly coupled to the internal bore via the cavity; and a plurality of defined fluid channels formed in the spider member between the shaft and the plurality of fluid outlets.

2. The lubrication system of claim 1, wherein each secondary distributor is configured to supply a first amount of lubricant to the cam track assembly, a second amount of lubricant to the idler gear assembly, and a third amount of lubricant to the drum assembly, at least one of the first, second, and third amounts being different than at least another of the first, second, and third amounts.

3. The lubrication system of claim 2, wherein the secondary distributor supplies lubricant to the cam track assembly, the idler gear assembly, and the drum assembly in the same sequential order per a given cycle.

4. The lubrication system of claim 1, wherein the cam track assembly of each of the plurality of picker units comprises a cam track formed between an inner wall and an outer wall, the cam track defining a path about which a plurality of rollers move;

wherein, an opening is formed in the cam track at a location offset from a centerline of the cam track and adjacent to the outer wall, the opening being fluidly coupled to an outlet port at the corresponding secondary distributor.

5. The lubrication system of claim 4, further comprising a fluid line fluidly coupled between the outlet port at the corresponding secondary distributor and the cam track assembly, the fluid line comprising a fitting coupled to the opening formed in the cam track;

wherein, lubricant is supplied by the corresponding secondary distributor to the cam track assembly via the fluid line.

6. The lubrication system of claim 1, wherein each of the plurality of fluid outlets formed in the cavity is fluidly coupled to an individual picker bar coupled to the drum assembly.

7. The lubrication system of claim 1, further comprising a fluid line fluidly coupled between the corresponding secondary distributor and the inlet opening in the shaft, the fluid line comprising a fitting coupled to the inlet opening formed in the shaft;

wherein, lubricant is supplied by the corresponding secondary distributor to the shaft via the fluid line.

8. A lubrication system for lubricating a plurality of picker units connected to an agricultural machine, each of the plurality of picker units including a cam track assembly, an idler gear assembly, a drum and drive gear assembly, and a drum assembly, comprising:

a supply of lubricant;

a pump fluidly coupled to the supply, the pump configured to supply the lubricant to a supply line;

a primary distributor fluidly coupled to the pump via the supply line, the primary distributor comprising a plurality of outlets configured to be fluidly coupled to each of the plurality of picker units;

a plurality of secondary distributors each fluidly coupled to one of the plurality of outlets of the primary distributor, each of the plurality of secondary distributors fluidly coupled to one of the plurality of picker units;

wherein, the primary distributor is configured to distribute an equal amount of lubricant in a given cycle to each of the plurality of secondary distributors;

wherein the idler gear assembly comprises:

a first idler gear comprising a plurality of gear teeth, the first idler gear configured to engage with a drum drive gear of the drum and drive gear assembly;

a second idler gear comprising a plurality of gear teeth, the second idler gear configured to engage with a spindle drive gear of the drum and drive gear assembly;

a brush fin coupled to the second idler gear, the brush fin configured to engage with a doffer drive gear of the drum and drive gear assembly;

a pin shaft defining a rotation axis about which the first idler gear and the second idler gear are rotatably driven about, the pin shaft comprising an internal bore and an inlet opening coupled to the internal bore, the inlet opening configured to receive lubricant from the corresponding secondary distributor.

9. The lubrication system of claim 8, wherein the pin shaft comprises a second opening and a third opening defined therein, the second and third openings being fluidly coupled to the inlet opening via the internal bore, where lubricant supplied to the inlet opening flows through the internal bore and out of the internal bore through the second and third openings.

10. The lubrication system of claim 9, wherein the first idler gear comprises one or more fluid channels formed therein, the one or more fluid channels being fluidly coupled to the second opening or the third opening defined in the pin shaft.

11. The lubrication system of claim 9, further comprising a distributor plate positioned between the first idler gear and the second idler gear, the distributor plate comprising a top surface and a bottom surface;

wherein, one or more fluid cutouts are formed in the top surface of the distributor plate, the one or more fluid cutouts being fluidly coupled to one of the second opening and the third opening in the pin shaft;

wherein, one or more fluid passages are formed in the bottom surface of the distributor plate, the one or more fluid passages being fluidly coupled to the other of the second opening and the third opening.

12. The lubrication system of claim 11, wherein a plurality of flow paths are formed between the inlet opening and the drum and drive gear assembly, the plurality of flow paths comprising:

a first flow path defined between the inlet opening and the internal bore in the pin shaft;

a second flow path defined in the internal bore between the first flow path and the second opening;

a third flow path defined in the internal bore between the first flow path and the third opening;

a fourth flow path defined between the second or third opening and one or more fluid channels formed in the first idler gear;

a fifth flow path defined between the second or third opening and at least one of the one or more fluid cutouts formed in the top surface of the distributor plate;

a sixth flow path defined between the second or third opening and at least one of the one or more fluid passages formed in the bottom surface of the distributor plate; and a seventh flow path fluidly coupled to the brush fin and one of the fourth flow, fifth flow, and sixth flow path.

13. A lubrication system for lubricating a plurality of picker units connected to an agricultural machine, each of the plurality of picker units including a cam track assembly, an idler gear assembly, a drum and drive gear assembly, and a drum assembly, the lubrication system comprising:

a pump fluidly coupled to a supply of lubricant;

a primary distributor fluidly coupled between the pump and each of the plurality of picker units;

a plurality of secondary distributors fluidly coupled to the primary distributor and each of the plurality of secondary distributors fluidly coupled to one of the plurality of picker units, where the primary distributor is configured to distribute an equal amount of lubricant in a sequential order per cycle to each of the plurality of secondary distributors;

wherein, the idler gear assembly comprises:

a first idler gear configured to engage with a drum drive gear of the drum and drive gear assembly;

a second idler gear configured to engage with a spindle drive gear of the drum and drive gear assembly;

a brush fin coupled to the second idler gear, the brush fin configured to engage with a doffer drive gear of the drum and drive gear assembly; and a pin shaft defining a rotation axis about which the first idler gear and the second idler gear are rotatably driven about, the pin shaft comprising an internal bore, a first opening coupled to the internal bore, and a second opening coupled to the internal bore but offset from the first opening, the pin shaft being fluidly coupled to one of the plurality of secondary distributors for receiving lubricant.

14. The lubrication system of claim 13, further comprising a distributor plate positioned between the first idler gear and the second idler gear, the distributor plate comprising a top surface and a bottom surface;

wherein, one or more fluid passages are formed in the bottom surface of the distributor plate, the one or more fluid passages being fluidly coupled to the second opening.

15. The lubrication system of claim 14, wherein the one or more fluid passages comprises an inlet, an outlet, and a channel formed therebetween, wherein the inlet and the outlet comprise a first width and the channel comprises a second width, where the first width is greater than the second width.

16. The lubrication system of claim 13, wherein the first idler gear and the second idler gear rotate independently of one another.

17. The lubrication system of claim 16, further comprising a spacer radially disposed between the pin shaft and the distributor plate, the spacer comprising one or more slots fluidly aligned with the second opening.

18. A lubrication system for lubricating a plurality of picker units connected to an agricultural machine, each of the plurality of picker units including a drum assembly, the lubrication system comprising:

a pump fluidly coupled to a supply of lubricant;

a primary distributor fluidly coupled between the pump and each of the plurality of picker units;

a plurality of secondary distributors fluidly coupled to the primary distributor and each of the plurality of secondary distributors fluidly coupled to one of the plurality of picker units, where the primary distributor is configured to distribute an equal amount of lubricant in a sequential order per cycle to each of the plurality of secondary distributors;

wherein, the drum assembly comprises:

a shaft with a defined internal bore, the internal bore including an inlet opening at one end thereof configured to receive lubricant from the corresponding secondary distributor;

a spider member coupled to the shaft, the spider member defining a cavity for receiving lubricant that flows through the internal bore, wherein the spider member comprises a plurality of fluid outlets formed in the cavity and fluidly coupled to the internal bore via the cavity; and a plurality of defined fluid channels formed in the spider member between the shaft and the plurality of fluid outlets.

* * * * *